United States Patent
Krupkin et al.

(10) Patent No.: US 7,847,235 B2
(45) Date of Patent: Dec. 7, 2010

(54) LASER OBSTACLE RANGING AND DISPLAY

(75) Inventors: Vladimir Krupkin, Rishon Le Zion (IL); Avishay Yaniv, Netania (IL); Alla German, Ramat Gan (IL); Moshe Sarid, Reut (IL); Avigdor Zajdman, Rehovot (IL); Elena Luria, Kiryat Ono (IL); Itamar Shoshan, Yehud (IL)

(73) Assignee: Elbit Systems Electro-Optics Elop Ltd., Rehovot (IL)

( * ) Notice: Subject to any disclaimer, the term of this patent is extended or adjusted under 35 U.S.C. 154(b) by 761 days.

(21) Appl. No.: 11/780,920

(22) Filed: Jul. 20, 2007

(65) Prior Publication Data

US 2009/0262760 A1     Oct. 22, 2009

Related U.S. Application Data

(63) Continuation-in-part of application No. PCT/IL2006/000080, filed on Jan. 19, 2006.

(51) Int. Cl.
*H01S 3/00*     (2006.01)
(52) U.S. Cl. .................. 250/227.11; 250/227.12; 372/6
(58) Field of Classification Search .......... 250/201.1, 250/214 R, 227.11, 227.12, 227.23, 227.27; 372/6, 20, 70; 356/28, 28.5
See application file for complete search history.

(56) References Cited

U.S. PATENT DOCUMENTS

| 5,696,782 | A | 12/1997 | Harter et al. |
| 2002/0044342 | A1 | 4/2002 | Krummrich |
| 2003/0141965 | A1 | 7/2003 | Gunderson et al. |
| 2008/0219300 | A1* | 9/2008 | Krupkin et al. ............ 372/6 |
| 2009/0204110 | A1* | 8/2009 | Islam .................... 606/9 |

FOREIGN PATENT DOCUMENTS

| EP | A-0 668 671 | 8/1995 |
| EP | A-0 729 207 | 8/1996 |
| WO | WO 98/42050 A | 9/1998 |

OTHER PUBLICATIONS

Thirteen-page International Preliminary Report on Patentability for priority Appl. No. PCT/IL2006/000080.
Twelve-page Written Opinion for priority Appl. No. PCT/IL2006/000080.

* cited by examiner

*Primary Examiner*—Kevin Pyo
(74) *Attorney, Agent, or Firm*—Choate, Hall & Stewart LLP

(57) ABSTRACT

A novel laser obstacle warning and ranging system, for detecting hard-to-see long and thin obstacles in particular, comprises a fiber laser including a signal diode, a circulator, an erbium doped fiber, a wavelength division multiplexer, a narrow band reflector, a first fiber pump diode, an input combiner, an erbium-ytterbium co-doped fiber, a second fiber pump diode, an output combiner and a third fiber pump diode.

69 Claims, 25 Drawing Sheets

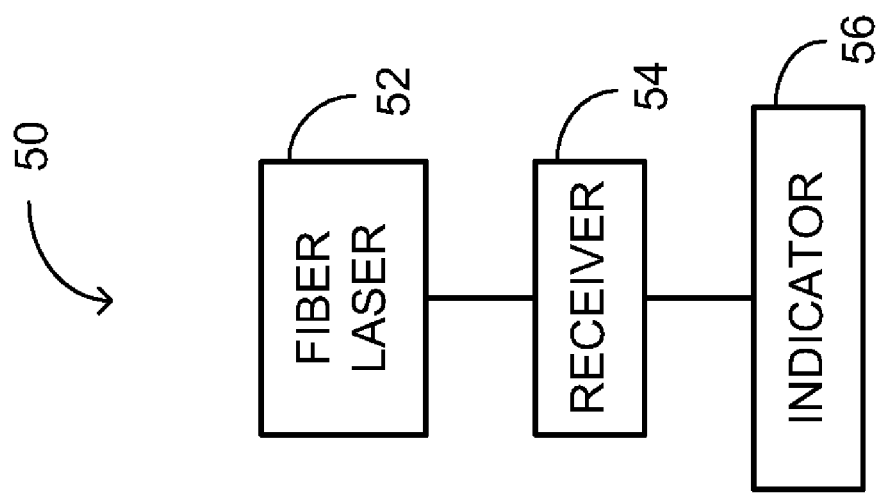

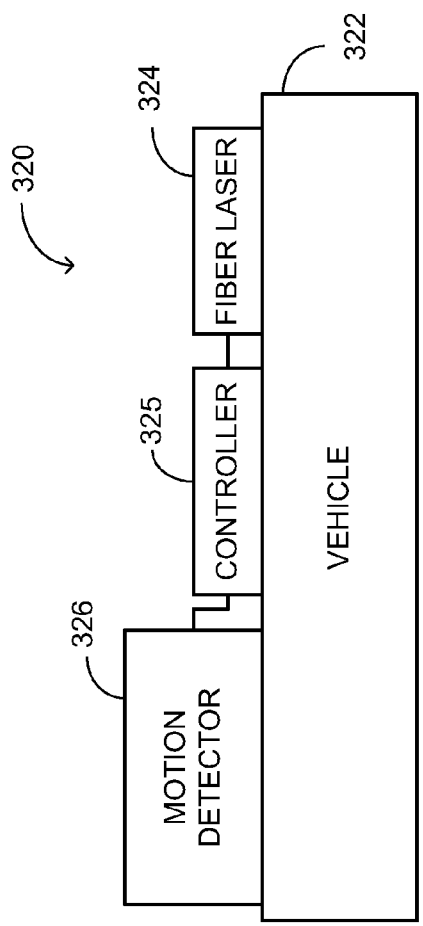
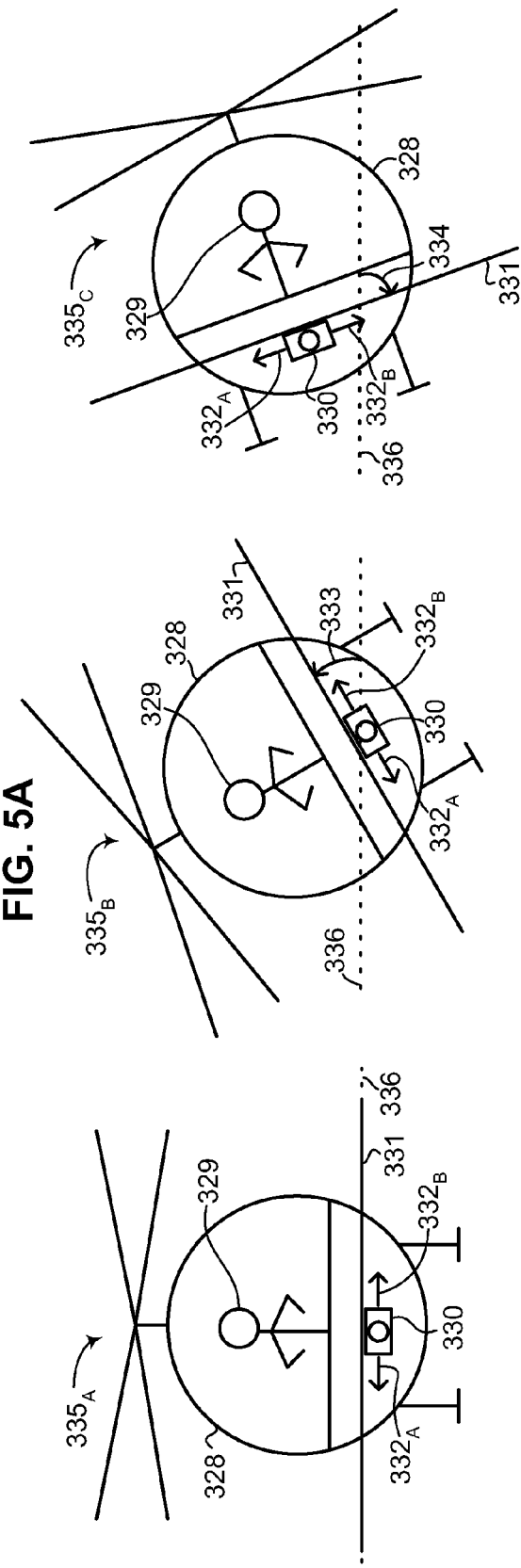
FIG. 5A
FIG. 5B

LASER OBSTACLE RANGING AND DISPLAY

CROSS-REFERENCE TO RELATED APPLICATIONS

This application claims priority to and is a continuation-in-part of PCT Application No. PCT/IL2006/000080, filed Jan. 19, 2006, which claims priority to Israeli Application No. 166430, filed Jan. 20, 2005 and Israeli Application No. 169402, filed Jun. 26, 2005; each of which is incorporated herein by reference in its entirety.

FIELD OF THE DISCLOSED TECHNIQUE

The disclosed technique relates to obstacle warning systems in general, and to methods and systems for detecting hard-to-see long and thin obstacles, in particular.

BACKGROUND OF THE DISCLOSED TECHNIQUE

A major hazard in vehicle operation is the danger of collision with objects which are in the path of the vehicle, and which might not be immediately detectable by the person operating the vehicle. In particular, a hazard in aircraft operation is the danger of collision with ground structures and low-lying obstacles. Overlooking such obstacles, by the aircraft pilot, could result in a crash or a serious accident. Obstacles which are especially difficult to detect by the pilot are, for example, power lines, communication wires, antennas, towers, and the like, which become practically invisible to the pilot in some conditions. Helicopters, in particular, often fly at low altitudes, where ground structures and wires are common, thus the danger of a crash is greater.

Systems for warning aircraft pilots of obstacles in their flight course are known in the art. Such warning systems are often based on laser light detection and ranging (herein abbreviated LIDAR) assemblies. A LIDAR system scans the flight path in front of the aircraft, with a laser beam, and detects laser reflections from obstacles which are in the observable range of the system. The system alerts the pilot of detected obstacles which lie in the flight path ahead. The pilot then decides on the best way to avoid the obstacles, if necessary.

U.S. Pat. No. 6,723,975, issued to Saccomanno and entitled "Scanner for Airborne Laser System," is directed to a laser scanner for a LIDAR system, for scanning a field of view of an aircraft and detecting obstacles. The scanner comprises a plurality of condensing optical elements, a plurality of windows, an optical enclosure, a multiple-axis scanning mirror and light detectors. The optical enclosure is formed by the windows and condensing optical elements. A laser energy source is located externally to the optical enclosure. One of the condensing optical elements includes an aperture, such as a hole drilled there through, so that a laser beam, emitted from the laser energy source, can enter the optical enclosure.

Laser energy is emitted from the laser source, and enters the optical enclosure, hitting the scanning mirror. The scanning mirror directs the laser energy through the windows of the optical enclosure to a plurality of targets in a field of view. The laser energy returned from the plurality of targets reenters the optical enclosure through the windows, hitting the laser detectors. The reflected laser beam is used to detect obstacles, such as wires, which may be present in front of the aircraft.

U.S. Pat. No. 6,724,470 issued to Barenz et al. and entitled "Laser Assembly for LADAR in Missiles," is directed to a two-stage laser beam generating device for a laser-radar (herein abbreviated LADAR) system, for use in target tracking missiles. The device comprises a master oscillator, a laser-fiber coupling lens, a fiber Faraday insulator, an erbium doped fiber amplifier (herein abbreviated EDFA), a diode laser pump, a dichroic mirror, a transmitter fiber and a transmitter. The master oscillator is connected to the Faraday insulator through the laser-fiber coupling lens. The dichroic mirror is placed between the output of the Faraday insulator and a first end of the EDFA. The diode laser pump faces the dichroic mirror, in a manner substantially perpendicular to a line connecting the insulator and the EDFA. A second end of the EDFA is connected to the transmitter through the transmitter fiber.

The master oscillator, which is a microchip laser, emits a laser beam, which passes through the coupling lens, and enters the Faraday insulator. The laser beam emerges from the insulator, passes through the dichroic mirror and enters the EDFA through the first end thereof. The laser diode pump generates radiation, which is deflected by the dichroic mirror, such that it enters the EDFA through the first end thereof. The amplified laser beam emerges from the second end of the EDFA, into the transmitter fiber. The transmitter fiber then directs the laser beam to the transmitter, which directs the laser beam towards a target.

U.S. Pat. No. 4,902,127 issued to Byer et al. and entitled "Eye-safe Coherent Laser Radar," is directed to a laser radar for transmitting eye-safe laser radiation at a target, and detecting reflected laser radiation there from. The laser radar comprises a solid state laser, optical pumping means, optical resonator means, optical amplifier means, transmitter station means, receiver means, a single transverse mode fiber-optic, combining means and detecting means. The laser is coupled to the optical pumping means. The laser is optically coupled to the optical resonator means and to the optical amplifier means. The transmitter station is optically coupled to the optical amplifier means. The single transverse mode fiber-optic is optically coupled to the receiver means. The detecting means is optically coupled to the combining means.

The laser emits a lasant radiation beam, after being pumped by the optical pumping means. The lasant beam passes through the amplifier before passing through the transmitter. The transmitter illuminates the beam at a target. Reflected radiation from the illuminated target passes through the receiver, and then through the fiber optic. The combining means combines the reflected radiation with a reference coherent lasant radiation. The detector receives the combined radiation from the combiner and detects the differences between the reflected radiation and the reference radiation, the differences being representative of parameters associated with the illuminated target.

U.S. Pat. No. 6,130,754 issued to Greene and entitled "Eyesafe Transmission of Hazardous Laser Beams," is directed to an apparatus for preventing injury to humans while transmitting a non-eyesafe (i.e., hazardous) laser beam. The apparatus comprises a non-eyesafe laser source, an eyesafe laser source, a delay component, a receiver/transmitter switch, a deflecting mirror, a dichroic mirror, an optical detector and a trigger. The eyesafe laser source is connected to the receiver/transmitter switch. The delay component is electrically connected to the eyesafe laser source and the non-eyesafe laser source. The dichroic mirror is placed in the path of the eyesafe laser beam. The deflecting mirror is placed in the path of the non-eyesafe laser beam. The optical detector is connected to the receiver/transmitter switch. The optical detector is further connected to the trigger, which in turn is connected to the non-eyesafe laser source.

The eyesafe laser source emits an eyesafe laser beam, which is deflected by the dichroic mirror. The non-eyesafe laser source emits a non-eyesafe laser beam, after a delay determined by the delay component. The deflecting mirror deflects the non-eyesafe laser beam so that it passes through the dichroic mirror, on the same optical axis as the eyesafe laser beam. After transmitting the eyesafe laser beam, the transmitter/receiver switch is switched to receiving mode. If the detector detects reflections of the eyesafe laser beam (i.e., reflected off an object located in front of the apparatus), then the optical detector disables the non-eyesafe laser source, through the trigger.

SUMMARY OF THE DISCLOSED TECHNIQUE

It is an object of the disclosed technique to provide a novel method and system for laser obstacle ranging and displaying which overcomes the disadvantages of the prior art.

In accordance with the disclosed technique, there is thus provided a fiber laser, for detecting at least one object, which includes a signal diode, a circulator, an erbium doped fiber (EDF), a wavelength division multiplexer (WDM), a narrow band reflector, a first fiber pump diode, an input combiner, an erbium-ytterbium co-doped fiber (EYDF), a second fiber pump diode, an output combiner and a third fiber pump diode. The circulator is optically coupled with the signal diode, the EDF and the input combiner, the WDM is optically coupled with the EDF, the narrow band reflector and the first fiber pump diode, the input combiner is optically coupled with the EYDF and the second fiber pump diode and the output combiner is optically coupled with the EYDF and the third fiber pump diode. The signal diode generates a beam of light, the circulator directs the beam of light in at least one of at least two different directions, the EDF amplifies the beam of light thereby producing an amplified beam of light, the narrow band reflector reflects only the amplified beam of light back through the EDF a second time, thereby producing a double amplified beam of light, the first fiber pump diode pumps the EDF, the EYDF amplifies the double amplified beam of light, thereby producing a triple amplified beam of light and the second fiber pump diode and the third fiber pump diode each pump the EYDF. The WDM and the signal diode are located on opposite sides of the EDF and the output combiner outputs the triple amplified beam of light.

According to another aspect of the disclosed technique, there is thus provided an apparatus, for detecting at least one object and preventing receiver burn-out, mounted on a vehicle, which includes a laser and at least one receiver, the laser being coupled with the receiver. The laser transmits a beam of light and the receiver detects reflections of the beam of light from the object. The laser includes at least one signal diode, a commutator, a power supply signal diode driver, a circulator, an erbium doped fiber (EDF), a wavelength division multiplexer (WDM), a narrow band Bragg reflector, a first fiber pump diode, an output combiner and a second fiber pump diode. The commutator is coupled with each signal diode and the power supply signal diode driver, the circulator is optically coupled with each signal diode, the EDF and the output combiner, the WDM is optically coupled with the EDF, the narrow band Bragg reflector and the first fiber pump diode and the second fiber pump diode is optically coupled with the output combiner. Each signal diode generates a beam of light distinct from one another, the power supply signal diode driver supplies energy to each signal diode, the circulator directs the beam of light in at least one of at least two different directions, the EDF amplifies the beam of light thereby producing an amplified beam of light, the narrow band Bragg reflector reflects only the amplified beam of light through the EDF a second time, thereby producing a double amplified beam of light and the first fiber pump diode and the second fiber pump diode pump the EDF. The WDM and each of the signal diodes are located on opposite sides of the EDF, the output combiner outputs the beam of light and the commutator enables each of the signal diodes, one at a time, to each draw a predetermined amount of energy from the power supply signal diode driver. One signal diode generates a low energy beam of light and another signal diode generates a high energy beam of light. The low energy beam of light is transmitted by the output combiner before the high energy beam of light, and when the low energy beam of light is detected by the receiver, and the energy level of the low energy beam is above a predetermined threshold, the high energy beam of light is not transmitted.

According to a further aspect of the disclosed technique, there is thus provided an apparatus, for detecting at least one object, the apparatus being mounted on a vehicle, which includes a fiber laser, a motion detector and a controller. The motion detector is coupled with the fiber laser and the controller is coupled with the fiber laser and the motion detector. The fiber laser generates a pulsed beam of light at a certain pulse repetition rate (PRR), the motion detector detects the motion of the vehicle and the controller adjusts the PRR of the pulsed beam of light according to the detected motion.

According to another aspect of the disclosed technique, there is thus provided an apparatus, for detecting at least one object, the apparatus being mounted on a vehicle, which includes a fiber laser, a motion detector and a controller. The motion detector is coupled with the fiber laser and the controller is coupled with the fiber laser and the motion detector. The fiber laser generates a pulsed beam of light at a certain output peak power, the motion detector detects the motion of the vehicle and the controller adjusts the output peak power according to a detected linear velocity of the vehicle using an increasing function.

According to a further aspect of the disclosed technique, there is thus provided an apparatus, for detecting at least one object, the apparatus being mounted on a vehicle, which includes a fiber laser, a motion detector, a scanner and a controller. The fiber laser is coupled with the motion detector and the scanner and the controller is coupled with the fiber laser and the motion detector. The fiber laser generates a beam of light, the motion detector detects the motion of the vehicle, the scanner directs the generated beam of light towards a volume of interest at a certain field-of-view (FOV) and the controller adjusts the FOV. The area the scanner can potentially direct the generated beam of light is referred to as a field-of-regard (FOR), the FOV refers to the area the scanner actually directs the generated beam of light for detecting the object, the FOV is smaller than the FOR and the controller adjusts the FOV according to the detected motion.

According to another aspect of the disclosed technique, there is thus provided an apparatus, for detecting at least one object, the apparatus being mounted on a vehicle in motion, which includes a fiber laser, a motion detector, a scanner and a controller. The fiber laser is coupled with the motion detector and the scanner and controller is coupled with the fiber laser and the motion detector. The fiber laser generates a beam of light, the motion detector detects the motion of the vehicle, the scanner directs the generated beam of light towards a volume of interest at a certain line-of-sight (LOS) and the controller adjusts the LOS in the direction of the motion according to a detected angular velocity of the vehicle using an increasing function.

According to a further aspect of the disclosed technique, there is thus provided an apparatus, for detecting at least one object, which includes a fiber laser, at least one receiver, a reflecting-transmitting plate and an optical assembly. The reflecting-transmitting plate is optically coupled with each receiver and the optical assembly is optically coupled with the fiber laser and with the reflecting-transmitting plate. The fiber laser generates at least one beam of light which is distinct compared to another beam of light, each receiver receives reflections of each beam of light from the object, the reflecting-transmitting plate reflects one of the beams of light towards one receiver and transmits another one of the beams of light towards another receiver and the optical assembly transmits and receives each beam of light. Each beam of light is transmitted at a different time.

According to another aspect of the disclosed technique, there is thus provided an apparatus, for distinguishing between a pulsed light reflection from at least one object of interest and a pulsed light reflection from clutter, which includes a laser, at least one receiver, a pulse width detector and a processor. The pulse width detector is coupled with each receiver and the processor is coupled with the pulse width detector and with each receiver. The laser generates and transmits a pulsed beam of light, each receiver receives reflections of the pulsed beam of light from the object of interest and the clutter, the pulse width detector detects the pulse width of the pulsed light reflection and the processor distinguishes between the pulsed light reflection from the object of interest and the pulsed light reflection from the clutter. The processor provides an object of interest indication when the detected width of the pulsed light reflection is substantially similar to the pulse width of the transmitted pulsed beam of light and the processor provides a clutter indication when the detected width of the pulsed light reflection is substantially longer than the pulse width of the transmitted pulsed beam of light.

According to a further aspect of the disclosed technique, there is thus provided a method, for detecting at least one object and preventing receiver burn-out, including the procedures of transmitting a low energy pulsed beam of light towards a volume of interest, detecting a reflection of the transmitted low energy pulsed beam of light from the object, in a predetermined time period and transmitting a high energy pulsed beam of light towards the volume of interest when the reflection of the transmitted low energy pulsed beam of light is not received within the predetermined time period.

According to another aspect of the disclosed technique, there is thus provided a method, for detecting at least one object, including the procedures of scanning a volume of interest using a pulsed beam of light from a light source, from a moving vehicle, the pulsed beam of light being at a certain pulse repetition rate (PRR), detecting the motion of the vehicle and adjusting the PRR of the pulsed beam of light according to the detected motion.

According to a further aspect of the disclosed technique, there is thus provided a method, for detecting at least one object, including the procedures of scanning a volume of interest using a pulsed beam of light from a light source, from a moving vehicle, the pulsed beam of light being at a certain output peak power, detecting the motion of the vehicle and adjusting the output peak power of the pulsed beam of light according to the detected motion.

According to another aspect of the disclosed technique, there is thus provided a method, for detecting at least one object, including the procedures of scanning a volume of interest, from a moving vehicle, using a pulsed beam of light at a certain field-of-view (FOV), detecting the motion of the vehicle and adjusting the FOV according to detected motion of the vehicle.

According to a further aspect of the disclosed technique, there is thus provided a method, for detecting at least one object, including the procedures of scanning a volume of interest, from a moving vehicle, using a pulsed beam of light at a certain line-of-sight (LOS), detecting the motion of the vehicle and adjusting the LOS in the direction of the motion according to a detected angular velocity of the vehicle using an increasing function.

BRIEF DESCRIPTION OF THE DRAWINGS

The disclosed technique will be understood and appreciated more fully from the following detailed description taken in conjunction with the drawings in which:

FIG. 1A is a schematic illustration of a system, constructed and operative in accordance with an embodiment of the disclosed technique;

FIG. 5A is a schematic illustration of a system, constructed and operative in accordance with a further embodiment of the disclosed technique;

FIG. 5B is a schematic illustration of a helicopter mounted with the system of FIG. 5A, constructed and operative in accordance with another embodiment of the disclosed technique;

DETAILED DESCRIPTION OF THE EMBODIMENTS

Figure 1B:
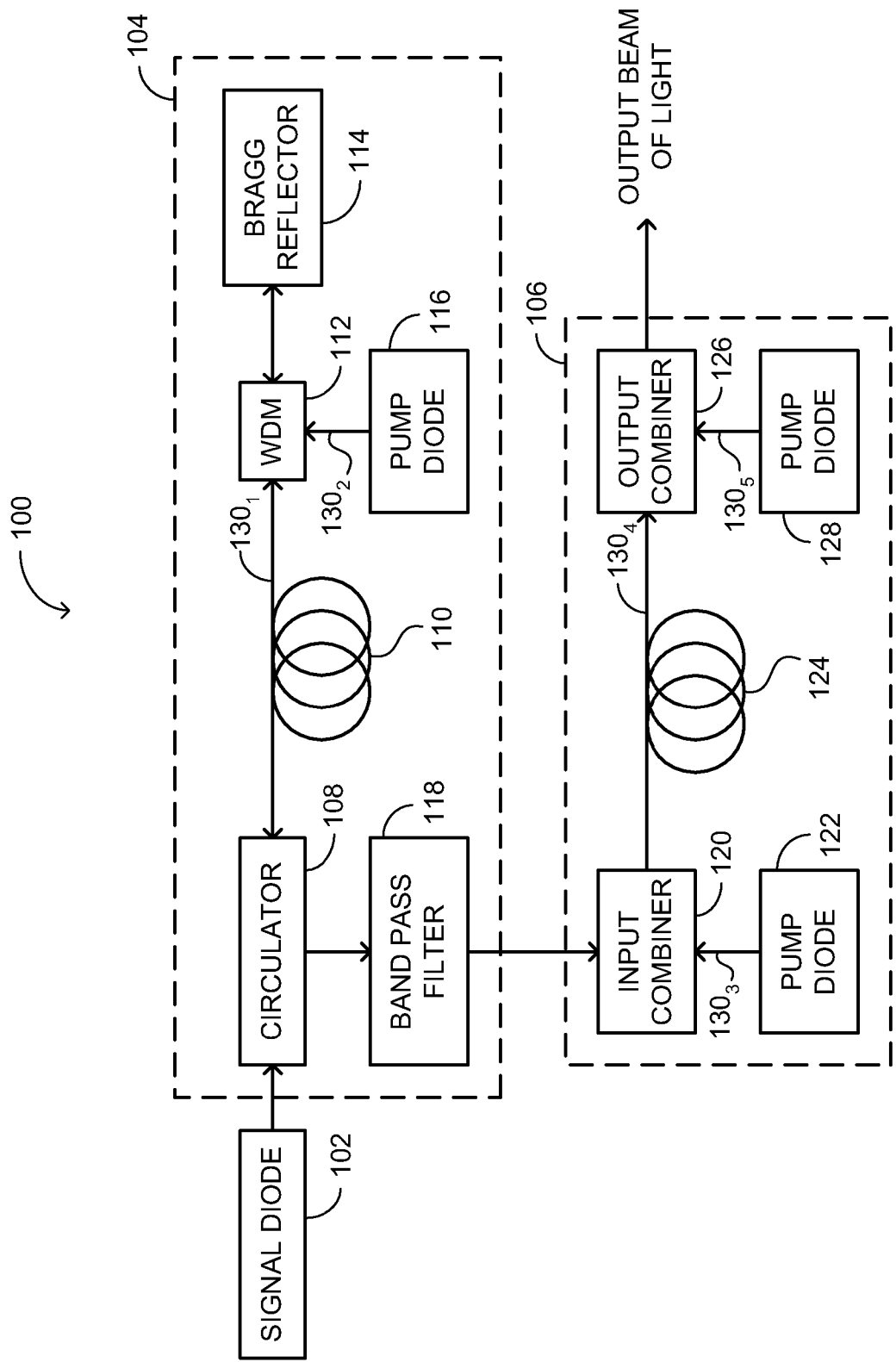
FIG. 1B is a schematic illustration of the fiber laser of FIG. 1A, constructed and operative in accordance with another embodiment of the disclosed technique.

The disclosed technique overcomes the disadvantages of the prior art by providing a novel laser obstacle ranging and display (herein abbreviated LORD) system and method. The LORD system includes a unique fiber laser capable of generating high energy laser beams, enabling the fiber laser to resolve hard-to-see obstacles, for example electrical wires, which may measure on the order of millimeters, from distances on the order of kilometers. The unique design of the fiber laser also increases the signal-to-noise (herein abbreviated S/N) ratio, thereby increasing the efficiency, and output capacity, of the fiber laser.

The fiber laser is also unique in that the output combiner of the laser, where the laser beam is emitted from the fiber laser, does not require a delivery fiber to transmit the laser beam to an optical assembly for directing and focusing the laser beam on an obstacle. The output combiner can therefore be floated with respect to the "body" of the fiber laser. This feature increases the flexibility of design and reliability of the fiber laser, reduces energy loss in the emitted laser beam, and reduces the cost of the LORD system in general. It is noted that the fiber laser of the disclosed technique can be used with a fiber laser based LADAR (i.e., laser radar) system or a fiber based LIDAR (i.e., light imaging display and ranging) system. It is also noted that the LORD system of the disclosed technique can be classified as a LADAR system or a LIDAR system.

It is noted that the use of the word "obstacle" in the description is used solely as an example. The disclosed technique described herein can be used to detect all types of objects, not just obstacles. Furthermore, the use of the words "laser beam" and "light beam" are used interchangeably. It is also noted that the disclosed technique herein described can be mounted on any kind of vehicle, for example, a helicopter, an airplane, a boat, a road vehicle and the like. Therefore the use of the word "pilot," when describing the disclosed technique mounted on a vehicle, is meant to include all types of operators of vehicles.

Furthermore, the disclosed technique can be used on autonomous and unmanned platforms, where a real operator is not physically located in the vehicle. Also, the term "hard-to-see," or "hard to resolve," with reference to objects or obstacles, referred to in the description below, refers to any object or obstacle which is several orders of magnitude smaller than the distance between the object and a LORD system. For example, telephone lines, which are on the order of centimeters, are hard-to-see obstacles from a helicopter located a few kilometers away from the telephone lines. It is further noted that the LORD system described herein can detect hard-to-see objects in a volume of interest, where the volume of interest can range from a few meters to a few kilometers, in general. It is also noted that the terms "fiber optic cable", "optical fiber" and "fiber optics" are used interchangeably in the description and the claims, and that these terms refer to fiber optics and the cables used to transmit information from one point to another in the form of light.

Reference is now made to FIG. 1A, which is a schematic illustration of a system, generally referenced 50, constructed and operative in accordance with an embodiment of the disclosed technique. System 50 is an example of a LORD system. System 50 includes a fiber laser 52, a receiver 54 and an indicator 56. System 50 also includes a scanner (not shown) and an image processing unit (not shown).

Fiber laser 52 is optically coupled with receiver 54. Receiver 54 is coupled with indicator 56. Receiver 54 can be, for example, a sensor. It is noted that fiber laser 52 may be an eye-safe fiber laser, whereby the wavelength of the laser beam emitted from fiber laser 52 is a wavelength which is not damaging to the eye, for example between the range of 1.5 to 2.3 micrometers. It is also noted that system 50 may include a plurality of receivers. Indicator 56 can be any device enabled to give information to a pilot, for example an audio system, a visual display system, an indicator lighting system, a tactile system, or a projection system for projecting information, or symbology (i.e. icons, directional arrows, aiming reticles, and the like), in the line-of-sight (herein abbreviated LOS) of the pilot.

System 50 is mounted on a vehicle (not shown). Fiber laser 52 transmits light beams in front of the vehicle. The scanner scans a volume of interest (not shown) in which obstacles may be present by rastering the light beams transmitted by fiber laser 52 over the volume of interest. Any obstacles in the volume of interest will cause some of the light beams, transmitted by fiber laser 52, to reflect back to system 50. Receiver 54 receives the reflected light beams and detects the intensity of the reflected light beams. The detected intensity is then used by indicator 56 to provide an indication of any obstacles present in the volume of interest. Indicator 56 may issue an audio cue to a pilot, warning the pilot that an obstacle is in front of her, and instructing her how to avoid the obstacle.

Indicator 56 may also display an image of the volume of interest, the image being generated by the image processing unit, thereby allowing the pilot to see for herself how to best avoid the obstacles. Indicator 56 may issue a tactile cue to the pilot, warning the pilot that an obstacle is in front of her. The image processing unit generates the image by processing the various intensities of all the reflected light beams. System 50 can be used during daytime and nighttime conditions.

In order for receiver 54 to receive reflections from hard-to-resolve objects, like antennas, electrical wires, telephones cables, and the like, fiber laser 52 needs to emit narrow diameter light beams of high energy, where the output peak power of fiber laser 52 is on the order of tens of kilowatts. Such a high level of energy is required in order to resolve obstacles which may be on the order of millimeters from distances on the order of kilometers. The output peak power of fiber laser 52 is several orders of magnitude larger that the typical output peak power of fiber lasers, which are usually used in communication systems. In communication systems, the output peak power of fiber lasers is on the order of milliwatts.

Reference is now made to FIG. 1B, which is a schematic illustration of the fiber laser of FIG. 1A, generally referenced 100, constructed and operative in accordance with another embodiment of the disclosed technique. Fiber laser 100 includes a signal diode 102, a preamplifier stage 104 and a booster stage 106. Fiber laser 100 also includes thermoelectric coolers, a heat sink and an external forced air unit (none shown), for cooling laser fiber 100.

Signal diode 102 is optically coupled with preamplifier stage 104, and preamplifier stage 104 is optically coupled with booster stage 106. In general, all the components in a fiber laser are optically coupled by fiber optic cables. Signal diode 102 can be a modulated distribution feedback (herein abbreviated DFB) single mode fiber-coupled laser diode. It is noted that signal diode 102 can be set to work at operational wavelengths ranging from 1.5 to 2.3 micrometers. For example, signal diode can be set to work at operational wavelengths of 1.535 μm, 1.545 μm, 1.555 μm, 1.560 μm and 1.561 μm, which are all eye-safe wavelengths. In one embodiment of the disclosed technique, the operational wavelength is set to 1.561 μm. The use of eye-safe wavelengths in fiber laser 100 is significant in that it increases the applications wherein fiber laser 100 can be used. For example if fiber laser 100 is used in a LIDAR application (see FIG. 11) then its operational wavelengths should be in the eye-safe range. Signal diode 102 can generate pulsed beams of lights, with the pulse width of the output beam of light ranging from a few nanoseconds to thousands of nanoseconds, for example from 3 nanoseconds to 2000 nanoseconds. It is noted that the bandwidth of signal diode 102 is narrow as compared to the bandwidth of the doped fiber amplifier used in preamplifier stage 104.

The pulse width of the output beam of light can be adjusted via an interface (not shown) to fiber laser 100. The frequency at which signal diode 102 generates pulsed beams of light is generally on the order of tens to hundreds, or thousands, of kilohertz, for example from one kilohertz to one thousand kilohertz. It is noted that this frequency is several orders of magnitude smaller that the frequency used by fiber lasers in communication systems. It is also noted that the shape and width of the pulsed beams of light generated by signal diode 102 remain substantially constant while fiber laser 100 is in use.

In general, signal diode 102 generates a low energy beam of light, on the order of tens of microwatts. Preamplifier stage 104 then amplifies the low energy beam of light twice, and sends the double amplified beam of light to booster stage 106. Booster stage 106 further amplifies the double amplified beam of light and outputs the beam of light towards an optical assembly (not shown) which directs and focuses the beam of light towards a volume of interest. It is noted that fiber laser 100 is constructed using a master oscillator power amplifier (herein abbreviated MOPA) approach.

Preamplifier stage 104 includes a circulator 108, an erbium doped fiber (herein abbreviated EDF) 110, a wavelength division multiplexer (herein abbreviated WDM) 112, a narrow band Bragg reflector 114, a fiber pump diode 116, a band pass filter 118, fiber optic cables 130$_1$ and 130$_2$. Preamplifier stage 104 also includes a delay line (not shown), between WDM 112 and narrow band Bragg reflector 114. Circulator 108 is optically coupled with signal diode 102, EDF 110 and band pass filter 118. EDF 110 is optically coupled with WDM 112. WDM 112 is optically coupled with both narrow band Bragg reflector 114 and fiber pump diode 116. The delay line is optically coupled with both WDM 112 and narrow band Bragg reflector 114. Fiber optic cable 130, optically couples EDF 110 to circulator 108 and WDM 112. Fiber optic cable 130$_2$ optically couples fiber pump diode 116 to WDM 112. In general, as mentioned above, all the components in fiber laser 100 are optically coupled by fiber optic cables, although in particular, an EDF and a fiber pump diode are optically coupled within a fiber laser via fiber optic cables. It is noted that EDF 110 can be substituted by an erbium-ytterbium co-doped fiber. It is also noted that EDF 110 is a single mode fiber amplifier.

Fiber pump diode 116 can be a fiber coupled DFB laser diode. Narrow band Bragg reflector 114 can also be a fiber Bragg grating (not shown). It is noted that band pass filter 118 is an optional component. It is furthermore noted that signal diode 102 and fiber pump diode 116 are located on opposite sides of EDF 110, which was found to increase the S/N ratio, thereby increasing the efficiency of preamplifier stage 104. In fiber amplifiers used in communication systems, the signal diode and the fiber pump diode are usually located on the same side of the EDF. It is also noted that in fiber amplifiers used in communication systems, a wide band Bragg reflector is used, unlike in the disclosed technique. It is furthermore noted that the bandwidth of EDF 110 is by the specification of erbium doped fibers wide as compared with the bandwidth of signal diode 102 and narrow band Bragg reflector 114.

Circulator 108 receives the low energy beam of light generated by signal diode 102. Circulator 108 then directs the low energy beam of light, via fiber optic cable 130$_1$ towards EDF 110. EDF 110 amplifies the low energy beam of light. This amplification is achieved by using fiber pump diode 116, which pumps EDF 110 via WDM 112. Fiber pump diode 116 generates a beam of light, for pumping EDF 110, on the order of hundreds of milliwatts, for example a beam of light having an energy ranging from 100 to 500 milliwatts. The operational wavelength of the beam of light generated by fiber pump diode 116 may be on the order of hundreds of nanometers, for example 920 nm, 940 nm, 960 nm or 980 nm. In general, the operational wavelength of fiber pump diode 116 ranges from 910 nm to 985 nm. In one embodiment of the disclosed technique, the operational wavelength of fiber pump diode 116 ranges from either 915 nm to 930 nm or 940 nm to 960 nm. These ranges possess wide absorption spectra. It is noted that the length of EDF 110 is suited to match the characteristic absorption length of such fibers. A change or increase in the length of EDF 110 from the characteristic absorption length of erbium doped fibers by a factor as small as 2 may prevent or stop EDF 110 from amplifying the low energy beam of light.

WDM 112 allows EDF 110 to receive the beam of light generated from fiber pump diode 116 without interference from the low energy beam of light being amplified by EDF 110. WDM 112 provides the amplified beam of light to narrow band Bragg reflector 114, which reflects the amplified beam of light back to WDM 112, which in turn, reflects the amplified beam of light back through EDF 110 a second time. Narrow band Bragg reflector 114 ensures that only the amplified beam of light generated by signal diode 102 is reflected back through EDF 110 and none of the beam of light generated by fiber pump diode 116. Circulator 108 directs the double amplified beam of light towards band pass filter 118. Band pass filter 118 only allows the beam of light emitted from signal diode 102 to pass there through. Since the beam of light amplified by EDF 110 can destroy the beam of light generated by signal diode 102, band pass filter 118, as well as narrow band Bragg reflector 114, are included in preamplifier stage 104 to suppress any spontaneous light emissions that may result from EDF 110. The bandwidth of signal diode 102 and narrow band Bragg reflector 114 are selected to be substantially similar to enable narrow band Bragg reflector 114 to only reflect narrow band energy which originated from signal diode 102 and not wide band energy originating from EDF 110.

The use of the delay line between WDM 112 and narrow band Bragg reflector 114 ensures that the pulse width of the amplified beam of light is not significantly reduced after it is reflected back to WDM 112 by narrow band Bragg reflector 114. It was found that without the use of the delay line, the pulse width of the amplified beam of light was significantly reduced. Such a reduction in pulse width can significantly increase the output peak power of the amplified beam of light, thereby causing damage to the elements in preamplifier stage 104 as the amplified beam of light is reflected back to WDM 112 and provided to EDF 110. Since light is traveling through EDF 110 in two directions, numerous unwanted effects can occur in preamplifier stage 104 because of the interference between the low energy beam of light provided by signal diode 102 to circulator 108 to EDF 110 and the amplified beam of light provided by WDM 112 back to EDF 110. Such effects can include energy remaining in EDF 110, standing waves being formed in EDF 110, hole burning in the optical fibers which couple the various components of preamplifier stage 104 and non-homogenous energy extraction from EDF 110, each of which cause energy fluctuations in preamplifier stage 104. The use of the delay line in preamplifier stage 104 prevents the above mentioned unwanted effects from occurring in preamplifier stage 104. The delay line enables the amplified beam of light to maintain a stabilized pulse shape. The delay of the delay line provides a delay time equal to or greater than the pulse width of the low energy beam of light provided by signal diode 102. By using the delay line, the amplified beam of light maintains its initial pulse width and stability, is amplified significantly without change to its peak power and damage to the components of preamplifier stage 104 is avoided. The delay line prevents interference from occurring in preamplifier stage 104.

Booster stage 106 includes an input combiner 120, a fiber pump diode 122, an erbium-ytterbium co-doped fiber (herein abbreviated EYDF) 124, an output combiner 126, a fiber pump diode 128 and fiber optic cables 130₃, 130₄ and 130₅. It is noted that input combiner 120 can be substituted for a double clad WDM. Booster stage 106 also includes band pass filters (not shown), optically coupled with input combiner 120 and with output combiner 126, for preventing fiber pump diodes 122 and 128 from being destroyed by the amplified beam of light. Input combiner 120 is optically coupled with pump diode 122, EYDF 124 and band pass filter 118. EYDF 124 is optically coupled with output combiner 126. Pump diode 128 is optically coupled with output combiner 126. Fiber optic cable 130₃ optically couples fiber pump diode 122 to input combiner 120. Fiber optic cable 130₄ optically couples input combiner 120 with output combiner 126. Fiber optic cable 130₅ optically couples fiber pump diode 128 with output combiner 126. In general, as mentioned above, all the components in fiber laser 100 are coupled by fiber optic cables, although in particular, an EYDF and fiber pump diodes are optically coupled within a fiber laser via fiber optic cables. It is noted that the choice of an EYDF for booster stage 106 is significant erbium-ytterbium co-doped fibers absorb and transfer energy differently than erbium doped fibers or ytterbium doped fibers. Whereas both erbium doped fibers and ytterbium doped fibers can be pumped directly, erbium-ytterbium co-doped fibers are pumped indirectly. In erbium-ytterbium co-doped fibers, ytterbium ions absorb energy and transfer that energy to erbium ions. The erbium ions will then only begin to become excited and emit laser radiation when a threshold amount of energy has been absorbed by the ytterbium ions and transferred to them. The indirect pumping of erbium-ytterbium co-doped fibers enables booster stage 106 to amplify the double amplified beam of light a third time without damage to the components of booster stage 106 by limiting the amount of energy amplified in EYDF 124 by way of the threshold amount of energy erbium ions require to amplify energy.

Fiber pump diodes 122 and 128 can each be low cost fiber coupled laser diodes. EYDF 124 includes a double clad erbium-ytterbium fiber that can be pumped from both ends. EYDF 124 is a multimode fiber amplifier. It is noted that EDF 110, which as is a single mode fiber amplifier, transfers the amplified beam of light to EYDF 124 which is a multimode fiber amplifier. By transferring energy in preamplifier stage 104 from a single mode to a multimode in booster stage 106, energy transfer from preamplifier stage 104 to booster stage 106 is maintained at an efficient level and the occurrence of light energy in booster stage 106 traveling back into preamplifier stage 104 is prevented. Fiber pump diodes 122 and 128 each generate a beam of light, for pumping EYDF 124, on the order of tens of watts, for example a beam of light having an energy ranging up to 30 watts. The operational wavelength of the beam of light generated by fiber pump diodes 122 and 128 may be on the order of hundreds of nanometers, for example 920 nm, 940 nm, 960 nm or 980 nm. In general, the operational wavelengths of fiber pump diodes 122 and 128 range from 910 nm to 985 nm. In one embodiment of the disclosed technique, the operational wavelengths of fiber pump diodes 122 and 128 range from either 915 nm to 930 nm or 940 nm to 960 nm. These ranges possess wide absorption spectra. Input combiner 120 and output combiner 126 each include collimating and focusing lenses, dichroic mirrors and protective filters (none shown). The collimating and focusing lenses are used for properly focusing and directing the output beam of light. The dichroic mirrors are used for combining the beam of light with beams of light generated by fiber pump diodes 122 and 128. The protective filters are for protecting fiber pump diodes 122 and 128 from laser light damage. It is noted that in general the length of EYDF 124 is suited to match the characteristic absorption length of such fibers. A change or increase in the length of EYDF 124 from the characteristic absorption length of erbium-ytterbium co-doped fibers by a factor as small as 2 may prevent or stop EYDF 124 from amplifying the double amplified beam of light. Since EYDF 124 is pumped from both ends, the length of EYDF 124 is selected to be double the characteristic absorption length of an erbium-ytterbium co-doped fiber, as each of fiber pump diodes 122 and 128 pumps one characteristic absorption length of EYDF 124. By doubling the length of EYDF 124, spontaneous emissions from EYDF 124 can be reabsorbed, heat removal from EYDF 124 is enhanced without the use of additional elements and the output power and energy of the doubly amplified beam of light which enters EYDF 124 is doubled as it is amplified a third time. Since EYDF is pumped from both ends, the energy, gain and temperature of EYDF 124 is homogenous over the length of EYDF 124. By maintaining a homogenous energy, gain and temperature over the length of EYDF 124, hole burning of the optical fibers of EYDF 124 is prevented.

Band pass filter 118 provides the double amplified beam of light to input combiner 120. Input combiner 120 provides the double amplified beam of light to EYDF 124, which will amplify the already double amplified beam of light a third time. This amplification is achieved by using fiber pump diodes 122 and 128, which pump EYDF 124 from both ends. Input combiner 120 and output combiner 126 each allow the beams of light produced by fiber pump diodes 122 and 128 to be combined with the double amplified beam of light such that it can be amplified a third time. It is noted that in booster stage 106, the double amplified beam of light is passed through EYDF 124 only once. Output combiner 126 output the triple amplified beam of light to an optical assembly (not shown), which transmits the beam of light towards a volume of interest. The average output power (i.e., amount of power per second) of the output beam of light, after being amplified thrice, can range from 5 to 10 watts, and the output peak power, of the output beam of light, can range from 100 watts to 100 kilowatts.

It is noted that additional pre-amplification stages (not shown) can be placed between preamplifier stage 104 and booster stage 106. In such an embodiment, each additional pre-amplification stage would include a circulator, an EDF, a WDM, a narrow band reflector and a pump diode. The circulator would be coupled with one end of the EDF, while the WDM would be coupled with the other end of the EDF. The pump diode would be coupled with the WDM. The narrow band reflector would be coupled with the WDM. Each additional preamplifier stage would be coupled by way of the respective circulator. The first additional preamplifier stage would be coupled with band pass filter 118 in preamplifier stage 104 by way of its circulator. The last additional preamplifier stage would be coupled with input combiner 120 in booster stage 106 by way of its circulator. Additional preamplifier stages would be coupled to one another by way of their respective circulators. In this embodiment, each additional preamplifier stage would provide a double pass amplification. In another embodiment of the additional preamplifier stages, each preamplifier stage would include a circulator, an EDF, two WDMs and two pump diodes. Each pump diode would be coupled with a WDM, with one WDM coupled to one side of the EDF and the other WDM coupled to the other side of the EDF. One of the WDM's would be coupled with the circulator. As mentioned above, additional preamplifier stages would be coupled to one another by way of their respective circulators. The first additional preamplifier stage would be coupled with band pass filter 118 in preamplifier stage 104 by way of its circulator. The last additional preamplifier stage would be coupled with input combiner 120 in booster stage 106 by way of its circulator. In a further embodiment of the additional preamplifier stages, each preamplifier stage would include an EDF, a WDM and a pump diode. The EDF would be coupled with the WDM. The pump diode would be coupled with the WDM. In this embodiment, each additional preamplifier stage would provide a single pass amplification. Each additional preamplifier stage would be coupled by way of its respective EDF and WDM. The first additional preamplifier stage would be coupled with band pass filter 118 in preamplifier stage 104 by way of its EDF. The last additional preamplifier stage would be coupled with input combiner 120 in booster stage 106 by way of its WDM. Additional preamplifier stages would be coupled to one another by way of their respective EDF and WDM. The WDM of a first additional preamplifier stage would be coupled to the EDF of a second additional preamplifier stage.

Figure 1C:
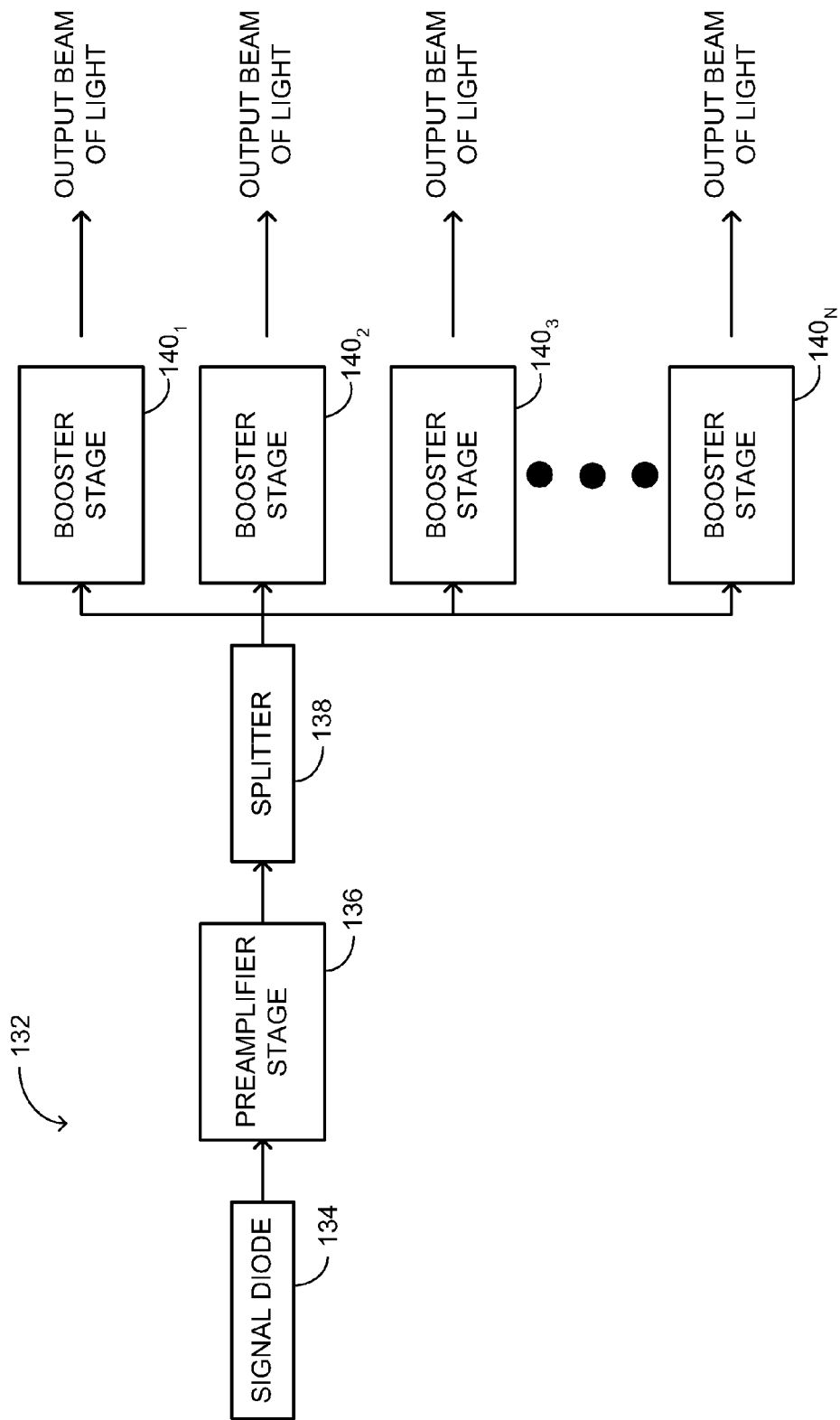
FIG. 1C is a schematic illustration of the fiber laser of FIG. 1A, constructed and operative in accordance with a further embodiment of the disclosed technique.

Reference is now made to FIG. 1C, which is a schematic illustration of the fiber laser of FIG. 1A, generally referenced 132, constructed and operative in accordance with a further embodiment of the disclosed technique. Fiber laser 132 includes a signal diode 134, a preamplifier stage 136, a splitter 138 and booster stages $140_1$, $140_2$, $140_3$ and $140_N$. Signal diode 134 is coupled with preamplifier stage 136, which is in turn coupled with splitter 138. Splitter 138 is coupled with each of booster stages $140_1$, $140_2$, $140_3$ and $140_N$. Signal diode 134 is substantially similar to signal diode 102 (FIG. 1B). Preamplifier stage 136 is substantially similar to preamplifier stage 104 (FIG. 1B) in terms of its components. Each of booster stages $140_1$, $140_2$, $140_3$ and $140_N$ is similar to booster stage 106 (FIG. 1B) in terms of its components. Splitter 138 can be a fiber splitter or a 1×N coupler.

Signal diode 134 generates a low energy beam of light, on the order of tens of microwatts. Preamplifier stage 136 then amplifies the low energy beam of light twice, and sends the double amplified beam of light to splitter 138. Splitter 138 splits the double amplified beam of light into N double amplified beams of light, providing each split double amplified beam of light to one of booster stages $140_1$, $140_2$, $140_3$ and $140_N$. Each of booster stages $140_1$, $140_2$, $140_3$ and $140_N$ further amplifies its respective double amplified beam of light and outputs the beam of light towards a respective optical assembly (not shown) which directs and focuses each respective beam of light towards a volume of interest. The beams of light outputted by each respective optical assembly can be directed towards different segments of a volume of interest, thereby increasing the size of the volume of interest which can be scanned and searched. The beams of light outputted by each respective optical assembly can also be directed towards similar segments of a volume of interest, thereby overlapping and increasing the amount of output power used to scan and search the volume of interest.

Figure 2:
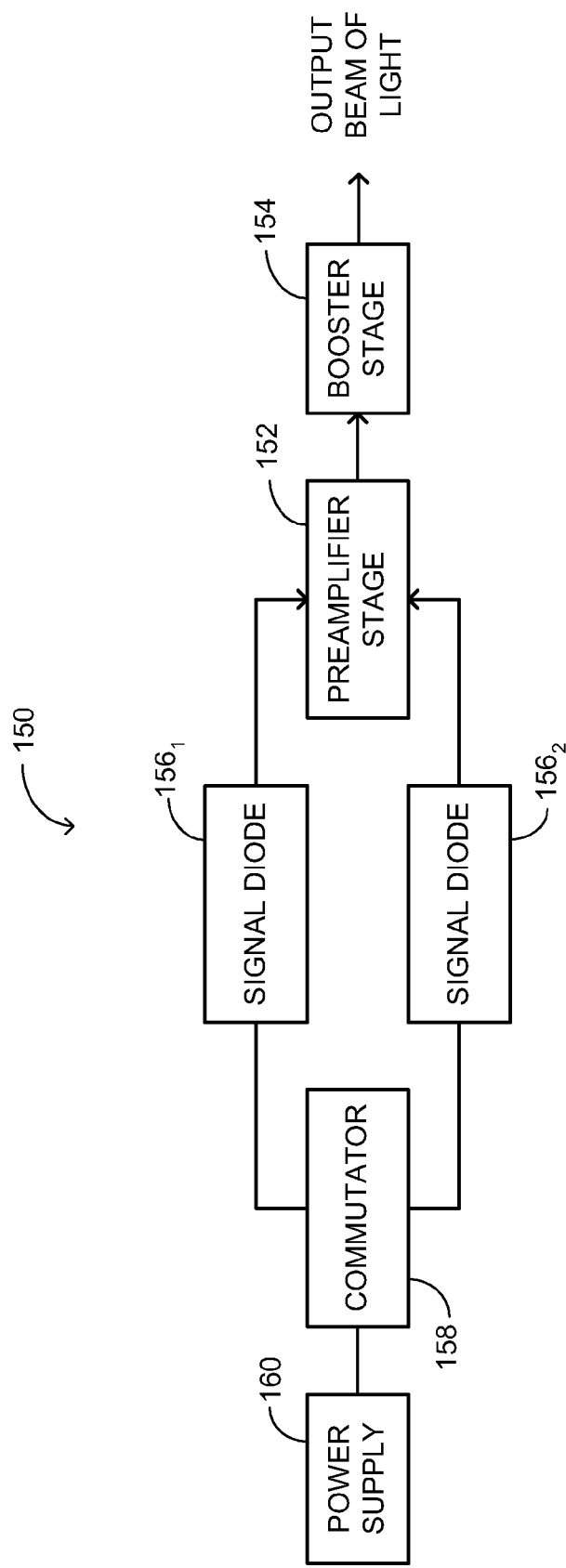
FIG. 2 is a schematic illustration of another fiber laser, constructed and operative in accordance with another embodiment of the disclosed technique.

Reference is now made to FIG. 2, which is a schematic illustration of another fiber laser, generally referenced 150, constructed and operative in accordance with a further embodiment of the disclosed technique. Fiber laser 150 includes a preamplifier stage 152, a booster stage 154, two signal diodes $156_1$ and $156_2$, a commutator 158 and a power supply signal diode driver 160. In an embodiment of the disclosed technique, fiber laser 150 includes a plurality of signal diodes, each optically coupled with preamplifier stage 152 and commutator 158. Booster stage 154 includes an output combiner and a fiber pump diode (both not shown), for transmitting the output beam of light. It is noted that booster stage 154 is an optional component. In an embodiment of the disclosed technique where booster stage 154 is not included, preamplifier stage 152 includes the output combiner and the fiber pump diode (both not shown), for transmitting the output beam of light. Preamplifier stage 152 can be constructed like preamplifier stage 104 (FIG. 1B).

Booster stage 154 can be constructed like booster stage 106 (FIG. 1B). Preamplifier stage 152 is optically coupled with booster stage 154. Signal diodes 156$_1$ and 156$_2$ are each optically coupled with preamplifier stage 152. Commutator 158 is coupled with each of signal diodes 156$_1$ and 156$_2$. Power supply signal diode driver 160 is coupled with commutator 158.

Signal diodes 156$_1$ and 156$_2$ each generate a distinct pulsed beam of light. In one embodiment of the disclosed technique, the pulsed beams of light generated by signal diodes 156$_1$ and 156$_2$ have the same wavelength, pulse width and pulse frequency (the pulse frequency being the frequency at which the pulsed beam of light is transmitted), being separated in time. In this embodiment, the pulsed beams of light generated by each of signal diodes 156$_1$ and 156$_2$ are provided to preamplifier stage 152 at different times. The time difference between when the pulsed beams of light are each provided to preamplifier stage 152 can range between ten to hundreds of microseconds. In general, the time difference is related to the time it takes a vehicle, mounted with a fiber laser like fiber laser 150, to change its LOS, which can take anywhere from a few milliseconds to hundreds of milliseconds.

In another embodiment of the disclosed technique, the pulsed beams of light generated by signal diodes 156$_1$ and 156$_2$ are distinct only in wavelength, with signal diode 156$_1$ generating a pulsed beam of light at wavelength $\lambda_1$, and signal diode 156$_2$ generating a pulsed beam of light at wavelength $\lambda_2$. In a further embodiment of the disclosed technique, the pulsed beams of light generated by signal diodes 156$_1$ and 156$_2$ are distinct only in pulse width, with each of signal diodes 156$_1$ and 156$_2$ generating pulsed beams of light with different pulse widths. In another embodiment of the disclosed technique, one of the signal diodes generates a pulsed beam of light which is a single frequency beam of light, while the other signal diode generates a pulsed beam of light which is a multi-frequency beam of light. A single frequency beam of light refers to a beam of light having a single longitudinal mode, whereas a multi-frequency beam of light refers to a beam of light with multiple modes.

It is noted that in this embodiment of the disclosed technique, a single frequency fiber laser or a solid state laser can be substituted for the signal diode generating the single frequency beam of light. Furthermore, a fiber laser oscillator or a solid state laser oscillator, such as a microchip laser, can be substituted for the signal diode generating the multi-frequency beam of light. In a further embodiment of the disclosed technique, the pulsed beams of light generated by signal diodes 156$_1$ and 156$_2$ are distinct only in amplitude, with each of signal diodes 156$_1$ and 156$_2$ generating pulsed beam of light with different amplitudes. In another embodiment of the disclosed technique, the pulsed beams of light generated by signal diodes 156$_1$ and 156$_2$ are distinct only in types of polarization, with each of signal diodes 156$_1$ and 156$_2$ generating pulsed beam of light with a different type of polarization.

It is noted that the different types of polarizations can include linear and circular polarizations, as well as different specific configurations of polarization. In each of the above mentioned embodiments regarding the distinct nature of each of pulsed beams of light, one pulsed beam of light can be significantly lower in output peak power than the other pulsed beam of light. For example, the pulsed beam of light generated by signal diode 156$_1$ may be 30 to 40 dB weaker than the pulsed beam of light generated by signal diode 156$_2$. Furthermore, as explained below, in some of the above mentioned embodiments regarding the distinct nature of each of the pulsed beams of light, the two pulsed beams of light are always separated in time and are therefore not transmitted simultaneously.

The pulsed beams of light generated by signal diodes 156$_1$ and 156$_2$ are each provided, in turn, to preamplifier stage 152, which amplifies each of the pulsed beams of light twice. The amplified pulsed beams of light are then provided to booster stage 154, which further amplifies the pulsed beams of light. Booster stage 154 then outputs the amplified pulsed beams of light. In the embodiment where booster stage 154 is not included, preamplifier stage 152 outputs the amplified pulsed beams of light.

In theory, if more than one signal diode were to be used in a fiber laser, where each signal diode generates pulsed beams of light which differ significantly in output peak power, then each signal diode would need to have its own power supply signal diode driver. Each power supply signal diode driver would then be used for providing the specific amount of energy to a single signal diode to generate a pulsed beam of light at a particular energy level. In the disclosed technique, only power supply signal diode driver 160, which is a single power supply signal diode driver, is used to supply specific amounts of energy to each of signal diodes 156$_1$ and 156$_2$. In the disclosed technique, commutator 158 allows each of signal diodes 156$_1$ and 156$_2$ to draw a particular amount of energy from power supply signal diode driver 160. As such, signal diodes 156$_1$ and 156$_2$ can each generate pulsed beams of light at significantly different levels of energy, using only a single power supply signal diode driver.

It is noted that commutator 158 can only provide a particular energy level from power supply signal diode driver 160 to a single signal diode at a particular moment in time. Therefore, the pulsed beams of light generated by signal diodes 156$_1$ and 156$_2$ will be separated in time. In a further embodiment of the disclosed technique, the pulsed beams of light generated by signal diodes 156$_1$ and 156$_2$ are generated simultaneously. In this embodiment, the output peak power of the pulsed beams of light generated by each of the signal diodes can differ if each signal diode has a different output peak power. Therefore, even though commutator 158 will simultaneously provide each of signal diodes 156$_1$ and 156$_2$ with the same amount of energy, signal diodes 156$_1$ and 156$_2$ can each generate a pulsed beam of light having a distinct output peak power. It is noted that in general, commutator 158 is operative at a duty cycle on the order of microseconds.

Therefore, spacing between pulsed beams of light generated by signal diodes 156$_1$ and 156$_2$ will be on the order of microseconds. It is further noted that in general, the pulse width of the pulsed beams of light generated by signal diodes 156$_1$ and 156$_2$ is on the order of nanoseconds, ranging from a few nanoseconds to thousands of nanoseconds.

As mentioned above with reference to FIG. 1A, in order for a receiver to receive reflections from hard-to-resolve objects, like antennas, electrical wires, telephones cables, and the like, a fiber laser needs to emit narrow diameter light beams of high energy, where the output peak power of the fiber laser is on the order of tens of kilowatts. Such a high level of energy is required in order to resolve obstacles which may be on the order of millimeters from distances on the order of kilometers. If such a high level of energy were to reflect from an object having a surface of high reflectance, such as a retroreflector, which is any object that can reflect a beam of light directly back towards a receiver at substantially the same energy level the beam of light was originally transmitted at, the receiver would most certainly burn-out from the large amount of energy impinging upon its surface.

For example, if the output peak power of a beam of light emerging from the fiber laser is 10 kilowatts, then the output peak power of the reflected beam of light, reflected from a retro-reflector, could be 1 to 10,000 watts. This amount of very high energy could easily burn-out a receiver, thereby rendering system 50 (FIG. 1A) not operational. In order to protect the receiver in system 50 from burning out, a fiber laser, constructed like fiber laser 150, is used in system 50, as described with reference to FIGS. 3A, 3B and 3C. It is noted that the fiber laser used in system 50, as described with reference to FIGS. 3A, 3B and 3C, in one embodiment, can be replaced by a solid state laser, and in another embodiment, can be replaced by a semiconductor laser configured in a master oscillator power amplifier approach.

Figure 3A:
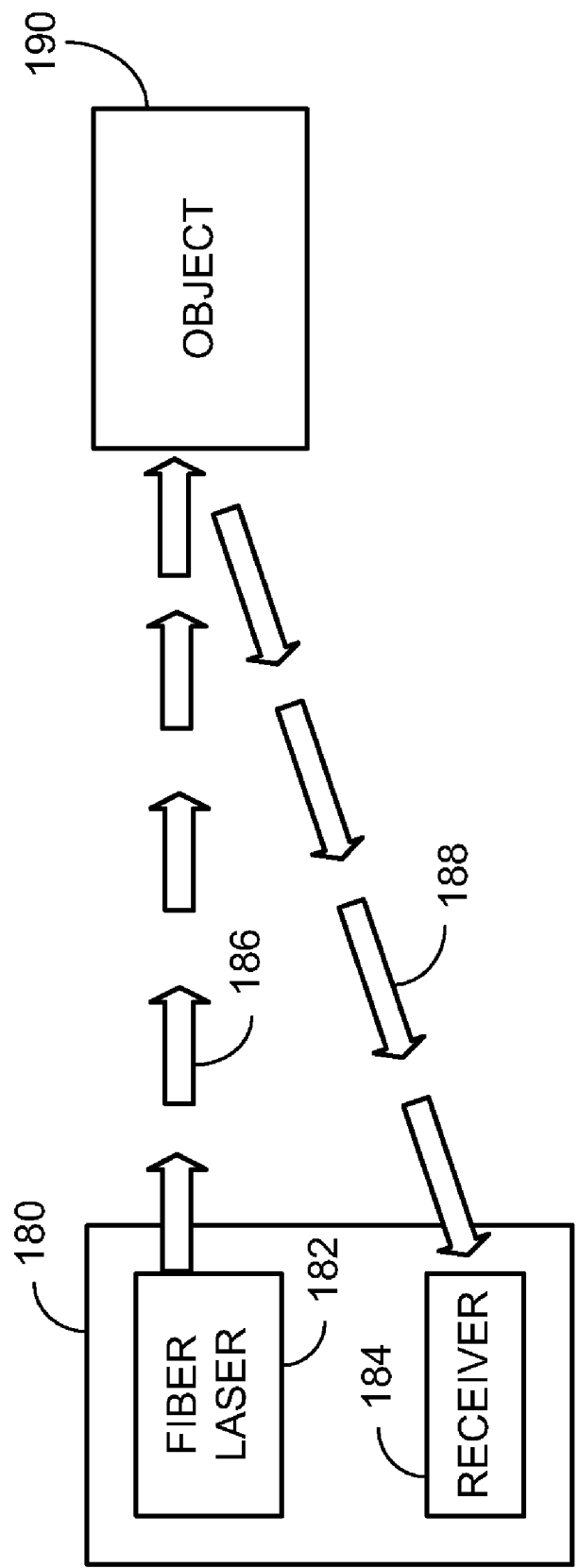
FIG. 3A is a schematic illustration of a system, constructed and operative in accordance with a further embodiment of the disclosed technique, used in the presence of an object having high reflectance.

Reference is now made to FIG. 3A, which is a schematic illustration of a system generally referenced 180, constructed and operative in accordance with a further embodiment of the disclosed technique, depicting how system 180 operates in the presence of an object having high reflectance. In the presence of such an object, system 180 may enter a situation of receiver burn-out. System 180 includes a fiber laser 182 and a receiver 184. Fiber laser 182 is constructed and operative in a manner similar to fiber laser 150 (FIG. 2). Receiver 184 is constructed and operative to receive reflections of pulsed beams of light emitted from fiber laser 182 which are reflected from objects in a volume of interest in front of system 180. Fiber laser 182 can send out two different pulsed beams of light, one with a high level of energy and one with a low level of energy.

FIG. 3A shows how receiver 184 can burn-out if a high level pulsed beam of light is used to detect objects in the volume of interest in front of system 180. Fiber laser 182 generates a high energy pulsed beam of light 186 (thick arrows), in order to detect hard-to-see objects in the volume of interest of system 180. Instead of impinging upon a hard-to-see object, high energy pulsed beam of light 186 impinges upon an object 190 having a surface of high reflectance. For example, object 190 could be a retro-reflector, like a stop sign, whose surface is coated with retro-reflective materials. Because of its ability to reflect light beams impinging upon its surface at substantially the same energy level the light beams were originally transmitted at, object 190 reflects high energy pulsed beam of light 186 as a high energy pulsed beam of light 188 (thick arrows), with almost no loss in the energy level of high energy pulsed beam of light 188 as compared with the energy level of high energy pulsed beam of light 186. High energy pulsed beam of light 188 can be on the order of hundreds or thousands of watts.

If high energy pulsed beam of light 188 impinges upon receiver 184, then receiver 184 will burn-out. Therefore, if high energy pulsed beam of light 186 is used to detect hard-to-see objects, then system 180 runs the risk of burning out receiver 184 if an object having high reflectance is located in the volume of interest in front of system 180.

Figure 3B:
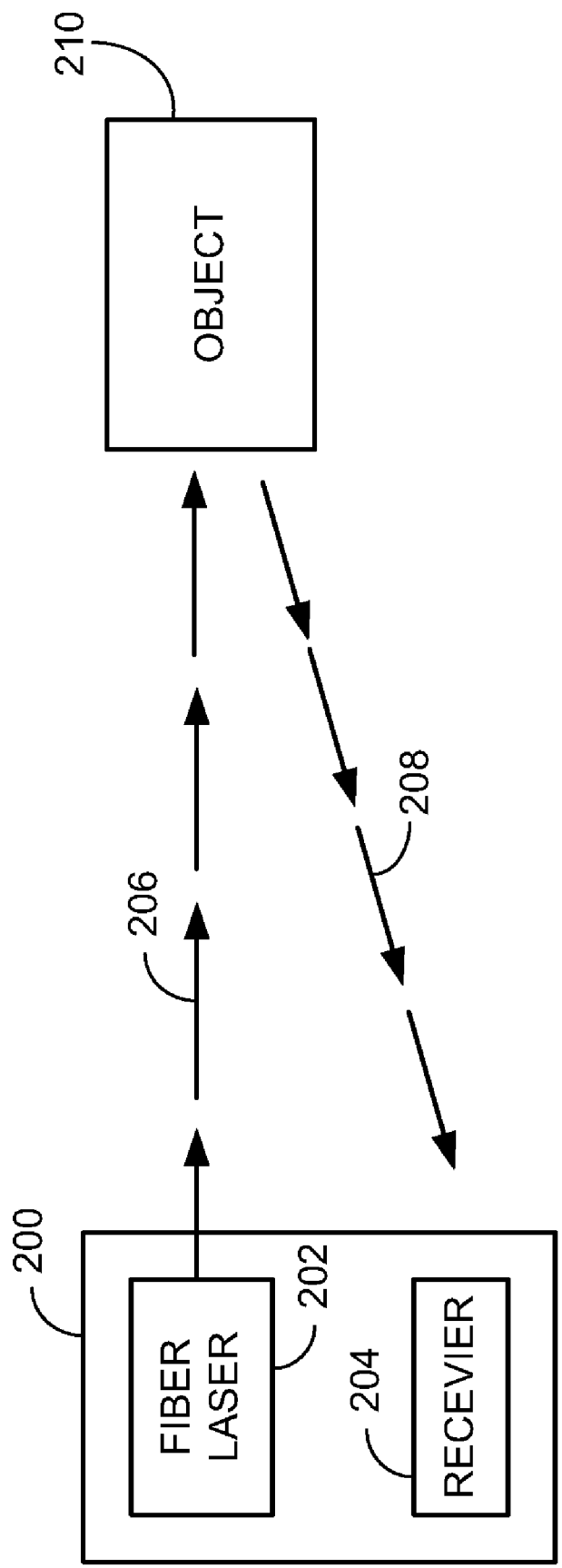
FIG. 3B is a schematic illustration of the system of FIG. 3A, constructed and operative in accordance with another embodiment of the disclosed technique, used in the presence of an object having high reflectance.

Reference is now made to FIG. 3B, which is a schematic illustration of the system of FIG. 3A, generally referenced 200, constructed and operative in accordance with another embodiment of the disclosed technique, depicting how system 200 operates in the presence of an object having high reflectance. System 200 includes a fiber laser 202 and a receiver 204. Fiber laser 202 is constructed and operative in a manner similar to fiber laser 150 (FIG. 2). Receiver 204 is constructed and operative to receive reflections of pulsed beams of light emitted from fiber laser 202 which are reflected from objects in a volume of interest in front of system 200. Fiber laser 202 can send out two different pulsed beams of light, one with a high level of energy and one with a low level of energy.

FIG. 3B shows how receiver 204 can be protected from burn-out if a low level pulsed beam of light is used to detect objects in the volume of interest in front of system 200. Fiber laser 202 generates a low energy pulsed beam of light 206 (thin arrows), in order to detect hard-to-see objects in the volume of interest of system 200. Instead of impinging upon a hard-to-see object, low energy pulsed beam of light 206 impinges upon an object 210 having a surface of high reflectance. For example, object 210 could be a retro-reflector such as a stop sign whose surface is coated with retro-reflective materials. Because of its ability to reflect light beams impinging upon its surface at substantially the same energy level the light beams were originally transmitted at, object 210 reflects low energy pulsed beam of light 206 as a low energy pulsed beam of light 208 (thin arrows). Low energy pulsed beam of light 208 has enough energy to reflect all the way back to receiver 204.

Since low energy pulsed beam of light 202 has a low output peak power, low energy pulsed beam of light 208 will not be powerful enough to burn-out receiver 204, and receiver 204 can detect and receive low energy pulsed beam of light 208. Therefore, if low energy pulsed beam of light 206 is used to detect hard-to-see objects, system 200 will never run the risk of burning out receiver 204 if an object of high reflectance is located in the volume of interest in front of system 200. On the other hand, if no objects having high reflectance are located in the volume of interest in front of system 200, then low energy pulsed beam of light 206 will not be reflected back towards receiver 204, as any reflections from hard-to-see objects from low energy pulsed beam of light 206 will dissipate before reaching receiver 204. This is explained in further detail with reference to FIG. 3C.

Figure 3C:
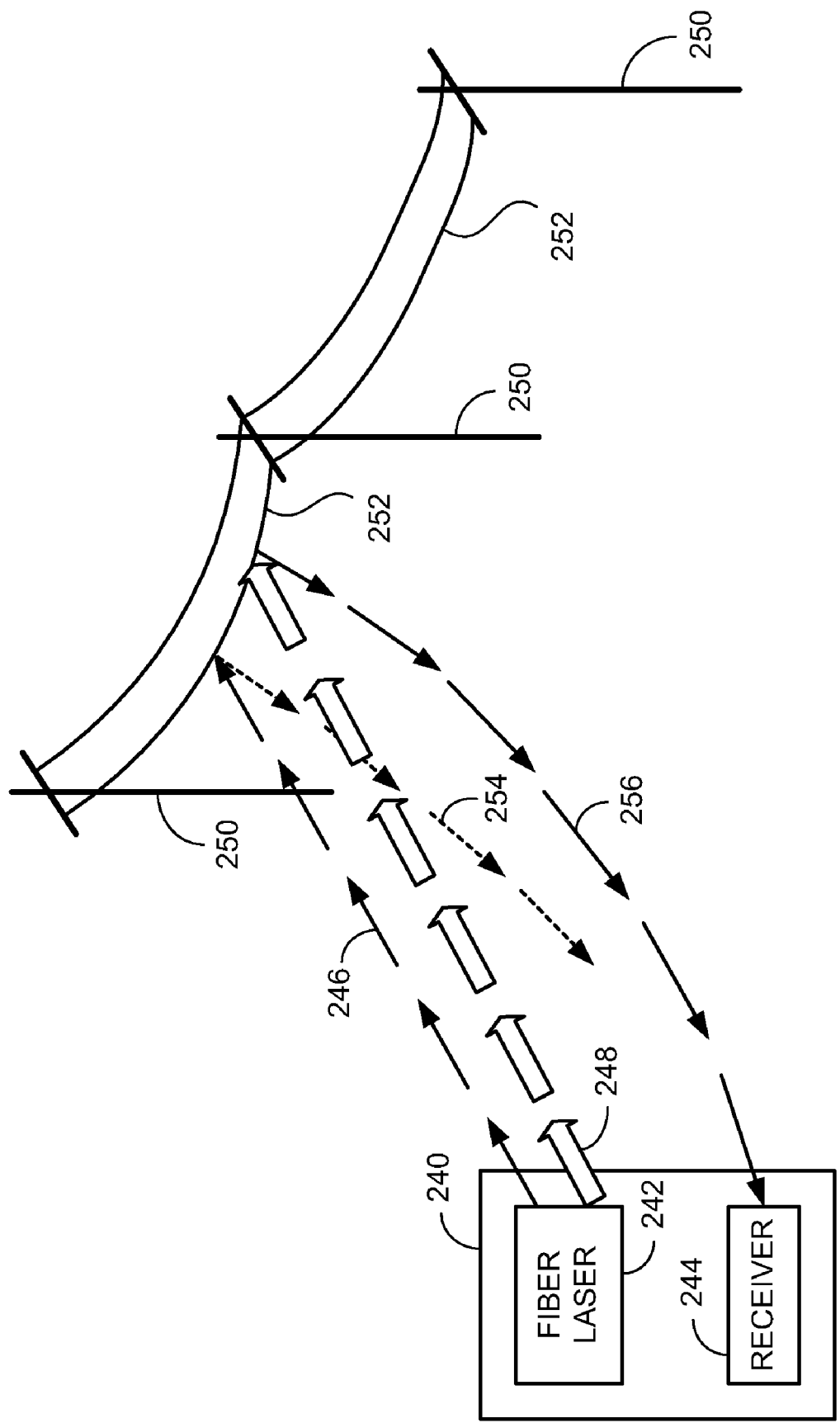
FIG. 3C is a schematic illustration of the system of FIG. 3A, constructed and operative in accordance with a further embodiment of the disclosed technique, depicting a wire detection operation.

Reference is now made to FIG. 3C, which is a schematic illustration of a system, generally referenced 240, constructed and operative in accordance with a further embodiment of the disclosed technique, which depicts a wire detection operation. FIG. 3C also depicts how receiver burn-out is avoided and prevented in system 240. System 240 includes a fiber laser 242 and a receiver 244. Fiber laser 242 is constructed and operative in a manner similar to fiber laser 150 (FIG. 2). Receiver 244 is constructed and operative to receive reflections of pulsed beams of light emitted from fiber laser 242 which are reflected from objects in a volume of interest in front of system 240. Fiber laser 242 can send out two different pulsed beams of light, a low energy pulsed beam of light 246 (thin arrows) and a high energy pulsed beam of light 248 (thick arrows). Low energy pulsed beam of light 246 and high energy pulsed beam of light 248 are sent towards power lines 252, which are suspended between posts 250.

In order to prevent the burn-out of receiver 244, system 240 first transmits low energy pulsed beam of light 246, and waits to see if receiver 244 receives a reflection from objects in the volume of interest in front of system 240. When low energy pulsed beam of light 246 is reflected from power lines 252, a pulsed beam of light 254 (dotted arrows) is reflected back towards receiver 244. Since power lines 252 are very thin and are not highly reflective objects, pulsed beam of light 254 is significantly lower in energy than low energy pulsed beam of light 246. In fact, pulsed beam of light 254 is so low in energy that it dissipates before it is received by receiver 244.

After a waiting period, ranging from a few microseconds to hundreds of microseconds, if receiver 244 does not receive pulsed beam of light 254 (which it will not, from hard-to-see objects), or if the energy level of a reflected pulsed beam of light does not exceed a predetermined threshold, then fiber laser 242 sends out high energy pulsed beam of light 248. When high energy pulsed beam of light 248 is reflected from power lines 252, a pulsed beam of light 256 (thin arrows) is reflected back towards receiver 244. Since power lines 252 are very thin and are not highly reflective objects, pulsed beam of light 256 is significantly lower in energy than high energy pulsed beam of light 248. The energy level of pulsed beam of light 256 is high enough such that receiver 244 will be able to receive and detect it.

Since receiver 244 did not receive pulsed beam of light 254, system 240 operates under the assumption that no objects having high reflectance are located in its volume of interest. Therefore, fiber laser 242 can safely transmit high energy pulsed beam of light 248 in order to detect hard-to-see objects, with no risk of self burn-out. If an object having high reflectance is located in the volume of interest in front of system 240, then receiver 244 will receive a reflected pulsed beam of light of low energy pulsed beam of light 246. If an object having high reflectance is located beyond the volume of interest in front of system 240, then receiver 244 will also receive a reflected pulsed beam of light of low energy, as reflections coming from such a distance will impinge upon receiver 244 as low energy beams of light. The energy of low energy pulsed beam of light 246 is such that it will not cause the burn-out of receiver 244. System 240 will then not transmit high energy pulsed beam of light 248.

When the LOS of system 240 changes, system 240 will again first transmit low energy pulsed beam of light 246, and wait to see if receiver 244 receives a reflection from objects in the volume of interest in front of system 240, before transmitting high energy pulsed beam of light 248. Changes in the LOS of system 240 can be determined by a motion detector (not shown), coupled with system 240. System 240 therefore prevents receiver 244 from burning out, by determining the power ratio between a transmitted beam of light and its respectively detected reflected beam of light. The power ratio is defined as the intensity of the detected reflected beam of light to the intensity of the transmitted beam of light. This power ratio will be essentially the same for high energy as well as low energy beams of light. When the laser beam is reflected from objects having high reflectance or close proximity low absorption objects, this ratio is significantly high which means that a reflected high power laser beam might cause receiver burn-out. Accordingly, the system further determines a receiver burn-out threshold, under which it is safe to transmit high power laser beams.

It is also noted that, in general, the volume of interest is defined as a volume beyond which even high energy pulsed beams of light reflecting from objects having high reflectance will impinge upon receiver 244 as low energy pulsed beams of light. Therefore, if a high energy pulsed beam of light is transmitted and no objects having high reflectance are located in the volume of interest, but objects having high reflectance are located beyond the volume of interest, then even if the high energy pulsed beam of light reflects from such an object, receiver burn-out will be prevented, as the received reflected pulsed beam of light will be of low energy.

Since system 240 transmits a low energy beam of light first, if the power ratio exceeds the receiver burn-out threshold (e.g., the power ratio is close to one, which resulted when the low energy beam of light most probably reflected from an object having high reflectance), then system 240 will not transmit the high energy beam and the next transmitted laser beam shall be a low energy one. Accordingly, system 240 transmits low power beams of light until the power ratio is lower than the receiver burn-out threshold (e.g., when an object having high reflectance is not present in the LOS of system 240, either by changing the LOS of the system or the object moved away from the current LOS). If the power ratio does not exceed the receiver burn-out threshold then system 240 will transmit the high energy beam of light, in the same direction the low energy beam of light was transmitted, in order to detect hard-to-see objects and obstacles located in the volume of interest of system 240.

Figure 4:
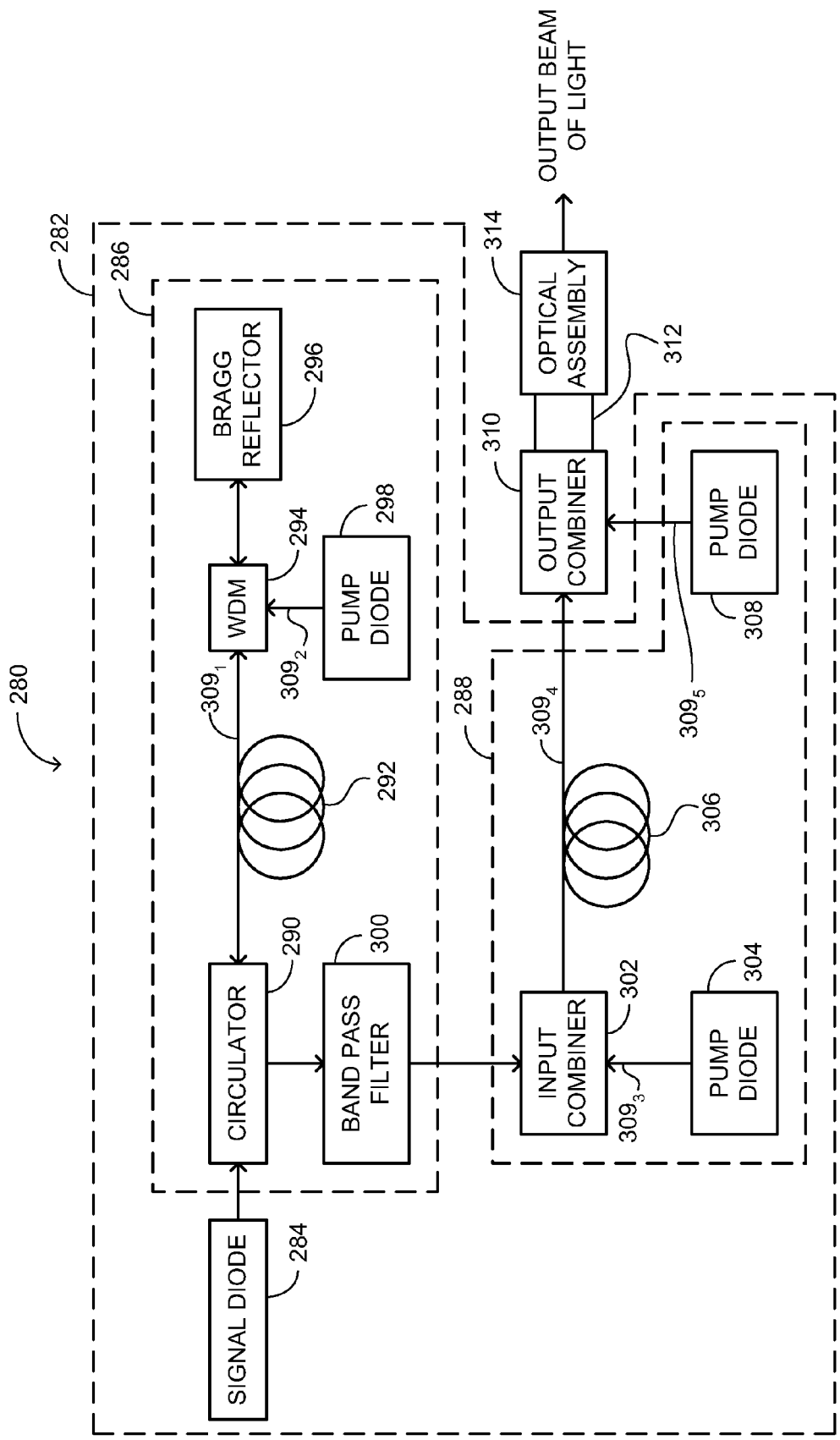
FIG. 4 is a schematic illustration of a system, constructed and operative in accordance with another embodiment of the disclosed technique, depicting a floating output combiner.

Reference is now made to FIG. 4, which is a schematic illustration of a system, generally referenced 280, constructed and operative in accordance with another embodiment of the disclosed technique. System 280 depicts a floating output combiner. System 280 includes a fiber laser 282, an output combiner 310, an interface 312 and an optical assembly 314. Fiber laser 282 is optically coupled with output combiner 310. Output combiner 310 is optically coupled with interface 312. Interface 312 is coupled with optical assembly 314. Interface 312 can be an opto-mechanical interface. It is noted that output combiner 310 is not necessarily physically attached to fiber laser 282.

Fiber laser 282 includes a signal diode 284, a preamplifier stage 286 and a booster stage 288. Signal diode 284 is optically coupled with preamplifier stage 286, and preamplifier stage 286 is optically coupled with booster stage 288. In general, all the components in a fiber laser are optically coupled by fiber optic cables. It is noted that all the components of fiber laser 282 are similar to like components found in fiber laser 100 (FIG. 1B). It is also noted that booster stage 288 is an optional component. In general, signal diode 284 generates a low energy beam of light, on the order of tens of microwatts. Preamplifier stage 286 then amplifies the low energy beam of light twice, and sends the double amplified beam of light to booster stage 288. Booster stage 288 further amplifies the double amplified beam of light and outputs the beam of light towards optical assembly 314 which directs and focuses the beam of light towards a volume of interest.

Preamplifier stage 286 includes a circulator 290, an EDF 292, a WDM 294, a narrow band Bragg reflector 296, a fiber pump diode 298, a band pass filter 300 and fiber optic cables 309$_1$ and 309$_2$. Circulator 290 is optically coupled with signal diode 284, EDF 292 and with band pass filter 300. EDF 292 is optically coupled with WDM 294. WDM 294 is optically coupled with both narrow band Bragg reflector 296 and with fiber pump diode 298. Fiber optic cable 309$_1$ optically couples EDF 292 to circulator 290 and WDM 294. Fiber optic cable 309$_2$ optically couples fiber pump diode 298 to WDM 294. In general, as mentioned above, all the components in fiber laser 282 are optically coupled by fiber optic cables, although in particular, an EDF and a fiber pump diode are optically coupled within a fiber laser via fiber optic cables. It is noted that band pass filter 300 is an optional component.

Circulator 290 receives the low energy beam of light generated by signal diode 284. Circulator 290 then directs the low energy beam of light, via fiber optic cable 309$_1$ towards EDF 292. EDF 292 amplifies the low energy beam of light. This amplification is achieved by using fiber pump diode 298, which pumps EDF 298 via WDM 294. Fiber pump diode 298 generates a beam of light, for pumping EDF 292, on the order of hundreds of milliwatts. WDM 294 allows EDF 292 to receive the beam of light generated from fiber pump diode 298 without interference from the low energy beam of light being amplified by EDF 292. WDM 294 provides the amplified beam of light to narrow band Bragg reflector 296, which reflects the amplified beam of light back to WDM 294, which in turn, reflects the amplified beam of light back through EDF 292 a second time. Narrow band Bragg reflector 296 ensures that only the amplified beam of light generated by signal diode 284 is reflected back through EDF 292 and none of the beam of light generated by fiber pump diode 298.

Circulator 290 directs the double amplified beam of light towards band pass filter 300. Band pass filter 300 only allows the beam of light emitted from signal diode 284 to pass there through.

Booster stage 288 includes an input combiner 302, a fiber pump diode 304, an EYDF 306, a fiber pump diode 308 and fiber optic cables $309_3$, $309_4$ and $309_5$. Input combiner 302 is optically coupled with pump diode 304, EYDF 306 and with band pass filter 300. Fiber optic cable $309_3$ optically couples fiber pump diode 304 to input combiner 302. In general, as mentioned above, all the components in fiber laser 100 are optically coupled by fiber optic cables, although in particular, an EYDF and fiber pump diodes are optically coupled within a fiber laser via fiber optic cables. Fiber pump diodes 304 and 308 each generate a beam of light, for pumping EYDF 306, on the order of tens of watts.

Band pass filter 300 provides the double amplified beam of light to input combiner 302. Input combiner 302 provides the double amplified beam of light to EYDF 306, which will amplify the already double amplified beam of light a third time. This amplification is achieved by using fiber pump diodes 304 and 308, which pump EYDF 306 from both ends. Input combiner 302 allows the beam of light produced by fiber pump diode 304 to be combined with the double amplified beam of light such that it can be amplified a third time. It is noted that in booster stage 288, the double amplified beam of light is passed through EYDF 306 only once.

EYDF 306 is optically coupled with output combiner 310 via fiber optic cable $309_4$. In another embodiment of the disclosed technique, EYDF 306 can also be coupled with output combiner 310 directly. Pump diode 308 is optically coupled with output combiner 310 via fiber optic cable $309_5$. Output combiner 310 outputs the triple amplified beam of light to interface 312, which provides the triple amplified beam of light to optical assembly 314, which transmits the beam of light towards a volume of interest. The average output power of the output beam of light, after being amplified thrice, can range from 5 to 10 watts.

In general, in prior art LIDAR systems, an output combiner is physically attached to a laser. If the output beam of light needs to be provided to another system, like an optical system, then the other system either has to be physically attached to the output combiner, or a delivery fiber needs to be used to provide the output beam of light from the output combiner to the other system. Physically attaching the other system to the output combiner can be bulky and cumbersome, as the laser may be relatively large. Furthermore, in this case, coupling the laser with an aiming sight would be impossible. Using a delivery fiber is also not ideal, as delivery fibers can cause losses in the output beam of light, increase the price of the LIDAR system and reduce the overall reliability of the LIDAR system.

According to the disclosed technique, output combiner 310 does not need to be physically attached to fiber laser 282, as fiber optic cables $309_4$ and $309_5$ couple EYDF 306 and fiber pump diode 308 to output combiner 310. Since fiber optic cables are thin, narrow and flexible, output combiner 310 can be distanced from fiber laser 282, and directly coupled with optical assembly 314. In general, since output combiner 310 is much lighter in weight than fiber laser 282, it is feasible to couple output combiner 310 with optical assembly 314, which could be, for example, an aiming sight. In this respect, the output beam of light of fiber laser 282 can be provided directly to optical assembly 314, in a cost efficient manner, without significant losses.

Reference is now made to FIG. 5A, which is a schematic illustration of a system, generally referenced 320, constructed and operative in accordance with a further embodiment of the disclosed technique. System 320 includes a fiber laser 324, a controller 325, a motion detector 326 and a vehicle 322. Fiber laser 324 is coupled with controller 325 which is coupled with motion detector 326. Fiber laser 324, controller 325 and motion detector 326 are each coupled with vehicle 322. Fiber laser 324 is constructed and operative in a manner similar to fiber laser 100 (FIG. 1B). Motion detector 326 can be any unit enabled to detect and determine the motion of vehicle 322, as well as the motion of fiber laser 324 with respect to vehicle 322. For example, motion detector 326 can be a gyroscope, an inertial navigation sensor (herein abbreviated INS) and the like, as is known in the art. It is noted that according to one embodiment of the disclosed technique, fiber laser 324 is firmly attached to vehicle 322.

According to another embodiment of the disclosed technique, fiber laser 324 is attached to a gimbals (not shown), where it is free to move in a plurality of directions, which is firmly attached to vehicle 322. In the embodiment where fiber laser 324 is firmly attached to vehicle 322, motion detector 326 detects and determines the motion of vehicle 322 with respect to the Earth. Motion detector 326 can also determine the position of vehicle 322 with respect to the Earth. In the embodiment where fiber laser 324 is attached to the gimbals, motion detector 326 detects and determines the motion of vehicle 322 as well as the motion of fiber laser 324 with respect to vehicle 322, which in turn is determined with respect to the Earth. Motion detector 326 can also determine the position of fiber laser 324 with respect to the Earth. In general, the angular orientation of the fiber laser with respect to the Earth is determined with high accuracy, for example, with an error on the order of one millirad, since the fiber laser is receiving reflections from, and hence creating images of, terrain, as well as objects on the terrain. In order to determine their respective positions on the Earth accurately, the angular orientation as well as the position of fiber laser 324 needs to be determined with high accuracy. In the description of FIGS. 5A, 5B, 6A and 6B, fiber laser 324 is firmly attached to vehicle 322, according to one embodiment of the disclosed technique. It is noted that the technique described in FIGS. 5A, 5B, 6A and 6B could analogously be applied to the embodiment where fiber laser 324 is attached to a gimbals.

System 320 is a LORD system. Fiber laser 324 scans a volume of interest (not shown) in front of system 320 using pulsed beams of light to detect obstacles, and in particular hard-to-see obstacles, which may be in the volume of interest. According to one embodiment of the disclosed technique, fiber laser 324 scans the volume of interest by moving the laser scanner (not shown) in a vehicle plane (not shown), as described in more detail in FIG. 5B. Motion detector 326 constantly detects the motion of vehicle 322, and provides a signal to controller 325 indicative of the motion and changes in the motion of vehicle 322 (i.e., velocity, acceleration, a change in speed and a change in the direction of motion). For example, motion detector 326 can provide an indication to controller 325 that vehicle 322 is moving in a straight direction, or that vehicle 322 is turning. Motion detector 326 can further provide a more detailed indication to controller 325 regarding the motion of vehicle 322, by determining the angular velocity and the angular acceleration of vehicle 322, the linear velocity and the linear acceleration of vehicle 322, as well as the rate of change in the direction of motion of vehicle 322 (i.e., the LOS of fiber laser 324).

One way of characterizing the pulsed beam of light is the frequency at which the pulses are transmitted to a volume of interest (i.e., not the frequency of radiation which is transmitted during each pulse). The frequency at which the pulses are transmitted can be referred to in numerous ways, for example, as the pulse rate and as the pulse repetition rate (herein abbreviated PRR) of the pulsed beam of light. The PRR can be defined as the number of pulses transmitted per unit time. An increase in the PRR of the pulsed beam of light means that more pulsed beams of light will be transmitted each time period, which requires more energy but which means that a larger area can be scanned per unit of time. A decrease in the PRR of the pulsed beam of light means that less pulsed beams of light will be transmitted each time period, which requires less energy but which also means that a smaller area can be scanned per unit of time. It is noted that with regards to FIGS. 5A, 5B, 6A, 6B and 13, the term PRR is used as an example, and can be replaced by other ways of referring to the frequency at which pulses are transmitted, for example, the pulse rate (i.e., the rate at which pulses are transmitted). As explained below, the PRR of fiber laser 324 can be adjusted according to the detected motion of vehicle 322. It is noted that, according to the disclosed technique, adjustments are made to the PRR in order to maintain the scan density of the pulsed beams of light if this is desired by the operator of vehicle 322.

In general, if vehicle 322 is traveling in a straight direction at low speeds (i.e., linear velocity is low), then a lower PRR can be used to scan the area in front of vehicle 322. As the linear velocity increases, an increase in the PRR is needed if the scan density (i.e., the number of pulsed beams of light transmitted to an area per unit time) is to remain constant. A decrease in the scan density means that the image received from the pulsed beams of light will be of lower resolution and quality, since fewer beams are transmitted to the scanned area per unit time. Also, as the angular velocity increases (e.g., as vehicle 322 executes a turn), the path of the vehicle becomes more determined, whereas if the angular velocity decreases (e.g., as vehicle 322 straightens out), the path of the vehicle becomes more uncertain. For example, if vehicle 322 is a helicopter traveling in a straight direction, then the likelihood of the helicopter changing course (i.e., moving left, right, up or down) is high compared to the situation of a helicopter which is already veering in a particular direction. In the latter situation, the likelihood is low that the helicopter will change its course before completing its current change of course. At high angular velocities, since the path of vehicle 322 becomes more determined, a smaller area can be scanned and therefore a lower PRR can be used. As the angular velocity of vehicle 322 decreases, a larger area needs to be scanned because of the increasing uncertainty of the path of the vehicle. Therefore, as the angular velocity of vehicle 322 decreases, a higher PRR should be used. It is noted that the operator of vehicle 322 is not limited to human beings. The operator can also be computer software written to autonomously operate vehicle 322. Information about obstacles in front of an operator is received from pulsed beams of light transmitted by fiber laser 324. In order to increase the energy efficiency of system 320, and to provide an operator with information about obstacles in front of her with enough time for her to avoid them, controller 325 adjusts the PRR of the pulsed beams of light transmitted by fiber laser 324 according to the detected motion of system 320.

Also, when vehicle 322 is traveling in a straight direction at high speeds (i.e., linear velocity is high), the output peak power of fiber laser 324 is increased by controller 325 so as to provide an increase in the detection range in front of vehicle 322 of system 320. Therefore, as the linear velocity increases, the PRR and the output peak power of fiber laser 324 increases, and as the linear velocity decreases, the PRR and the output peak power of fiber laser 324 also decreases. These adjustments to the PRR and the output peak power are further explained with reference to FIGS. 6A and 6B.

Reference is now made to FIG. 5B, which is a schematic illustration of a helicopter, generally referenced 328, mounted with the system 320 (FIG. 5A, not shown), constructed and operative in accordance with another embodiment of the disclosed technique. Helicopter 328 includes an operator 329, and a laser scanner 330 (which is part of system 320). Laser scanner 330 is enabled to scan in a 2-D plane 331, which can be referred to as the vehicle plane. The vehicle plane can be defined by the main longitudinal and latitudinal axes of helicopter 328. In FIG. 5B, vehicle plane 331 is perpendicular to the drawing sheet. As depicted by arrows $332_A$ and $332_B$, laser scanner 330 scans in a direction parallel to vehicle plane 331. FIG. 5B depicts helicopter 328 in three different positions, positions $335_A$, $335_B$ and $335_C$. In position $335_A$, vehicle plane 331 is parallel to a horizon 336. In position $335_B$, vehicle plane 331 forms an angle α (not shown), depicted by arrow 333, with horizon 336. In position $335_C$, vehicle plane 331 forms an angle β (not shown), depicted by arrow 334, with horizon 336. In positions $335_B$ and $335_C$, as helicopter 328 changes orientation, vehicle plane 331 changes orientation accordingly, as does laser scanner 330. According to the disclosed technique, vehicle plane 331, as depicted in FIG. 5B, is fixed in its orientation in relation to helicopter 328. According to an embodiment of the disclosed technique, the laser scanner only scans in the 2-D vehicle plane. According to another embodiment, the laser scanner can also scan outside the 2-D vehicle plane.

Figure 6A:
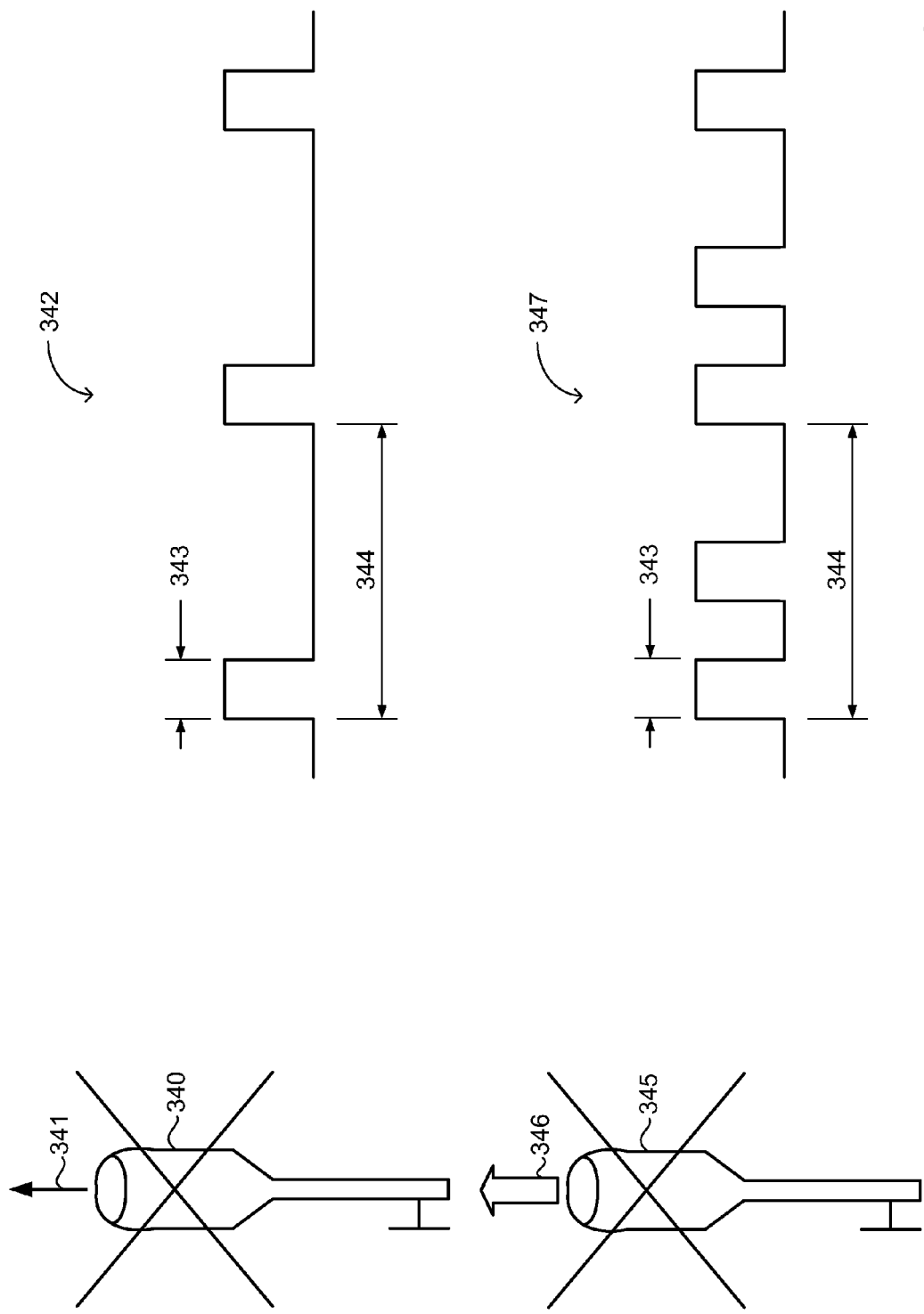
FIG. 6A is a schematic illustration of changes to the PRR as a function of the linear motion of a vehicle mounted with the system of FIG. 5A, constructed and operative in accordance with a further embodiment of the disclosed technique.

Reference is now made to FIG. 6A, which is a schematic illustration of changes to the PRR as a function of the linear motion of a vehicle mounted with system 320 (FIG. 5A), constructed and operative in accordance with a further embodiment of the disclosed technique. Each of vehicles 340 and 345 are mounted with system 320. Two pulsed beams of light 342 and 347, each transmitted by system 320, are schematically illustrated in FIG. 6A. Pulsed beam of light 342 corresponds to a pulsed beam of light transmitted from vehicle 340, and pulsed beam of light 347 corresponds to a pulsed beam of light transmitted from vehicle 345. Pulsed beam of lights 342 and 347 each have an individual pulse duration spanning a time duration 343 and a pulse period spanning a time duration 344. In FIG. 6A, vehicles 340 and 345 are depicted as helicopters. Helicopter 340 is moving in a straight direction at a low speed, as depicted by a thin arrow 341. Helicopter 345 is moving in a straight direction at a high speed, as depicted by a thick arrow 346. The linear and angular velocity and acceleration of helicopters 340 and 345 are constantly detected by motion detector 326 (FIG. 5A). Since helicopter 340 is traveling in a straight direction, at a low linear velocity, the PRR of pulsed beam of light 342 is low (e.g., one pulse per pulse period). Since helicopter 345 is traveling in a straight direction, at a high linear velocity, the PRR of pulsed beam of light 347 is high (e.g., two pulses per pulse period).

In the situation of helicopter 340, the PRR is low because helicopter 340 is traveling at a low linear velocity. Since helicopter 340 will be covering less distance per unit time, a lower PRR can be used to scan the area in front of helicopter 340, thereby not expending energy uselessly. Also, since helicopter 340 will be covering less distance at lower speeds, the output peak power of fiber laser 324 (FIG. 5A) can be reduced, since only objects in the near vicinity of helicopter 340 will be of interest to the pilot. Furthermore, at lower speeds, the FOV of the scan (not shown) is reduced, as described below in FIG. 8B, therefore the PRR can be lowered to maintain the scan density of the pulsed beams of light (not shown). Also, since the reaction time of the operator is increased at lower speeds, the output peak power can be reduced as the operator will have more time to react to objects and obstacles in her path. In the situation of helicopter 345, the PRR is high because helicopter 345 is traveling at a high linear velocity. Since helicopter 345 will be covering more distance per unit time, and since the FOV of the scan will be increased, as described further below in FIG. 8C, a high PRR is needed to scan the area in front of helicopter 345 if a constant scan density is to be kept and maintained. Also, since helicopter 345 will be covering more distance at higher speeds, the output peak power of fiber laser 324 is increased so that objects which are much farther in front of helicopter 345 can be detected, such as objects located a few hundred meters, or a few kilometers in front of the helicopter. At higher speeds, since the reaction time of the pilot is reduced, an increase in the output peak power of fiber laser 324 is needed to enable the operator to perceive objects at a further distance in front of the helicopter.

Motion detector 326 also constantly detects the linear velocity and the linear acceleration of helicopter 340, which substantially determines the most significant volume of interest to the pilot, with controller 325 (FIG. 5A) adjusting the PRR as well as the output peak power of pulsed beams of light 342 and 347 (both not shown) accordingly. As either the linear velocities of helicopters 340 and 345, the linear accelerations of helicopters 340 and 345, or both, increase, the significant volume of interest lies farther in front of the helicopters, since at high speeds, more distance is covered. If helicopters 340 and 345 travel in a straight direction at high speeds, which increases the distance of the field of interest to the pilot and also reduces the reaction time of the pilot, then controller 325 increases the PRR as well as the output peak power of fiber laser 324. If helicopters 340 and 345 travel in a straight direction at low speeds, which reduces the distance of the field of interest to the pilot and also increases the reaction time of the pilot, then controller 325 decreases the PRR as well as the output peak power of fiber laser 324.

The PRR and output peak power of fiber laser 324 are increased if helicopter 340 travels in a straight direction at high speeds since helicopter 340 will traverse greater distances in a given time period than when traveling at low speeds in a straight direction. At high speeds, the probability of the pilot being in need of information regarding obstacles located further in her LOS (hence an increase in the output peak power of fiber laser 324) is increased since she will be approaching them at an increased rate and she will therefore have less time to react. Furthermore, since greater distances are being traversed, a more rapid rate of pulses needs to be transmitted to maintain the quality of the received image. As depicted in FIG. 6A, controller 325 changes the PRR and the output peak power of fiber laser 324 according to the detected linear motion of a vehicle using an increasing function. The increasing function could be, for example, a direct linear relation, an exponential growth function, and the like. In general, the PRR and output peak power are adjusted according to a change in the linear velocity of the vehicle. Also, the PRR and the output peak power are adjusted according to changes in the FOV of the scan, as described below in FIGS. 8B, 8C, 8D and 8E. Changes in the linear acceleration of the vehicle can be used to correct any errors in the changes in the PRR as a function of changes in the linear velocity of the vehicle. It is noted that the change in PRR as a function of the detected linear motion is optional and is at the discretion of the pilot, since the change in PRR is used to maintain a constant scan density.

Figure 6B:
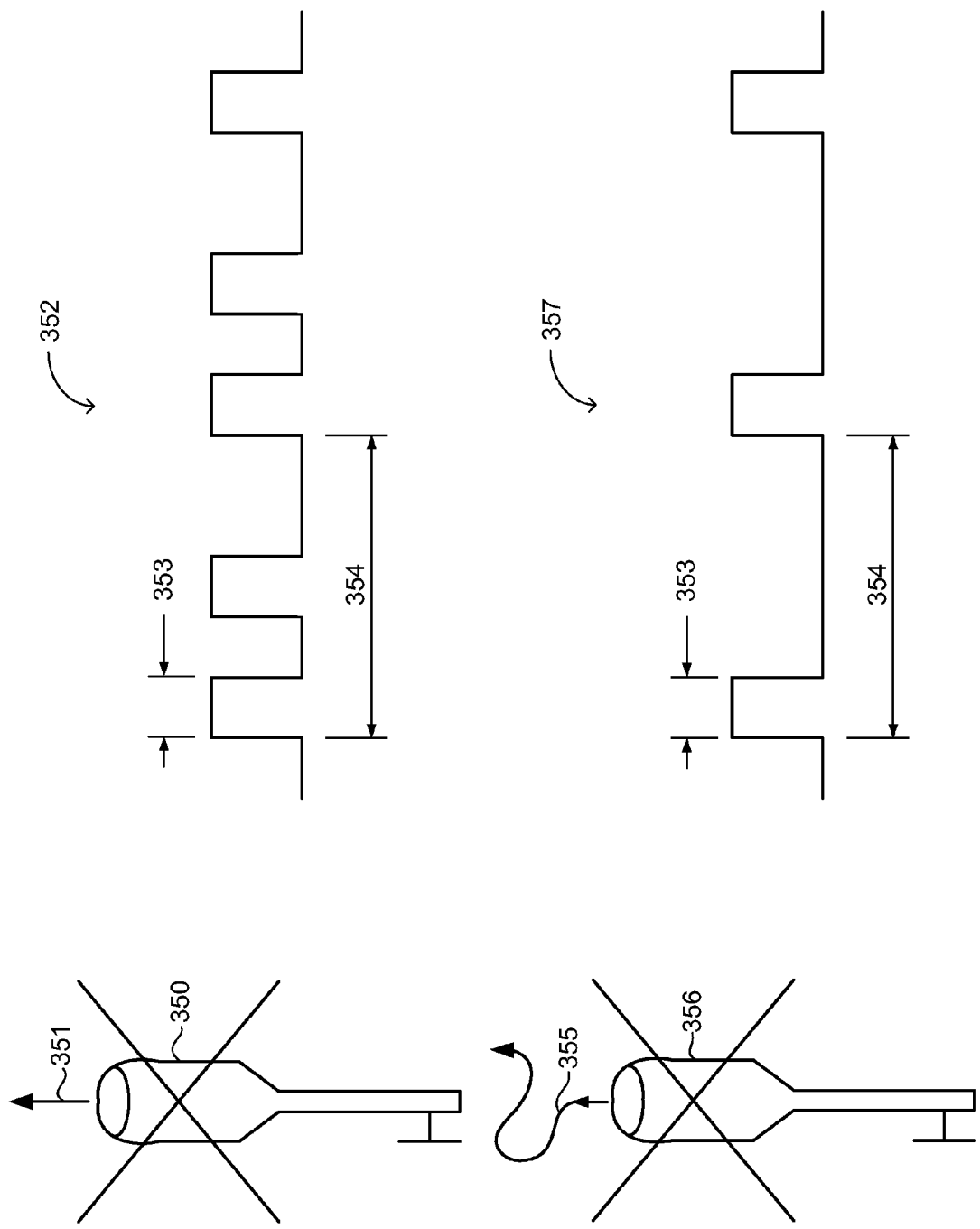
FIG. 6B is another schematic illustration of changes to the PRR as a function of the angular motion of a vehicle mounted with the system of FIG. 5A, constructed and operative in accordance with another embodiment of the disclosed technique.

Reference is now made to FIG. 6B, which is a schematic illustration of changes to the PRR as a function of the angular motion of a vehicle, mounted with system 320 (FIG. 5A), constructed and operative in accordance with another embodiment of the disclosed technique. Each of vehicles 350 and 356 are mounted with system 320. Two pulsed beams of light 352 and 357, each transmitted by system 320, are schematically illustrated in FIG. 6B. Pulsed beam of light 352 corresponds to a pulsed beam of light transmitted from vehicle 350, and pulsed beam of light 357 corresponds to a pulsed beam of light transmitted from vehicle 356. Pulsed beams of light 352 and 357 each have an individual pulse duration spanning a time duration 353 and a pulse period spanning a time duration 354. In FIG. 6B, vehicles 350 and 356 are depicted as helicopters. Helicopter 350 is moving in a straight direction (i.e., its angular velocity is low), as depicted by an arrow 351. Helicopter 356 is moving in a curved direction, constantly changing its orientation (i.e., its angular velocity is high), as depicted by an arrow 355. The linear and angular velocity and acceleration of helicopters 350 and 356 are constantly detected by motion detector 326 (FIG. 5A). Since the direction of travel of helicopter 350 is likely to change, because helicopter 350 is traveling in a straight direction, the PRR of pulsed beam of light 352 is increased by controller 325 (FIG. 5A). Since the direction of travel of helicopter 356 is not likely to change, and it more predictable, the PRR of pulsed beam of light 357 is reduced by controller 325. As can be seen in FIG. 6B, the PRR of pulsed beam of light 352 is double that of pulsed beam of light 357.

In the situation of helicopter 350, the PRR is increased because the pilot needs to see obstacles in front of her that are nearby, as her LOS is unpredictable and likely to change. Due to the increased unpredictability of the flight path of helicopter 350, the FOV of the scan (not shown) is increased, as described below in FIG. 8D. In order to maintain the scan density of the pulsed beams of light (not shown), the PRR is also increased. Since the PRR is high, and helicopter 350 is traveling in a straight direction, system 320 will expend extra energy by giving the pilot information about obstacles in front of her at a faster rate, since such information is needed by the pilot to avoid obstacles in the case that helicopter 350 turns and curves. In the situation of helicopter 356, the PRR is decreased because the pilot only needs to see obstacles in her flight path, since her LOS is more predictable and not likely to change. Due to the increased predictability of the flight path of helicopter 356, the FOV of the scan (not shown) is decreased, as described in FIG. 8E. In order to maintain the scan density of the pulsed beams of light (not shown), the PRR is also decreased. Since the PRR is low, and helicopter 356 is traveling in a curved direction, system 320 will expend less energy by giving the pilot information about obstacles directly in her flight path, since only such information is needed by the pilot to avoid obstacles in the case that helicopter 356 continues in its flight path.

Motion detector 326 constantly detects at least one of the angular velocity and the angular acceleration of helicopters 350 and 356, which substantially determines the field of interest to the pilot, with controller 325 adjusting the PRR accordingly, as explained above. In the case of helicopter 356 traveling in a curved direction, which narrows the field of interest to the pilot, controller 325 decreases the PRR of fiber laser 324. In the case of helicopter 350 traveling in a straight direction, which widens the field of interest to the pilot, controller 325 increases the PRR of fiber laser 324.

The PRR of fiber laser 324 is increased as the angular velocity of helicopter 350 decreases, since the flight path of helicopter 350 will be more uncertain in a given time period than when traveling at higher angular velocities. At high angular velocities, the probability of the pilot being in need of information regarding obstacles located outside the flight path is decreased, for example in helicopter 356, since a curved flight path is more predictable of the current general motion of the helicopter than a straight flight path. As such, the FOV of the scan is decreased, as described below in FIG. 8E.

In general, the change in PRR of the pulsed beam of light is a function of the degree to which the direction of vehicle 322 (FIG. 5A) changes (i.e., either the angular velocity, the angular acceleration, or both). The change in PRR of the pulsed beam of light is also a function of the change in the FOV of the scan, since the PRR is modified to maintain the scan density if the FOV of the scan is changed. It is noted that in the embodiment where fiber laser 324 is attached to a gimbals, the change in PRR of the pulsed beam of light is a function of the degree to which the direction of fiber laser 324 changes with respect to vehicle 322. A quicker change in direction of vehicle 322, for example, when vehicle 322 executes a sharper turn, will result in a larger decrease in the PRR of the pulsed beam of light, as compared with a slower change in direction of vehicle 322, for example, when vehicle 322 executes a wide turn. Furthermore, as described in FIG. 6A, the change in PRR as well as output peak power of fiber laser 324 is a function of either the linear velocity of vehicle 322, the linear acceleration of vehicle 322, or both, which is itself a factor that substantially determines the field of interest to the pilot. Since the change in PRR is a function of the change in direction of vehicle 322 as well as the change in at least one of the linear velocity and in the linear acceleration of vehicle 322, each in different ways, in one embodiment of the disclosed technique, both changes are taken into account by controller 325 when controller 325 adjusts the PRR of fiber laser 324. For example, as helicopter 350 travels in more of a straight direction, controller 325 increases the PRR of fiber laser 324 yet also factors in the linear velocity of helicopter 350. If, while traveling in a straight direction, helicopter 350 then travels at a higher speed than its current speed, controller 325 increases the PRR of fiber laser 324, and may increase the output peak power of fiber laser 324 as well. In another embodiment of the disclosed technique, either only the angular velocity of vehicle 322, only the angular acceleration of vehicle 322, or both, are taken into account when adjusting the PRR of fiber laser 324. In a further embodiment of the disclosed technique, either only the linear velocity of vehicle 322, only the linear acceleration of vehicle 322, or both, are taken into account when adjusting the PRR and the output peak power of fiber laser 324.

Motion detector 326 (FIG. 5A) constantly detects the angular motion of vehicle 322, and controller 325 constantly adjusts the PRR of the pulsed beam of light accordingly. As the change in direction (i.e., either the angular velocity, the angular acceleration, or both) of vehicle 322 increases, the PRR of the pulsed beam of light decreases, and as the change in direction of vehicle 322 decreases, the PRR of the pulsed beam of light increases. Furthermore, as described in FIG. 6A, the PRR as well as output peak power of fiber laser 324 are adjusted according to the linear velocity of vehicle 322, the linear acceleration of vehicle 322, or both, by an increasing function, which in turn substantially determines the field of interest to the pilot. Therefore, as the field of interest to the pilot changes, the PRR, as well as the output peak power, of fiber laser 324 are changed as well by controller 325. As depicted in FIG. 6B, controller 325 changes the PRR of fiber laser 324 according to the detected angular motion of a vehicle using a decreasing function. The decreasing function could be, for example, an inverse relation, an exponential decay function, and the like. In general, the change in PRR is a function of a change in the angular velocity of the vehicle. Changes in the angular acceleration of the vehicle can be used to correct any errors in the changes in the PRR as a function of changes in the angular velocity of the vehicle.

Figure 7:
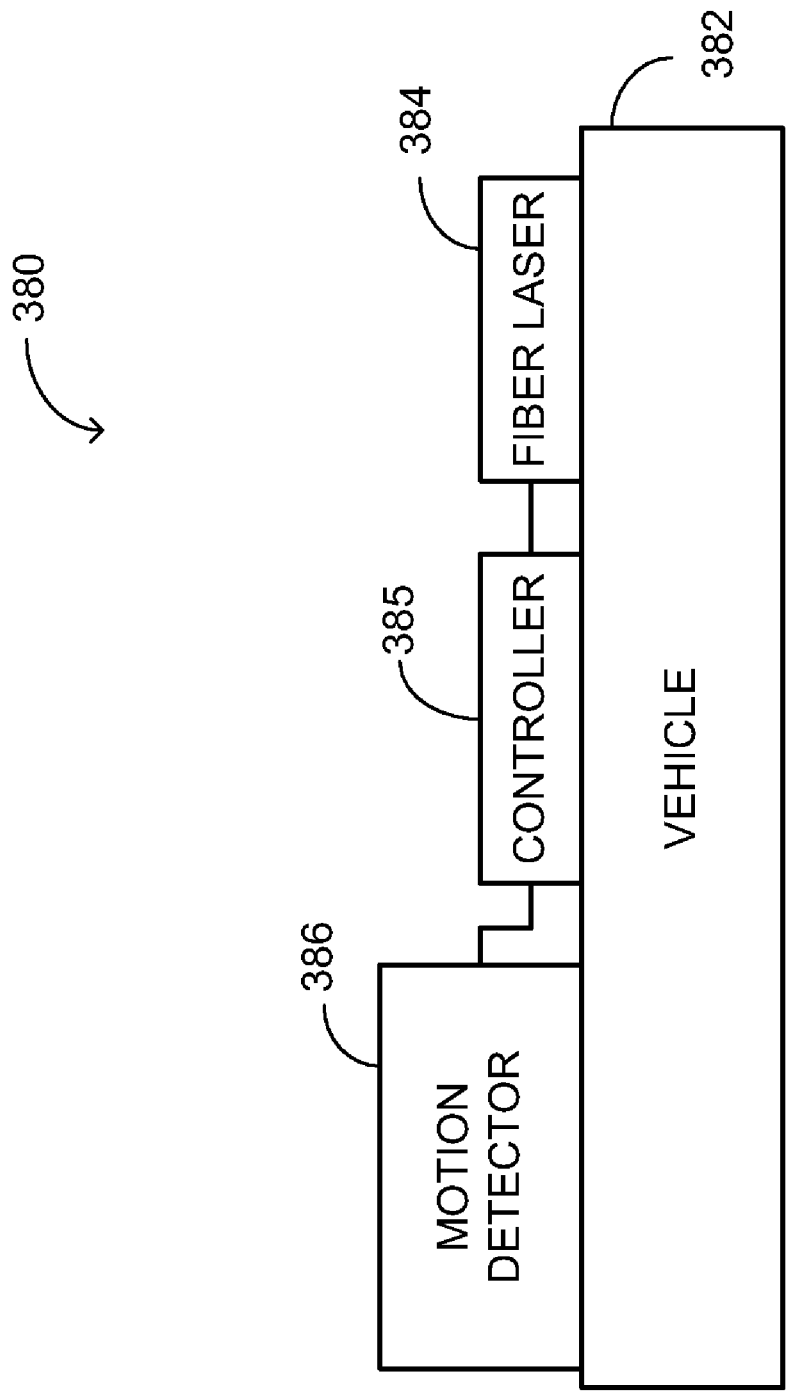
FIG. 7 is a schematic illustration of a system, constructed and operative in accordance with a further embodiment of the disclosed technique.

Reference is now made to FIG. 7, which is a schematic illustration of a system, generally referenced 380, constructed and operative in accordance with a further embodiment of the disclosed technique. System 380 includes a fiber laser 384, a controller 385, a motion detector 386 and a vehicle 382. Fiber laser 384 is coupled with controller 385 which is coupled with motion detector 386. Fiber laser 384, controller 385 and motion detector 386 are each coupled with vehicle 382. Fiber laser 384 is constructed and operative in a manner similar to fiber laser 100 (FIG. 1B). Motion detector 386 can be any unit enabled to detect and determine the speed as well as the motion of vehicle 382 (i.e., linear velocity and linear acceleration, angular velocity and angular acceleration, a combination thereof and the like). For example, motion detector 386 can be a gyroscope, an INS and the like, as is known in the art.

System 380 is a LORD system. Fiber laser 384 scans a volume of interest (not shown) in front of system 380 using pulsed beams of light to detect obstacles, and in particular hard-to-see obstacles, which may be in the volume of interest. Motion detector 386 constantly detects the speed of vehicle 382, as well as the motion of vehicle 382 (i.e., changes in the direction of motion of the vehicle) and provides a signal to controller 385 indicative of the changes in speed, and motion, of vehicle 382. For example, motion detector 386 can provide an indication to controller 385 that vehicle 382 is moving at a particular speed, in a straight direction (i.e., linear velocity and linear acceleration) or in a curved direction (i.e., angular velocity and angular acceleration).

One way of characterizing the volume of interest scanned by system 380 is the width of the field-of-view (herein abbreviated FOV) in the vehicle plane (as described in FIG. 5B) of system 380. The FOV refers to the particular volume of interest system 380 scans for obstacles in the vehicle plane. Since the vehicle plane is stationary, as the vehicle moves, the vehicle plane moves as well, causing the FOV to move also. The width of the FOV refers to the spread angle of the FOV when viewed from a top orthogonal view, as explained in further detail with reference to FIG. 8A. Another way of characterizing the FOV is the LOS of the scan, which refers to a vector that bisects the area covered by the FOV into equal parts.

The width of the FOV is a measure of how large a volume of interest is scanned by system 380. An increase in the width of the FOV means that a larger volume of interest will be scanned, which requires more energy and time. A decrease in the width of the FOV means that a smaller volume of interest will be scanned, which requires less energy and time.

In general, if vehicle 382 is traveling at high speeds, then the likelihood that an operator of vehicle 382 will need to know information about obstacles which are significantly off-centered from her LOS is increased, since vehicle 382 will be covering more distance per unit time and the reaction time of the operator will be reduced. It is noted that the operator of vehicle 382 is not limited to human beings. The operator can also be computer software written to autonomously operate vehicle 382. Furthermore, since vehicle 382 will traverse a greater distance in less time at high speeds, there is more of a need for system 380 to scan the entire volume of interest. On the other hand, if vehicle 382 is not traveling at high speeds, but is traveling at low speeds, then the likelihood that the operator of vehicle 382 will need to know information about obstacles which are significantly off-centered from her LOS is decreased, since vehicle 382 will be covering less distance per unit time and the reaction time of the operator is increased. At low speeds, the most significant obstacles to vehicle 382 will lie directly in the LOS of the operator.

Also, if vehicle 382 is traveling in a straight direction (i.e., low angular velocity), then the likelihood that an operator of vehicle 382 will need to know information about obstacles in front of her and significantly off-centered from her LOS is increased, since the path of vehicle 382 will be less predictable. On the other hand, if vehicle 382 is not traveling in a straight direction, but is turning (i.e., high angular velocity), then the likelihood that the operator of vehicle 382 will need to know information about obstacles which are significantly off-centered from her LOS is reduced, since the path of vehicle 382 will be more predictable.

Furthermore, as vehicle 382 changes orientation (i.e., turns), the LOS of the scan needs to be adjusted to follow the path of the vehicle. As the angular velocity of vehicle 382 increases, the LOS of the scan needs to be adjusted quicker, since the change in direction of vehicle 382 increases as well. Likewise, as the angular velocity of vehicle 382 decreases, the LOS of the scan can be adjusted slower, since the change in direction of vehicle 382 decreases as well. By adjusting the LOS of the scan according to the angular motion of vehicle 382, the operator can get an image of the location where vehicle 382 will be in a certain amount of time. For example, if vehicle 382 is turning to the right by 90 degrees, by adjusting the LOS of the scan while vehicle 382 is turning, the operator of the vehicle can get an image of the location vehicle 382 will be at when the turn is complete, which may be, for example, in 5 seconds.

Also, since vehicle 382 will traverse a smaller distance in more time at low speeds, there is more time for system 380 to scan the entire volume of interest. In order to provide an operator with information about obstacles in front of her with enough time for her to avoid them, controller 385 adjusts the width of the FOV of system 380 according to the determined speed and motion of system 380. This adjustment to the width of the FOV, as well as to the LOS of the scan, of system 380 is further explained with reference to FIGS. 8A, 8B, 8C, 8D, 8E, 8F and 8G.

Figure 8A:
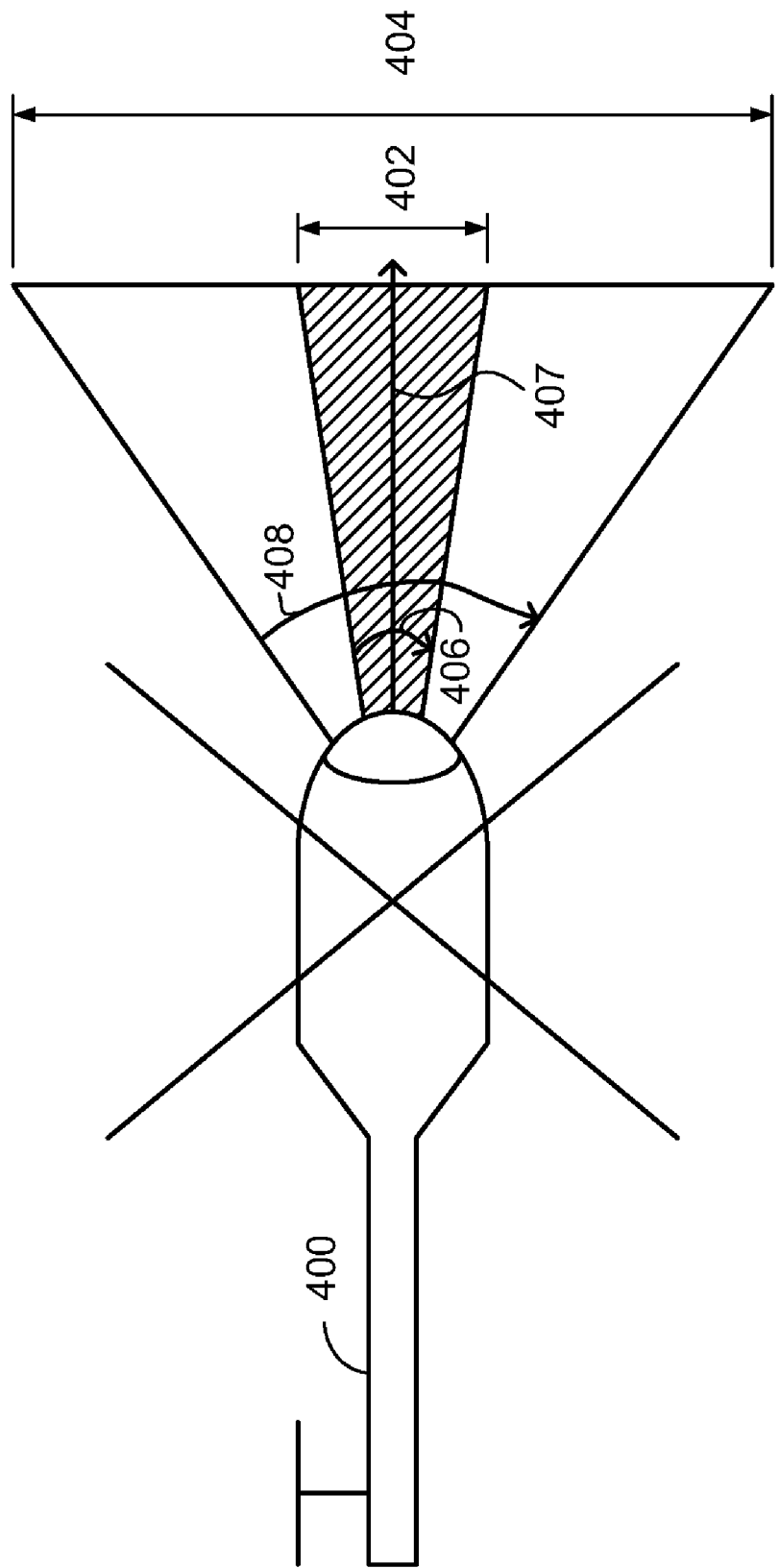
FIG. 8A is a schematic illustration of a vehicle mounted with the system of FIG. 7, constructed and operative in accordance with another embodiment of the disclosed technique, depicting the differences between the field-of-view and the field-of-regard of the vehicle.

Reference is now made to FIG. 8A, which is a schematic illustration of a vehicle mounted with system 380 (FIG. 7), generally referenced 400, constructed and operative in accordance with another embodiment of the disclosed technique. FIG. 8A depicts the difference between the FOV and the field-of-regard (herein abbreviated FOR) of vehicle 400. FIG. 8A also depicts the LOS of the scan. In FIG. 8A, vehicle 400 is a helicopter. FIG. 8A is a top orthogonal view of helicopter 400.

The FOR of system 380 refers to the volume of interest which system 380 can possibly scan for obstacles, whereas the FOV of system 380 refers to the volume of interest which system 380 actually scans. The FOR of system 380 is limited by the mechanics of system 380 and the range of angles system 380 can be directed at. In general, the FOV is significantly smaller than the FOR, because system 380 cannot scan the entire FOR fast enough to provide real-time up-to-date information regarding obstacles in the flight path of helicopter 400. The FOR and the FOV of system 380 can be defined in terms of the width of the spread angle each makes with the volume of interest. In FIG. 8A, the FOR of system 380 has a spread angle 408, whose width is delineated by a range 404. The FOV of system 380 has a spread angle 406, whose width is delineated by a range 402. The FOR of system 380 may be for example 100°, and the FOV of system 380 may be for example 25°. As the spread angle increases, so does the width of the spread angle. Arrow 407 represents the LOS of the scan, as it bisects the FOV of system 380 into equal parts. The LOS of the scan represents the general direction of the FOV.

Figure 8B:
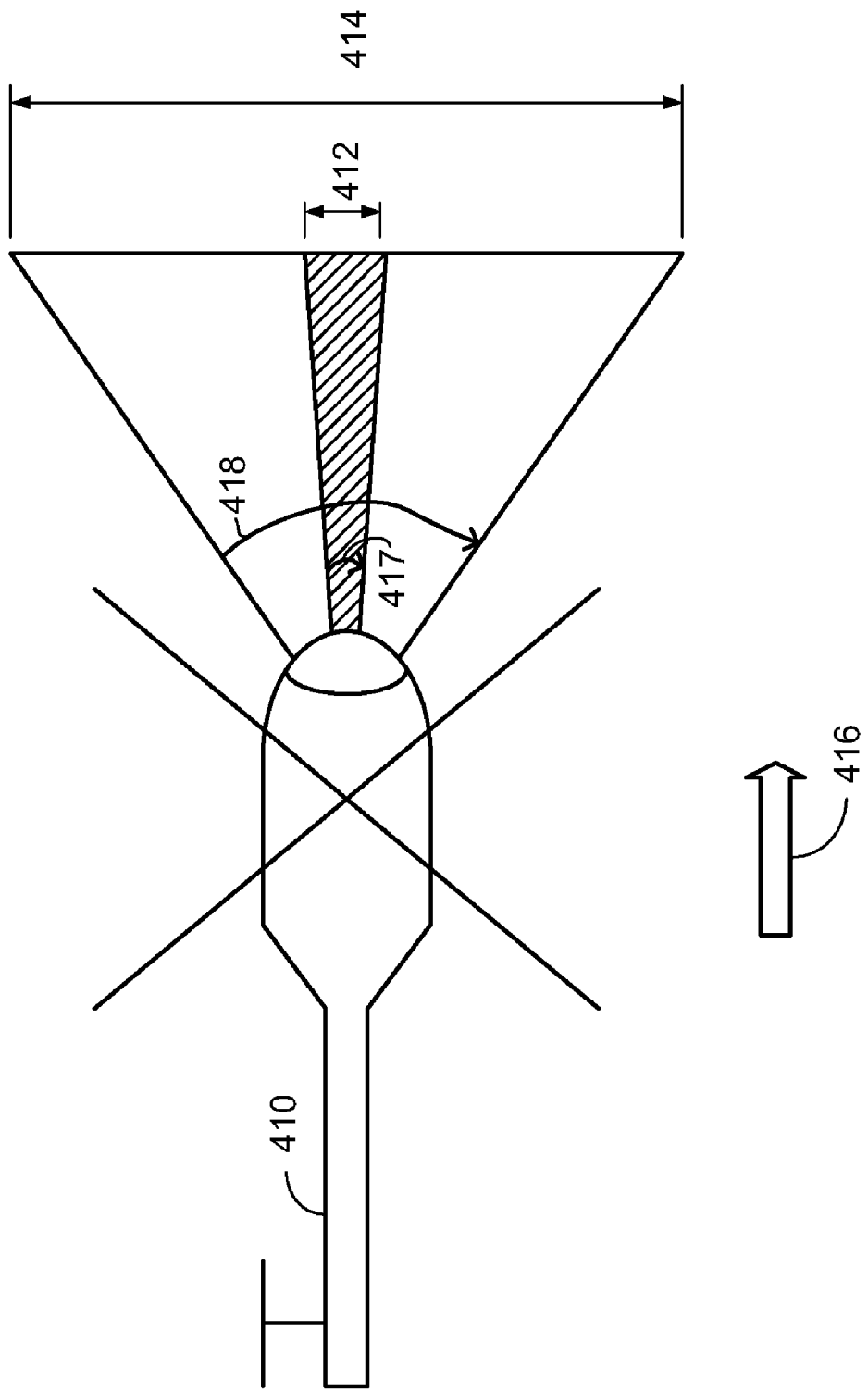
FIG. 8B is a schematic illustration of a vehicle mounted with the system of FIG. 7, constructed and operative in accordance with a further embodiment of the disclosed technique.

Reference is now made to FIG. 8B, which is a schematic illustration of a vehicle mounted with system 380 (FIG. 7), generally referenced 410, constructed and operative in accordance with a further embodiment of the disclosed technique. FIG. 8B depicts the change in FOV of system 380 as either the linear velocity of vehicle 410, the linear acceleration of vehicle 410, or both, decrease (depicted by a thin arrow 416). In FIG. 8B, vehicle 410 is a helicopter. FIG. 8B is a top orthogonal view of helicopter 410.

In FIG. 8B, the FOV of system 380 is constantly adjusted by controller 385 (FIG. 7) according to at least one of the linear velocity of helicopter 410 and the linear acceleration of helicopter 410. The speed of helicopter 410 is therefore constantly detected by motion detector 386 (FIG. 7). As helicopter 410 decreases in speed, a spread angle 417 of the FOV of system 380 is decreased by controller 385, thereby decreasing a range 412 of the width of the spread angle of the FOV of system 380. Since helicopter 410 is traveling at slower speeds, thereby resulting in less of a need for system 380 to scan a large FOV (since less distance is covered and the time in which the pilot can react is increased), the FOV of system 380 is decreased so that only the most significant volume of interest, where obstacles to helicopter 410 can be found, is scanned. This significant volume of interest lies directly in the LOS of helicopter 410 at low speeds. Also, since the time in which the pilot can react is increased, i.e., the look ahead distance is increased, the FOV of system 380 can be reduced. The look ahead distance can be defined as the distance along the ground track of an aircraft in flight that marks the outer limits of a collision alert envelope, which is a function of the speed of the aircraft and the time to complete an evasive maneuver (e.g., to avoid a collision). It is noted that a spread angle 418, and a range 414 of the width of the spread angle of the FOR, of system 380, do not change with a change in speed of helicopter 410.

Figure 8C:
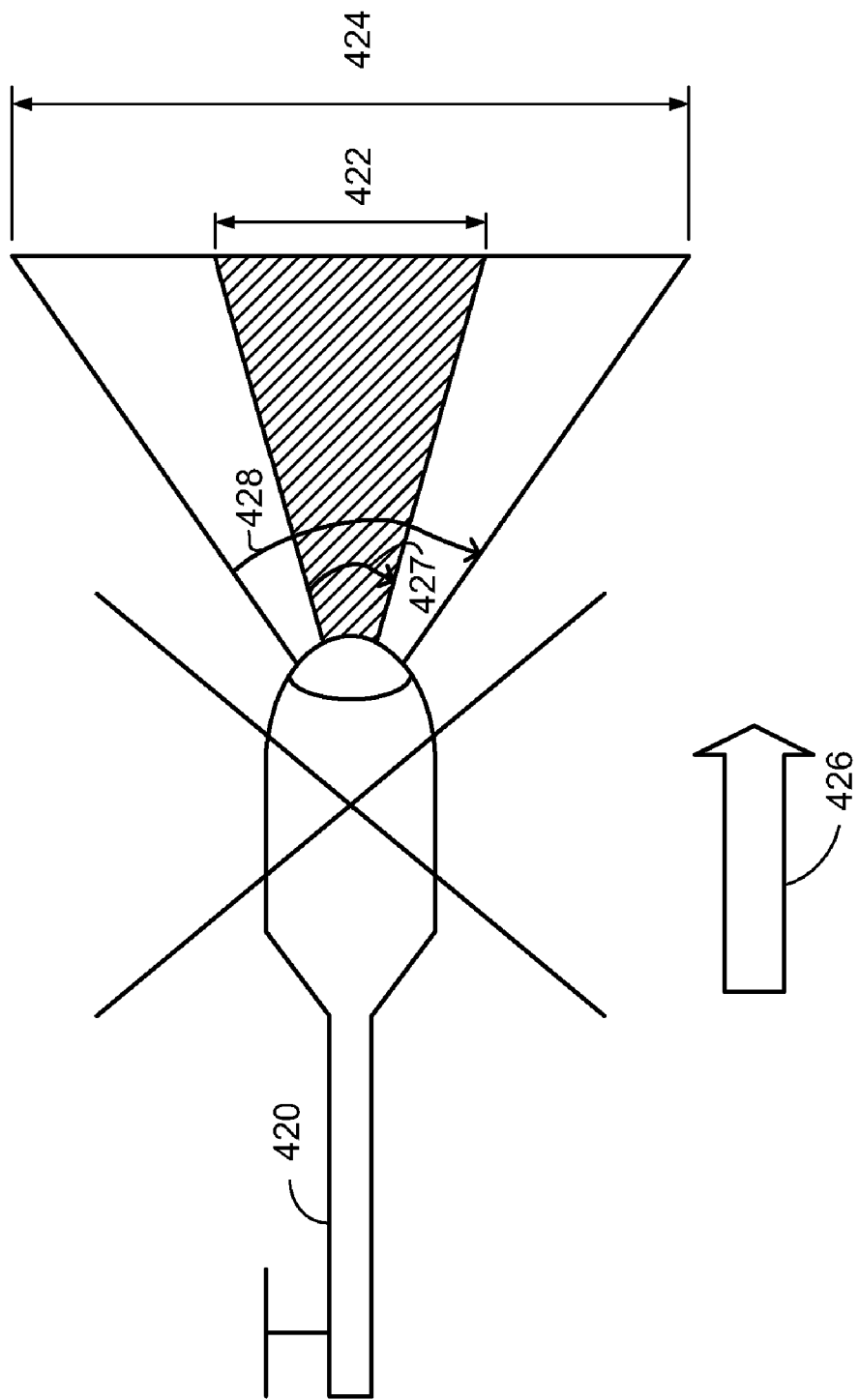
FIG. 8C is a schematic illustration of a vehicle mounted with the system of FIG. 7, constructed and operative in accordance with another embodiment of the disclosed technique.

Reference is now made to FIG. 8C, which is a schematic illustration of a vehicle mounted with system 380 (FIG. 7), generally referenced 420, constructed and operative in accordance with another embodiment of the disclosed technique. FIG. 8C depicts the change in FOV of system 380 as the linear velocity of vehicle 420, the linear acceleration of vehicle 420, or both, increase (depicted by a thick arrow 426). In FIG. 8C, vehicle 420 is a helicopter. FIG. 8C is a top orthogonal view of helicopter 420.

In FIG. 8C, the FOV of system 380 is constantly adjusted according to at least one of the linear velocity of helicopter 420 and the linear acceleration of helicopter 420 by controller 385 (FIG. 7). The speed of helicopter 420 is therefore constantly detected by motion detector 386 (FIG. 7). As helicopter 420 increases in speed, a spread angle 427 of the FOV of system 380 is increased by controller 385, thereby increasing a range 422 of the width of the spread angle of the FOV of system 380. Since helicopter 420 is traveling at higher speeds (since more distance is covered and the time in which the pilot can react, i.e., the look ahead distance, is decreased), thereby resulting in more of a need for system 380 to scan a larger FOV, the FOV of system 380 is increased so that a larger volume of interest, where obstacles to helicopter 420 can be found, is scanned. This larger volume of interest lies directly in the LOS of helicopter 420, as well as off-center from the LOS of helicopter 420, at higher speeds. It is noted that a spread angle 428, and a range 424 of the width of the spread angle of the FOR, of system 380, do not change with a change in speed of helicopter 420.

The change in FOV is a function of at least one of the detected linear velocity of vehicle 382 and the linear acceleration of vehicle 382 (FIG. 7). The change in FOV is also a function of the motion of vehicle 382. In one embodiment of the disclosed technique, only either the linear velocity of vehicle 382, the linear acceleration of vehicle 382, or both, are taken into account when adjusting the FOV of system 380. In general, the FOV is adjusted in accordance with the linear velocity of vehicle 382 by an increasing function. The linear acceleration of vehicle 382 can be used to correct for errors in the change of the FOV as a function of the linear velocity, as is known in the art. For example, as helicopter 420 travels at increasing speeds, controller 385 increases the FOV of system 380. In another embodiment of the disclosed technique, the pilot can adjust the FOV manually, thereby overriding the changes to the FOV as determined by controller 385 in relation to the changes in speed and motion of vehicle 382. It is noted, as was described in FIGS. 5A and 6A, that as the linear velocity increases, the FOV of system 380 is increased, as well as the PRR and the output peak power of fiber laser 384 (FIG. 7), and that as the linear velocity decreases, the FOV of system 380 is decreased, as well as the PRR and the output peak power of fiber laser 384. The PRR is generally adjusted according to changes in the FOV in order to maintain a constant scan density of pulsed beams of light. If the FOV of system 380 increases, then the PRR needs to be increased to maintain the scan density, and if the FOV of system 380 decreases, then the PRR needs to be decreased to maintain the scan density.

Figure 8D:
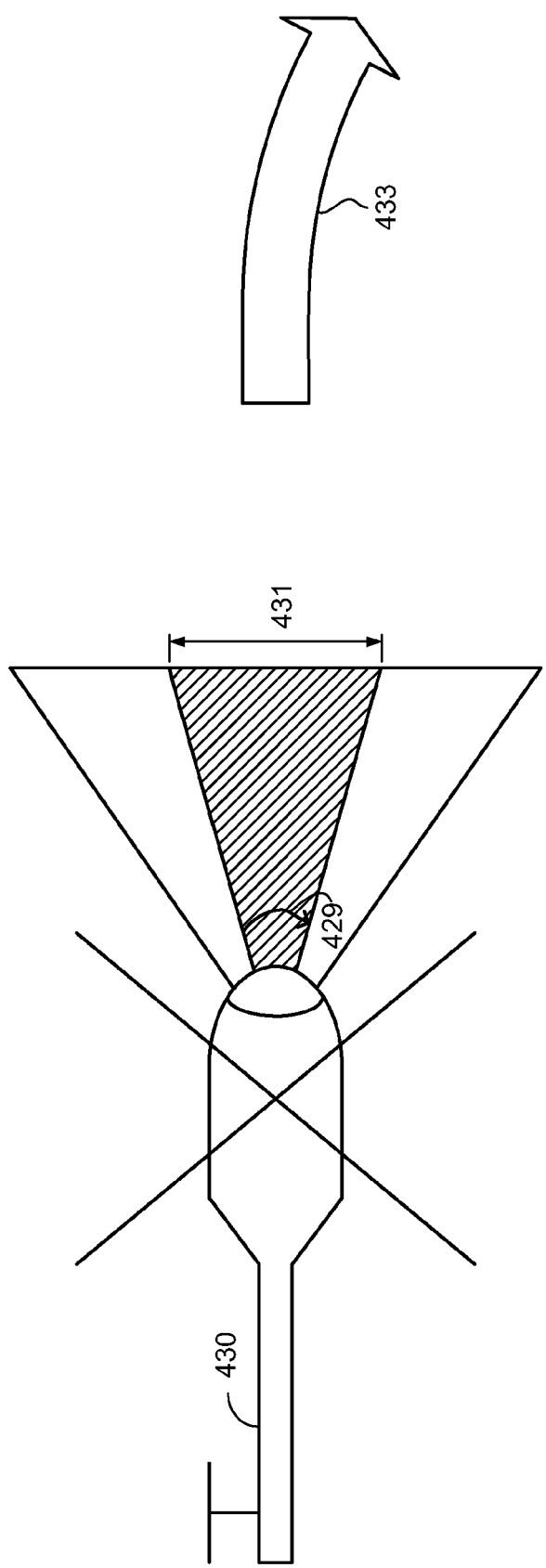
FIG. 8D is a schematic illustration of a vehicle mounted with the system of FIG. 7, constructed and operative in accordance with a further embodiment of the disclosed technique.

Reference is now made to FIG. 8D, which is a schematic illustration of a vehicle mounted with system 380 (FIG. 7), generally referenced 430, constructed and operative in accordance with a further embodiment of the disclosed technique. FIG. 8D depicts the change in FOV of system 380 as the angular velocity of vehicle 430, the angular acceleration of vehicle 430, or both, decrease (depicted by an arrow 433 with a slight curvature). In FIG. 8D, vehicle 430 is a helicopter. FIG. 8D is a top orthogonal view of helicopter 430.

In FIG. 8D, the FOV of system 380 is constantly adjusted according to at least one of the angular velocity of helicopter 430 and the angular acceleration of helicopter 430 by controller 385 (FIG. 7). The angular motion of helicopter 430 is therefore constantly detected by motion detector 386 (FIG. 7). As helicopter 430 decreases in angular velocity (i.e., a light turn), a spread angle 429 of the FOV of system 380 is increased by controller 385, thereby increasing a range 431 of the width of the spread angle of the FOV of system 380. Since the angular velocity of helicopter 430 is low, the flight path of the helicopter is less predictable. This reduction in angular velocity results in a need for system 380 to scan a larger FOV, therefore, the FOV of system 380 is increased. It is noted that the spread angle (not shown) of the FOR, and the range of the width (not shown) of the FOR, of system 380, do not change with a change in angular velocity of helicopter 430.

Figure 8E:
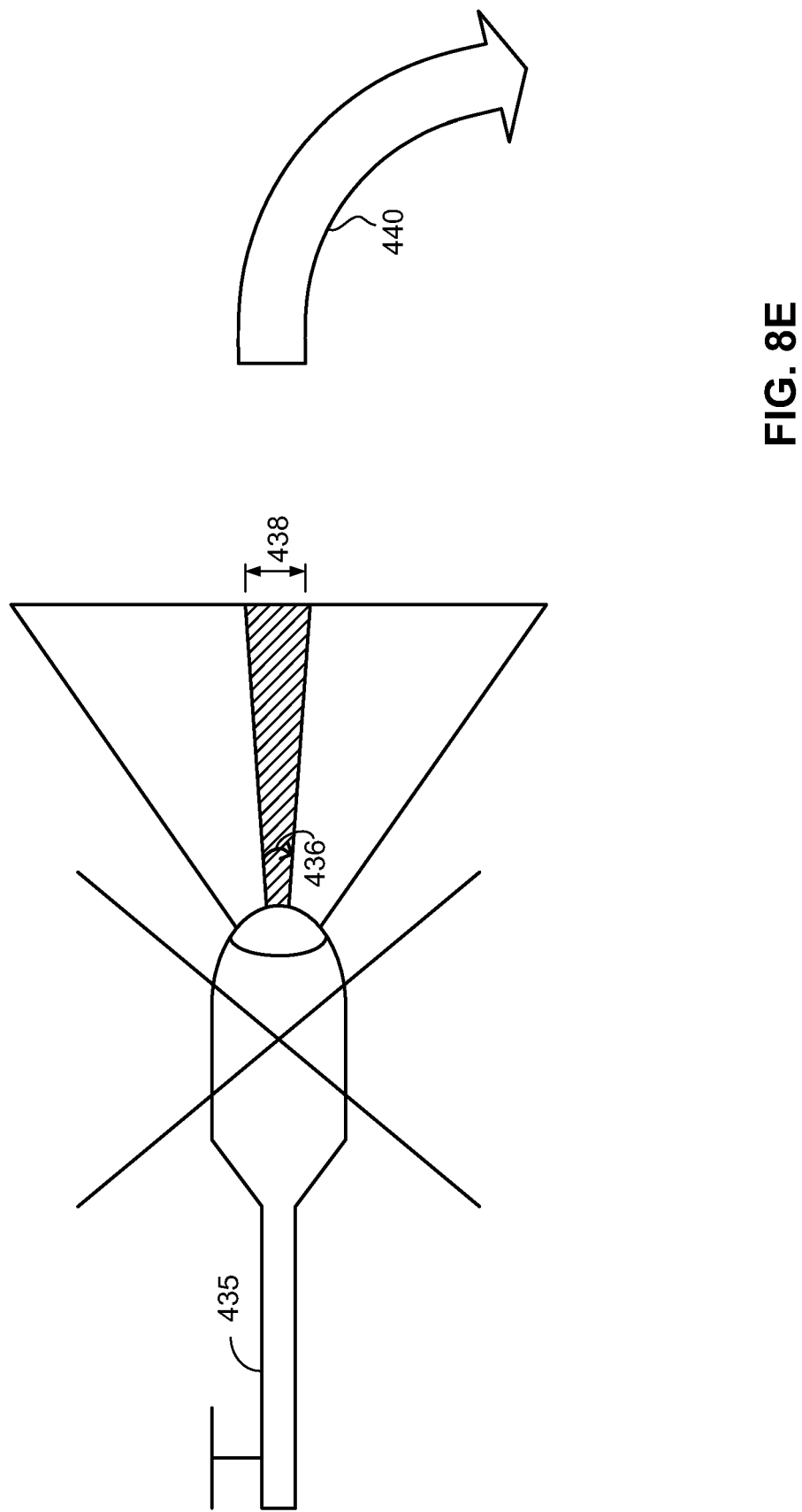
FIG. 8E is a schematic illustration of a vehicle mounted with the system of FIG. 7, constructed and operative in accordance with another embodiment of the disclosed technique.

Reference is now made to FIG. 8E, which is a schematic illustration of a vehicle mounted with system 380 (FIG. 7), generally referenced 435, constructed and operative in accordance with another embodiment of the disclosed technique. FIG. 8E depicts the change in FOV of system 380 as the angular velocity of vehicle 435, the angular acceleration of vehicle 435, or both, increase (depicted by an arrow 440 with a large curvature). In FIG. 8E, vehicle 435 is a helicopter. FIG. 8E is a top orthogonal view of helicopter 435.

In FIG. 8E, the FOV of system 380 is constantly adjusted according to at least one of the angular velocity of helicopter 435 and the angular acceleration of helicopter 435 by controller 385 (FIG. 7). The angular motion of helicopter 435 is therefore constantly detected by motion detector 386 (FIG. 7). As helicopter 435 increases in angular velocity (i.e., a sharp turn), a spread angle 436 of the FOV of system 380 is decreased by controller 385, thereby decreasing a range 438 of the width of the spread angle of the FOV of system 380. Since the angular velocity of helicopter 435 is high, the flight path of the helicopter is more predictable. As such, system 380 does not need to scan a large FOV, resulting in the FOV of system 380 being decreased. It is noted that the spread angle (not shown) of the FOR, and the range of the width (not shown) of the FOR, of system 380, do not change with a change in angular velocity of helicopter 435.

The FOV of system 380 can be changed in relation to the detected angular motion (e.g., changes in angular velocity, in angular acceleration, or both) of helicopter 435 (not shown). For example, if helicopter 435 is traveling in a straight direction (i.e., low angular velocity), then the FOV of system 380 is increased accordingly. The FOV is increased because the flight path of system 380 in more likely to change. Therefore, obstacles directly in front of helicopter 435 as well as those that are significantly off-centered from the LOS of the pilot are detected by increasing the FOV. If, on the other hand, the helicopter is not traveling in a straight direction, but in a curved direction (i.e., either high angular velocity, high angular acceleration, or both), then the FOV of system 380 is decreased. When helicopter 435 travels in a curved direction, the FOV of system 380 is decreased because the LOS of the pilot is more predictable as is the flight path of helicopter 435. In general, the FOV is adjusted in accordance with the angular velocity of vehicle 382 by a decreasing function. The angular acceleration of vehicle 382 can be used to correct for errors in the change of the FOV as a function of the angular velocity, as is known in the art. It is noted, as was described in FIGS. 5A and 6B, that as the angular velocity increases, the FOV is decreased, as well as the PRR of fiber laser 384 (FIG. 7), and that as the angular velocity decreases, the FOV is increased, as well as the PRR of fiber laser 384. As mentioned above with reference to FIG. 8C, the PRR is generally adjusted according to changes in the FOV in order to maintain a constant scan density of pulsed beams of light. If the FOV of system 380 increases, then the PRR needs to be increased to maintain the scan density, and if the FOV of system 380 decreases, then the PRR needs to be decreased to maintain the scan density.

Figure 8F:
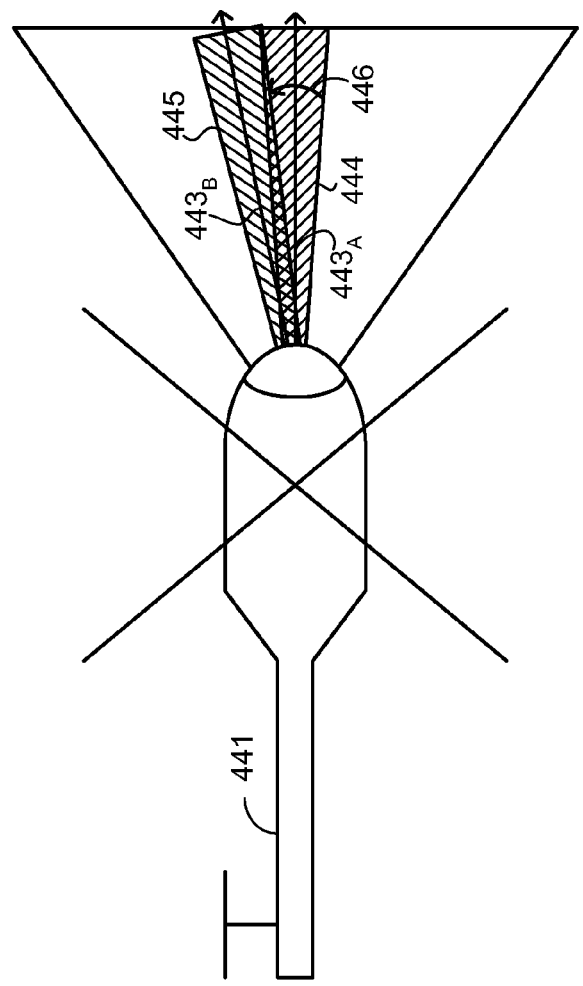
FIG. 8F is a schematic illustration of a vehicle mounted with the system of FIG. 7, constructed and operative in accordance with a further embodiment of the disclosed technique.

Reference is now made to FIG. 8F, which is a schematic illustration of a vehicle mounted with system 380 (FIG. 7), generally referenced 441, constructed and operative in accordance with a further embodiment of the disclosed technique. FIG. 8F depicts the change in the LOS of the scan of system 380 as the angular velocity of vehicle 441, the angular acceleration of vehicle 441, or both, decrease (depicted by an arrow 447 with a slight curvature). In FIG. 8F, vehicle 441 is a helicopter. FIG. 8F is a top orthogonal view of helicopter 441.

In FIG. 8F, the LOS of the scan of system 380 is constantly adjusted according to at least one of the angular velocity of helicopter 441 and the angular acceleration of helicopter 441 by controller 385 (FIG. 7). The angular motion of helicopter 441 is therefore constantly detected by motion detector 386 (FIG. 7). As helicopter 441 decreases in angular velocity (i.e., a light turn), an initial FOV 444, with the LOS of the scan being represented by an arrow $443_A$, is adjusted in the direction of motion of helicopter 441, to a final FOV 445. The LOS of the scan for final FOV 445 is depicted by an arrow $443_B$. Initial FOV 444 has been moved by an angle γ (not shown), depicted by an arrow 446, to final FOV 445. By adjusting the LOS of the scan of the FOV of helicopter 441 according to the angular motion of the helicopter, a pilot can get an image of the location where the helicopter will be in a certain amount of time. As the angular velocity of helicopter 441 decreases, the angle depicted by arrow 446 also decreases, since the change in orientation of helicopter 441 is reduced when the angular velocity is low. It is noted that the spread angle (not shown) of the FOR, and the range of the width (not shown) of the FOR, of system 380, do not change with a change in the LOS of the scan of helicopter 441.

Figure 8G:
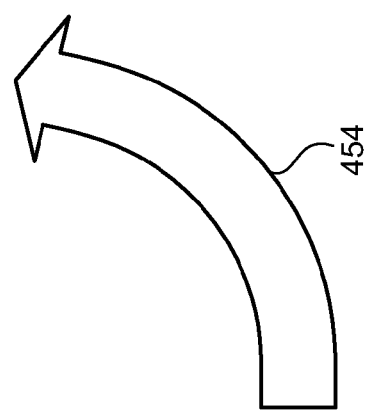
FIG. 8G is a schematic illustration of a vehicle mounted with the system of FIG. 7, constructed and operative in accordance with another embodiment of the disclosed technique.
Figure 8G:
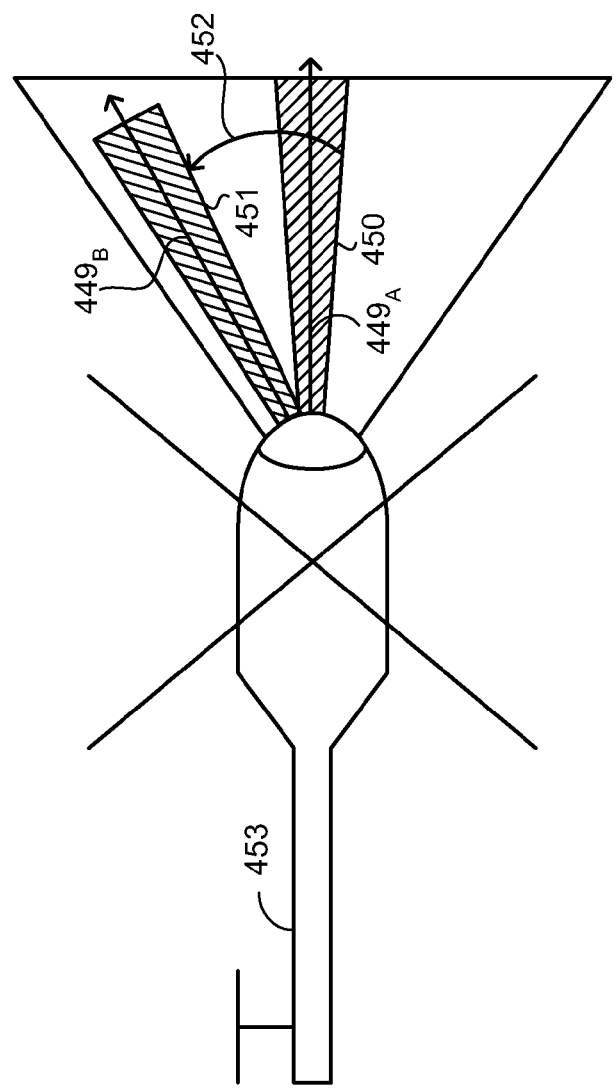

Reference is now made to FIG. 8G, which is a schematic illustration of a vehicle mounted with system 380 (FIG. 7), generally referenced 453, constructed and operative in accordance with another embodiment of the disclosed technique. FIG. 8G depicts the change in the LOS of the scan of system 380 as the angular velocity of vehicle 453, the angular acceleration of vehicle 453, or both, increase (depicted by an arrow 454 with a strong curvature). In FIG. 8G, vehicle 453 is a helicopter. FIG. 8G is a top orthogonal view of helicopter 453.

In FIG. 8G, the LOS of the scan of system 380 is constantly adjusted according to at least one of the angular velocity of helicopter 453 and the angular acceleration of helicopter 453 by controller 385 (FIG. 7). The angular motion of helicopter 453 is therefore constantly detected by motion detector 386 (FIG. 7). As helicopter 453 increases in angular velocity (i.e., a sharp turn), an initial FOV 450, with the LOS of the scan being represented by an arrow $449_A$, is adjusted in the direction of motion of helicopter 453, to a final FOV 451. The LOS of the scan for final FOV 451 is depicted by an arrow $449_B$. Initial FOV 450 has been moved by an angle δ (not shown), depicted by an arrow 452, to final FOV 451. By adjusting the LOS of the scan of the FOV of helicopter 453 according to the angular motion of the helicopter, a pilot can get an image of the location where the helicopter will be in a certain amount of time. It is noted that arrow 446 (FIG. 8F) is smaller in size than arrow 452. Therefore, as the angular velocity increases, the difference in angle between the initial FOV and the final FOV of the helicopter also increases. As the angular velocity of the helicopter increases, the visibility of the pilot is reduced since the helicopter is constantly changing orientation. Therefore, as the angular velocity increases, there is a need to increase the visibility of the pilot to ensure her ability to detect obstacles in the flight path of the helicopter. The visibility of the pilot is increased by increasing the angle through which the LOS of the scan is adjusted according to the angular motion of the helicopter.

For example, as the angular velocity of helicopter 453 begins to increase, the angle through which the LOS of the scan is moved in, following the change in orientation of helicopter 453, also increases. As the angular velocity of helicopter 453 decreases, the angle through which the LOS of the scan is moved in also decreases. It is noted that the spread angle (not shown) of the FOR, and the range of the width (not shown) of the FOR, of system 380, do not change with a change in the LOS of the scan of helicopter 453. In general, the LOS of the scan is adjusted in accordance with the angular velocity of vehicle 382 by an increasing function. The angular acceleration of vehicle 382 can be used to correct for errors in the change of the LOS of the scan as a function of the angular velocity, as is known in the art.

Figure 9:
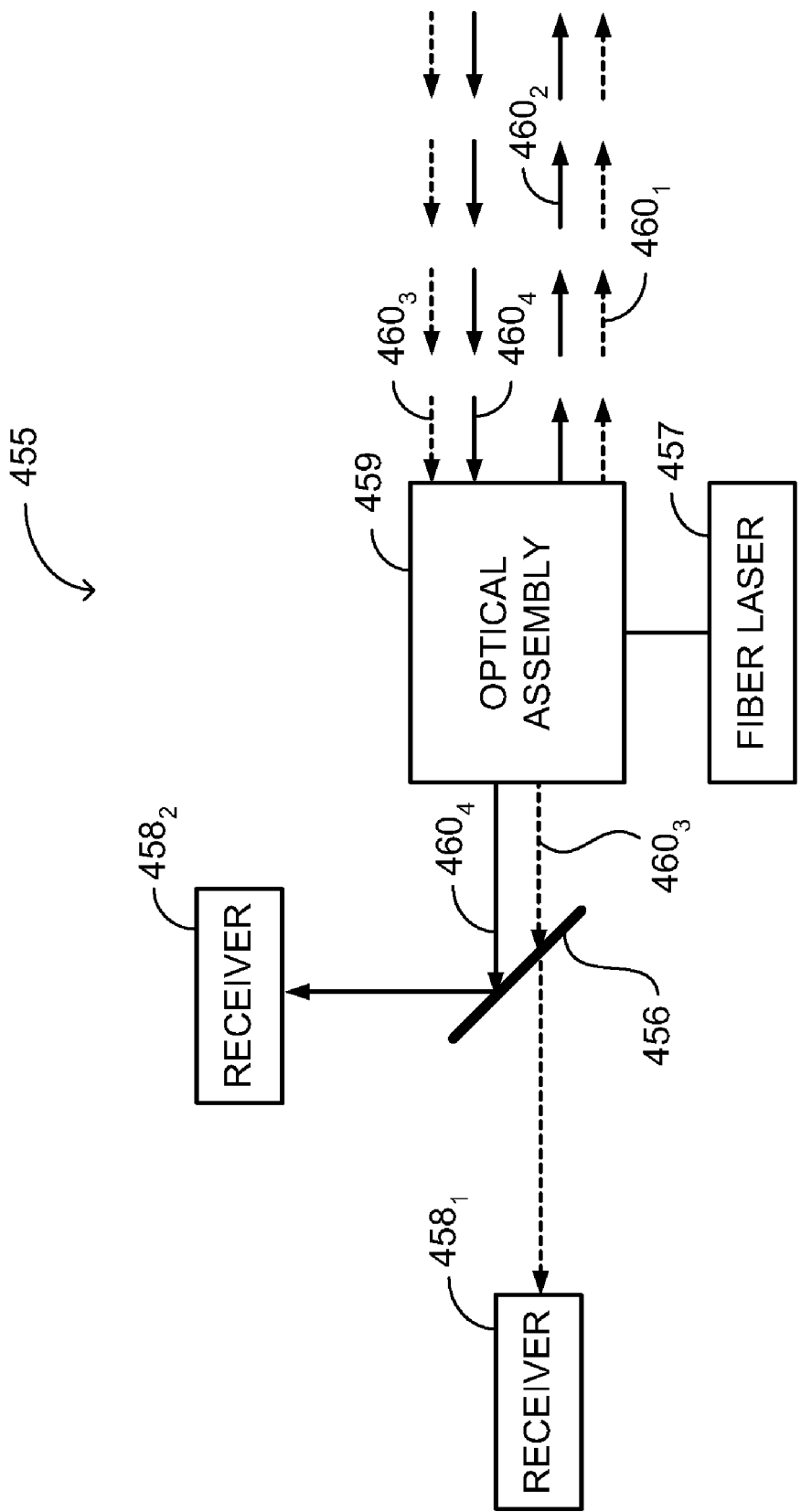
FIG. 9 is a schematic illustration of a double LIDAR system, constructed and operative in accordance with a further embodiment of the disclosed technique.

Reference is now made to FIG. 9, which is a schematic illustration of a double LIDAR system, generally referenced 455, constructed and operative in accordance with a further embodiment of the disclosed technique. Double LIDAR system 455 includes a fiber laser 457, an optical assembly 459, a reflecting-transmitting plate 456, and two receivers $458_1$ and $458_2$. Fiber laser 457 is optically coupled with optical assembly 459. Optical assembly 459 is optically coupled with reflecting-transmitting plate 456, whereby optical assembly 459 can provide pulsed beams of light to reflecting-transmitting plate 456. Receivers $458_1$ and $458_2$ are optically coupled with reflecting-transmitting plate 456, such that reflecting-transmitting plate 456 can reflect a pulsed beam of light towards receiver $458_2$ and transmit a pulsed beam of light towards receiver $458_1$.

Reflecting-transmitting plate 456 is constructed to reflect beams of light of one wavelength and transmit beams of light of another wavelength. Receivers $458_1$ and $458_2$ are constructed to only receive and detect specific wavelengths of light.

Fiber laser 457 generates two pulsed beams of light which differ only in wavelength. The two pulsed beams of light are separated in time, such that each pulsed beam of light is transmitted at different time. Fiber laser 457 provides the two generated pulsed beams of light, one at a time, to optical assembly 459. Optical assembly 459 is constructed to transmit the two pulsed beams of light $460_1$ and $460_2$ towards a volume of interest (not shown). Since pulsed beams of light $460_1$ and $460_2$ are transmitted at different times, each pulsed beam of light will reflect from a different section of the volume of interest. Pulsed beams of light $460_1$ and $460_2$ will impinge upon obstacles (not shown) in front of system 455 and reflect back to optical assembly 459. Reflected pulsed beams of light $460_3$ and $460_4$ are then received by optical assembly 459. Reflected pulsed beams of light $460_3$ and $460_4$ are then directed towards reflecting-transmitting plate 456.

Reflecting-transmitting plate 456 is constructed to transmit reflected pulsed beam of light $460_3$ towards receiver $458_1$, based on its wavelength. Reflecting-transmitting plate 456 is also constructed to reflect reflected pulsed beam of light $460_4$ towards receiver $458_2$, based on its wavelength. Receiver $458_1$ receives reflected pulsed beam of light $460_3$, and receiver $458_2$ receives reflected pulsed beam of light $460_4$. It is noted that receiver $458_1$ is constructed to only receive and detect the wavelength of reflected pulsed beam of light $460_3$, and that receiver $458_2$ is constructed to only receive and detect the wavelength of reflected pulsed beam of light $460_4$.

In general LIDARs are set to operate at one operational wavelength. In order to scan a volume of interest with a LIDAR system using two operational wavelengths, two complete LIDAR systems are required. Since the laser used in a LIDAR system is quite bulky and heavy, setting up two complete LIDAR systems on a vehicle can be cumbersome and expensive. In contrast, according to the disclosed technique, double LIDAR system 455 allows a single complete LIDAR system to operate at two operational wavelengths and direct reflections of the two operational wavelengths to receivers specific for each wavelength. Accordingly, double LIDAR system 455 performs the functionality of two LIDAR systems while taking up the volume of only one LIDAR system. Since the size of a receiver used in a LIDAR is negligible in comparison to the size of the laser used in a LIDAR, adding a second receiver to a LIDAR system, according to the disclosed technique, does not significantly increase the volume of a LIDAR system, whereas adding a second laser to a LIDAR system would significantly increase the volume of a LIDAR system.

It is noted that using double LIDAR system 455, the FOV of double LIDAR system 455 can be scanned at twice the rate of a conventional LIDAR system. This doubling of the scan rate is achieved by transmitting a second pulsed beam of light of a different wavelength to the FOV while a first pulsed beam of light is reflecting from objects in the FOV, without having the two pulsed beams of light interfere. Also, during the scanning period of a conventional LIDAR system, the volume of the FOV of double LIDAR system 455 can be doubled over the volume of the FOV of a conventional LIDAR system. This doubling of the volume of the FOV of double LIDAR system 455 is achieved by transmitting pulsed beams of light at two different operational wavelengths almost simultaneously, to different sections of the FOV of double LIDAR system 455. Since twice as many pulsed beams of light can be transmitted by double LIDAR system 455, double LIDAR system 455 can scan twice the volume of the FOV of a conventional LIDAR system.

Figure 10A:
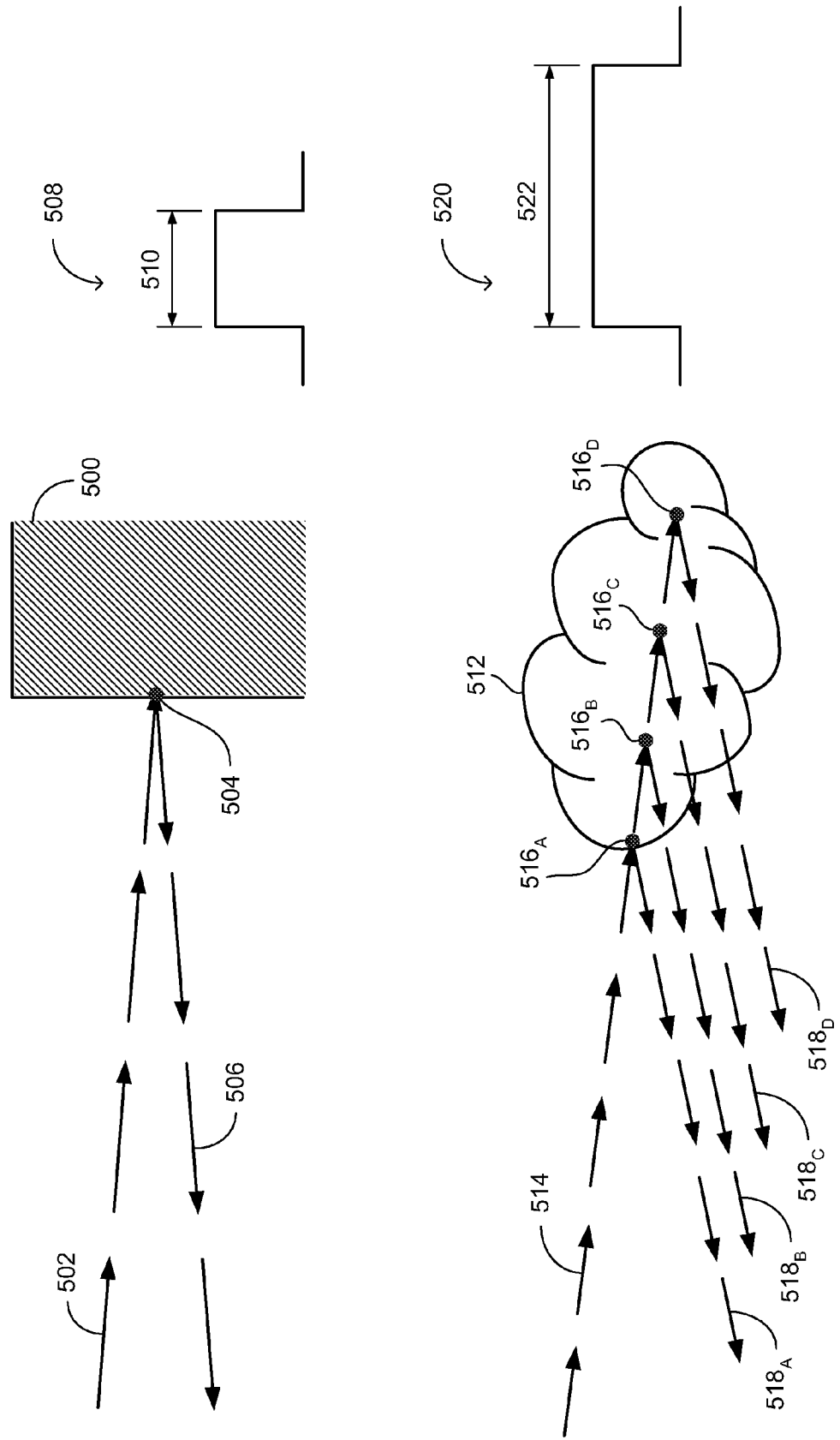
FIG. 10A is a schematic illustration of light beams reflecting off of different types of surfaces, constructed and operative in accordance with another embodiment of the disclosed technique.

Reference is now made to FIG. 10A, which is a schematic illustration of light beams reflecting off of different types of surfaces, constructed and operative in accordance with another embodiment of the disclosed technique. FIG. 10A depicts the difference in how light beams reflect off the surface of a solid object 500, and a clutter object 512. Solid object 500 may be the wall of a building, an antenna, power lines, a pole, or any other target or obstacle of significance to an operator of a vehicle. Solid object 500 can be referred to as a hard object. Clutter object 512 may be a cloud, dust particles, rain, smoke, snowfall or any other type of weather condition which reduces visibility. Clutter object 512 can be referred to as a soft object.

When light beam 502 impinges on solid object 500 at point 504, since solid object 500 is solid, light beam 502 reflects off of solid object 500 at point 504, thereby producing a reflected light beam 506. A schematic illustration of reflected light beam 506 is shown as a pulse 508. Pulse 508 is defined by a pulse width in time, which extends over a time range 510. In general, since light beam 502 will not penetrate solid object 500 at all (due to the hardness of solid object 500), then the pulse width of light beam 502 will be substantially the same as the pulse width of reflected light beam 506. The pulse width of reflected light beam 506 may be slightly longer than the pulse width of light beam 502 due to the texture of the surface of solid object 500 which light beam 502 impinges on.

When a light beam 514 impinges on clutter object 512, since clutter object 512 is not completely solid, light beam 514 will reflect off of clutter object 512 at points 516$_A$, 516$_B$, 516$_C$ and 516$_D$. Each point of reflection will thereby produce a reflected light beam, for example reflected light beams 518$_A$, 518$_B$, 518$_C$ and 518$_D$. Since light beam 514 will penetrate clutter object 512 at various depths (due to the softness of clutter object 512), reflected light beams 518$_A$, 518$_B$, 518$_C$ and 518$_D$ will each be received by a receiver (not shown) at slightly different times, thereby resulting in a single perceived reflected light beam (which is actually many reflected light beams arriving at the receiver in an overlapping manner) with a perceived pulse width which is much large than the pulse width of light beam 514. Since many reflected light beams arrive at the receiver in an overlapping manner, the single perceived reflected light beam can be though of as a "smeared" reflected light beam.

In this regard, the amount of smearing refers to how overlapped the many reflected light beams are with one another. If the reflected light beams are largely overlapped, then the amount of smearing is low, since the arrival time of each of the reflected light beams is very close to one another. This indicates that the clutter object is significantly solid, as the transmitted light beam only reflected over a small range of depth of the clutter object. If the reflected light beams are barely overlapped, then the amount of smearing is high, since the arrival time of each of the reflected light beams is far from one another. This indicates that the clutter object is not solid at all, as the transmitted light beam reflected over a large range of depths of the clutter object.

A schematic illustration of the perceived pulse of reflected light beams 518$_A$, 518$_B$, 518$_C$ and 518$_D$ is shown as a pulse 520. Pulse 520 is defined by a pulse width in time, which extends over time range 522. The pulse width of pulse 520 is much larger than the pulse width of light beam 514. In general, clutter objects reduce the visibility of an operator of a vehicle. Furthermore, since clutter objects also reflect light beams, clutter objects make it difficult for an operator of a vehicle to discern whether reflected light beams reflected from solid objects or from clutter objects.

Figure 10B:
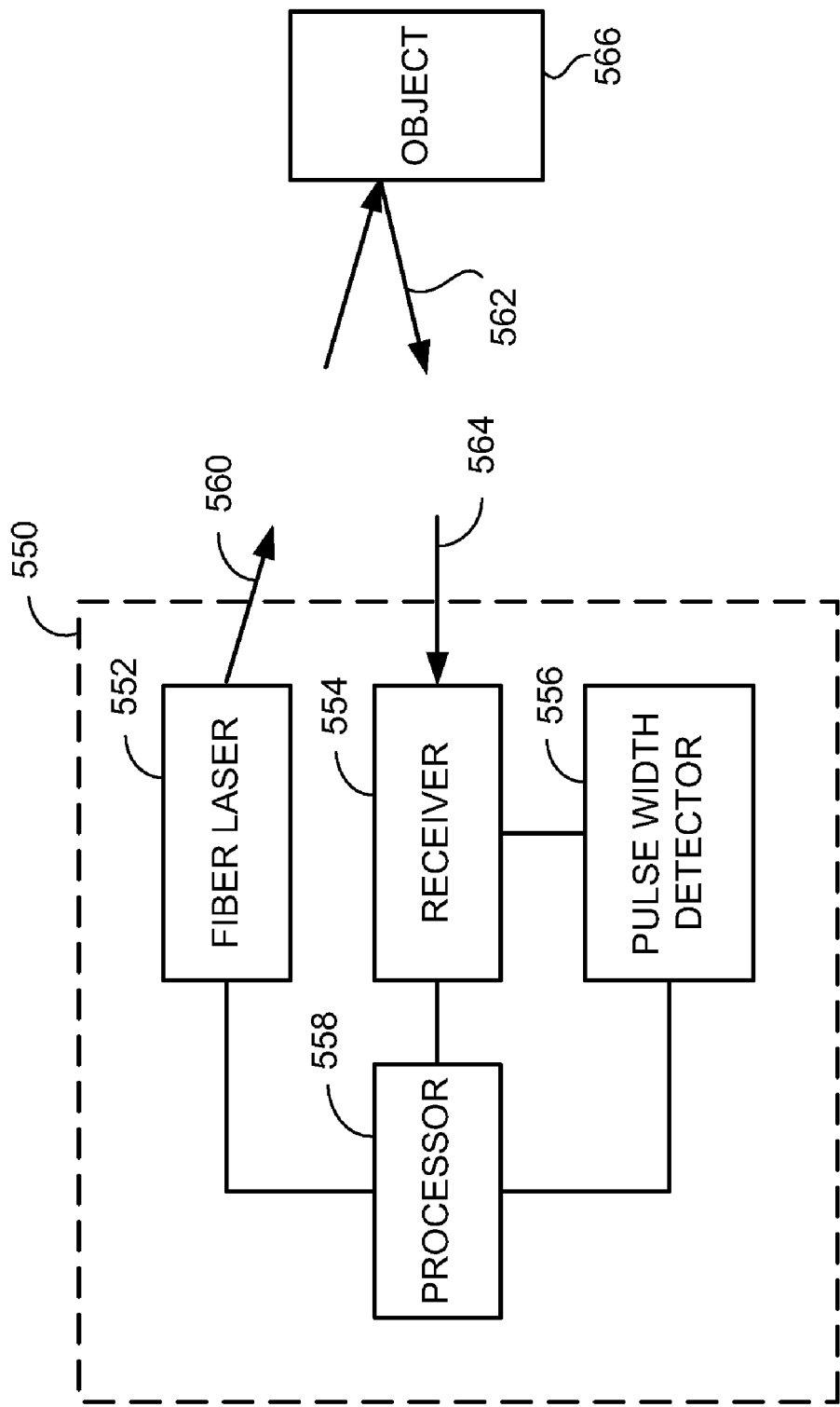
FIG. 10B is a schematic illustration of a system for distinguishing reflections from objects and from clutter, constructed and operative in accordance with a further embodiment of the disclosed technique.

Reference is now made to FIG. 10B, which is a schematic illustration of a system, generally referenced 550, for distinguishing reflections from objects and clutter, constructed and operative in accordance with a further embodiment of the disclosed technique. System 550 includes a fiber laser 552, a receiver 554, a pulse width detector 556 and a processor 558. System 550 may be mounted on a vehicle (not shown). Fiber laser 552 is coupled with processor 558. Receiver 554 is coupled with processor 558 and with pulse width detector 556. Pulse width detector 556 is coupled with processor 558. Pulse width detector 556 can be a notch filter, a plurality of notch filters, a signal processor or any other device enabled to detect the pulse width of a reflected beam of light. In an embodiment of the disclosed technique, if a notch filter is used, then the notch filter should include a plurality of narrow band pass filters. At least one of the narrow band pass filters should include at least one RCL circuit for detecting low, middle and high frequency pulse widths.

Fiber laser 552 generates and transmits a pulsed beam of light 560 towards a volume of interest (not shown). Pulsed beam of light 560 will impinge upon an object 566, which may either be a solid object or a clutter object. A reflected pulsed beam of light 562 will reflect back towards receiver 554. Receiver 554 will receive a reflected pulsed beam of light 564. Pulse width detector 556 then detects the pulse width of reflected pulsed beam of light 564. If pulse width detector 556 is a signal processor, then pulse width detector 556 also detects, and rejects, background signals impinging upon system 550. Background signals are signals impinging upon receiver 554 which were not initially generated and transmitted by fiber laser 552 (i.e., signals other than reflected pulsed beams of light 562 and 564). Background signals can be characterized by a signal intensity which is below a predetermined detection threshold.

If pulse width detector 556 is a signal processor, then it also adjusts the predetermined detection threshold which differentiates reflected pulsed beam of light 564 from background signals, where reflected pulsed beam of light 564 will have an intensity above the predetermined detection threshold, and background signals will have an intensity below the predetermined detection threshold. The predetermined threshold can be adjusted according to the average intensity of detected background signals. If pulse width detector 556 is a signal processor, it also detects the time of arrival of reflected pulsed beam of light 564, and selects an optimal mode for signal processing reflected pulsed beam of light 564.

Modes of signal processing the reflected pulsed beam of light can include detecting the rise time of reflected pulsed beam of light 564, detecting the maximum amplitude of reflected pulsed beam of light 564, integrating a plurality of reflected pulsed beams of light and then averaging the detected characteristics of the beams (e.g., the average rise time of the reflected pulsed beams of light), using weighted calculations when determining characteristics of the reflected pulsed beam of light, and the like. The optimal mode can be selected automatically by pulse width detector 556 or it can be selected manually by a user. Factors used in determining the optimal mode can include the geographical location and climate where system 550 is used (e.g., Israel and a desert climate, Alaska and a tundra climate), as well as whether system 550 is used over land or over sea.

In an embodiment of the disclosed technique, using the detected pulse width of reflected pulsed beam of light 564, and the original pulse width of pulsed beam of light 560, processor 558 then classifies reflected pulsed beam of light 564 as a reflection from either a solid object or a reflection from a clutter object. In another embodiment of the disclosed technique, processor 558 classifies reflected pulsed beam of light 564 according to its amount of smearing. In this embodiment, reflected pulsed beam of light 564 is classified on a scale which ranges from a pure solid object to a pure clutter object. In a further embodiment of the disclosed technique, if a predetermined number of reflected pulsed beams of light are classified as clutter objects in a predetermined time period, then processor 558 provides a low visibility indication, indicating that too many clutter objects are present in the volume of interest. Too many clutter objects present in the volume of interest make it difficult for system 550 to detect the presence of solid objects in the volume of interest.

Figure 11:
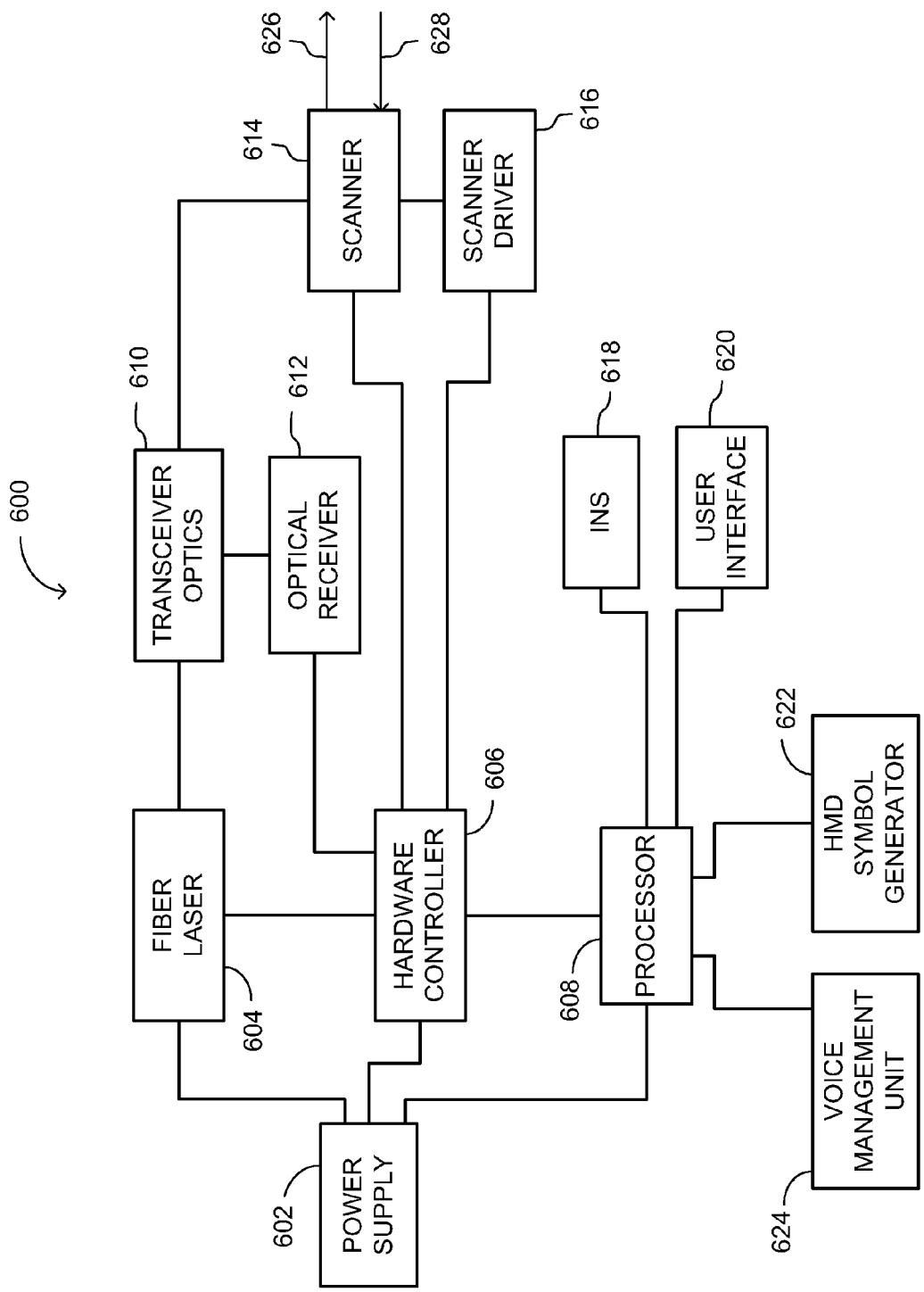
FIG. 11 is a schematic illustration of a system, constructed and operative in accordance with another embodiment of the disclosed technique.

Reference is now made to FIG. 11, which is a schematic illustration of a system, generally referenced 600, constructed and operative in accordance with another embodiment of the disclosed technique. System 600 depicts a LADAR system, which can be mounted on a vehicle (not shown). System 600 includes a power supply 602, a fiber laser 604, a hardware controller 606, a processor 608, transceiver optics 610, an optical receiver 612, a scanner 614, a scanner driver 616, an INS 618, a user interface 620, a helmet mounted display (HMD) symbol generator 622 and a voice management unit 624. System 600 can also include a global positioning system (herein abbreviated GPS), an altimeter and a weight sensor (none shown).

Hardware controller 606 is coupled with power supply 602, fiber laser 604, processor 608, optical receiver 612, scanner 614 and with scanner driver 616. Processor 608 is further coupled with power supply 602, INS 618, user interface 620, HMD symbol generator 622 and with voice management unit 624. Power supply 602 is further coupled with fiber laser 604. Transceiver optics 610 is optically coupled with fiber laser 604, optical receiver 612 and with scanner 614. Scanner 614 is further coupled with scanner driver 616. The GPS and the altimeter are coupled with the processor. The weight sensor is coupled with the wheels of the vehicle and with the processor.

Transceiver optics 610 includes a plurality of optical elements (not shown), such as a beam combiner (for aligning the transmitted laser beam and the received reflected laser beam onto the same optical axis), a telescope, a deflecting mirror, and the like. Transceiver optics 610 is operative to transmit and receive beams of light on a single optical axis. Fiber laser 604 is constructed and operative in a manner similar to fiber laser 150 (FIG. 2). Hardware controller 606 is operative to coordinate and synchronize the operation of fiber laser 604, scanner driver 616 and processor 608. User interface 620 allows a user (not shown) to operate system 600, and to set the characteristics of system 600 for a given operation scenario.

Power supply 602 provides electrical power to fiber laser 604, hardware controller 606 and processor 608. Fiber laser 604 generates a pulsed beam of light, which is provided to transceiver optics 610. Transceiver optics 610 transmits the pulsed beam of light to scanner 614.

INS 618 continuously detects the motion of the vehicle (i.e., the position and the orientation), on which system 600 is mounted, in real-time, and provides this information to processor 608. Processor 608 uses the position and orientation information to instruct hardware controller 606 to set scanner driver 616 to the appropriate mode of operation. Scanner driver 616 can be set to different modes of operation depending on the detected motion of the vehicle, as was depicted in FIGS. 8A, 8B, 8C, 8D, 8E, 8F and 8G. Hardware controller 606 sets scanner driver 616 to a required mode of operation. Scanner driver 616 then mechanically sets the mode of operation of scanner 614, which will scan a volume of interest in front of LADAR system 600. The pulsed beam of light, which is provided to scanner 614 by transceiver optics 610, is then emitted as an output pulsed beam of light 626, towards the volume of interest of system 600. Hardware controller 606 can also set scanner 614 to scan a volume of interest which is located at a predetermined distance in front of LADAR system 600. For example, processor 608 can predict, based on the data regarding the motion (e.g., speed, heading, altitude and the like) of LADAR system 600 provided by INS 618, the location of LADAR system 600 in 10 seconds. Using this location prediction, hardware controller 606 can set scanner 614 to scan the volume of interest which LADAR system 600 will encounter in 10 seconds, and not the volume of interest it is currently encountering.

Processor 608 also uses the position and orientation information, detected by INS 618, to instruct hardware controller 606 to set fiber laser 604 to a particular mode of operation. Fiber laser 604 can operate in a number of modes of operation, depending on the change in motion of the vehicle, as was depicted in FIGS. 6A and 6B.

Pulsed light beam 626 is reflected off of an object (not shown), in the scanned volume of interest of system 600, as a reflected pulsed light beam 628. Reflected pulsed light beam 628 is detected by optical receiver 612 via scanner 614 and transceiver optics 610. Optical receiver 612 provides hardware controller 606 with information indicative of the characteristics of reflected pulsed light beam 628. Hardware controller 606 then sets fiber laser 604 to a particular mode of operation, according to the characteristics of reflected pulsed light beam 628.

The characteristics of reflected pulsed light beam 628 may indicate that the object, from which reflected pulsed light beam 628 was reflected from, is an obstacle presenting a possible hazard to the vehicle. In this case, hardware controller 606 provides processor 608 with information regarding a possible hazard to the vehicle. Processor 608 then sets HMD symbol generator 622 and voice management unit 624 to an appropriate mode of operation to convey this information to the user.

HMD symbol generator 622 indicates the presence of a possibly hazardous obstacle, in the path of the vehicle, to a vehicle operator (not shown) through a visual effect. Voice management unit 624 indicates the presence of a possibly hazardous obstacle, in the path of the vehicle, to the vehicle operator through an acoustic effect (e.g. a beeping sound, a human voice, and the like). HMD symbol generator 622 and voice management unit 624 can also provide the vehicle operator with information regarding the location and the nature (e.g. the size and type of obstacle) of the possibly hazardous obstacle, as received by processor 608.

The GPS detects the position of the vehicle in a given coordinate system and the altimeter detects the height of the vehicle. The detected position and height of the vehicle are provided to processor 608. Processor 608 uses the detected position and height of the vehicle to increase the accuracy of the detected motion of the vehicle detected by INS 618. The weight sensor detects the weight on the wheels of the vehicle, and provides the detected weight to processor 608. Processor 608 uses the detected weight to determine if the vehicle is on the ground or if the vehicle is airborne (i.e., the flight state of the vehicle). The detected weight is used by processor 608 to increase the operational safety of fiber laser 604 by preventing the use of fiber laser 604 (e.g., by not sending power to fiber laser 604) unless the vehicle is airborne. It is noted that the altimeter and the weight sensor are generally used when the vehicle is an airborne vehicle.

Figure 12:
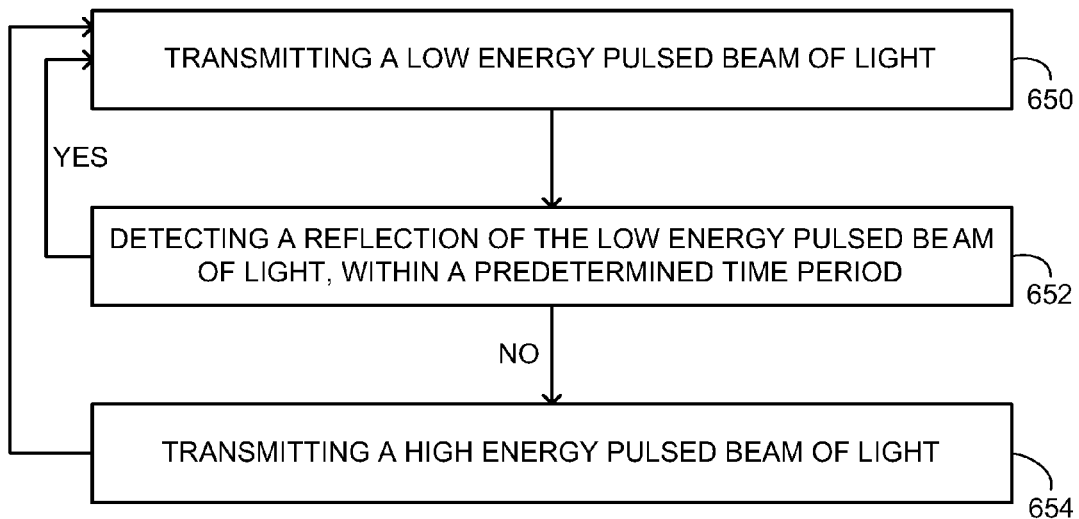
FIG. 12 is a schematic illustration of a method for wire detection, operative in accordance with a further embodiment of the disclosed technique.

Reference is now made to FIG. 12, which is a schematic illustration of a method for wire detection, operative in accordance with a further embodiment of the disclosed technique. FIG. 12 also illustrates a method for preventing receiver burnout in a LORD system. In procedure 650, a low energy pulsed beam of light is transmitted to a volume of interest to detect objects, for example, to detect telephone wires hanging between posts. With reference to FIG. 3C, system 240 first transmits low energy pulsed beam of light 246, and waits to see if receiver 244 receives a reflection from objects in the volume of interest in front of system 240.

In procedure 652, a reflection of the low energy pulsed beam of light is detected within a predetermined amount of time. If the transmitted low energy pulsed beam of light impinges upon an object having high reflectance in the volume of interest, then a reflected low energy pulsed beam of light will be received and the method returns to procedure 650. Reflections from objects having high reflectance beyond the volume of interest will also be received, although such reflections may be of very low energy due to the distance over which the reflections must travel. If the transmitted low energy pulsed beam of light does not impinge upon an object having high reflectance in the volume of interest, but upon another object, then a reflected low energy pulsed beam of light will not be received, as the reflected low energy pulsed beam of light will dissipate before it is received, and the method then proceeds to procedure 654.

With reference to FIG. 3C, system 240 first transmits low energy pulsed beam of light 246, and waits to see if receiver 244 receives a reflection from objects in the volume of interest in front of system 240. When low energy pulsed beam of light 246 is reflected from power lines 252, a pulsed beam of light 254 (dotted arrows) is reflected back towards receiver 244. Since power lines 252 are very thin and are not highly reflective objects, pulsed beam of light 254 is significantly lower in energy than low energy pulsed beam of light 246. In fact, pulsed beam of light 254 is so low in energy that it dissipates before it is received by receiver 244.

In procedure 654, if the reflected low energy pulsed beam of light is not received, after a predetermined amount of time, ranging from a few microseconds to hundreds of microseconds, or if the energy level of the received reflected pulsed beam of light does not exceed a predetermined threshold, then a high energy pulsed beam of light is transmitted to the volume of interest. After the high energy beam of light is transmitted, the method returns to procedure 650, where a low energy pulsed beam of light is transmitted. With reference to FIG. 3C, after a waiting period, ranging from a few microseconds to hundreds of microseconds, if receiver 244 does not receive pulsed beam of light 254 (which it will not, from hard-to-see objects), or if the energy level of a reflected pulsed beam of light does not exceed a predetermined threshold, then fiber laser 242 sends out high energy pulsed beam of light 248.

According to the method of FIG. 12, hard-to-see objects in a volume of interest can be detected by high energy pulsed beams of light, with no risk of burning out the receivers in a LORD system, since a low energy pulsed beam of light is initially transmitted to a volume of interest to verify if any objects having high reflectance, such as retro-reflectors are present in the volume of interest. If objects having high reflectance are present, then the high energy pulsed beam of light is not transmitted, thereby preventing receiver burn-out. If objects having high reflectance are not present, then the high energy pulsed beam of light is transmitted, thereby allowing hard-to-see objects, such as telephone wires, to be detected.

It is noted that even if the high energy pulsed beam of light reflects from an object having high reflectance that is located beyond the volume of interest, then the receivers of the LORD system will also not burn-out, as the reflected pulsed beam of light will be of low energy if it reflected from a distance that is larger than the volume of interest. As mentioned above, with reference to FIG. 3C, in general, the volume of interest is defined as a volume beyond which even high energy pulsed beams of light reflecting from objects having high reflectance will impinge upon a receiver as low energy pulsed beams of light.

Figure 13:
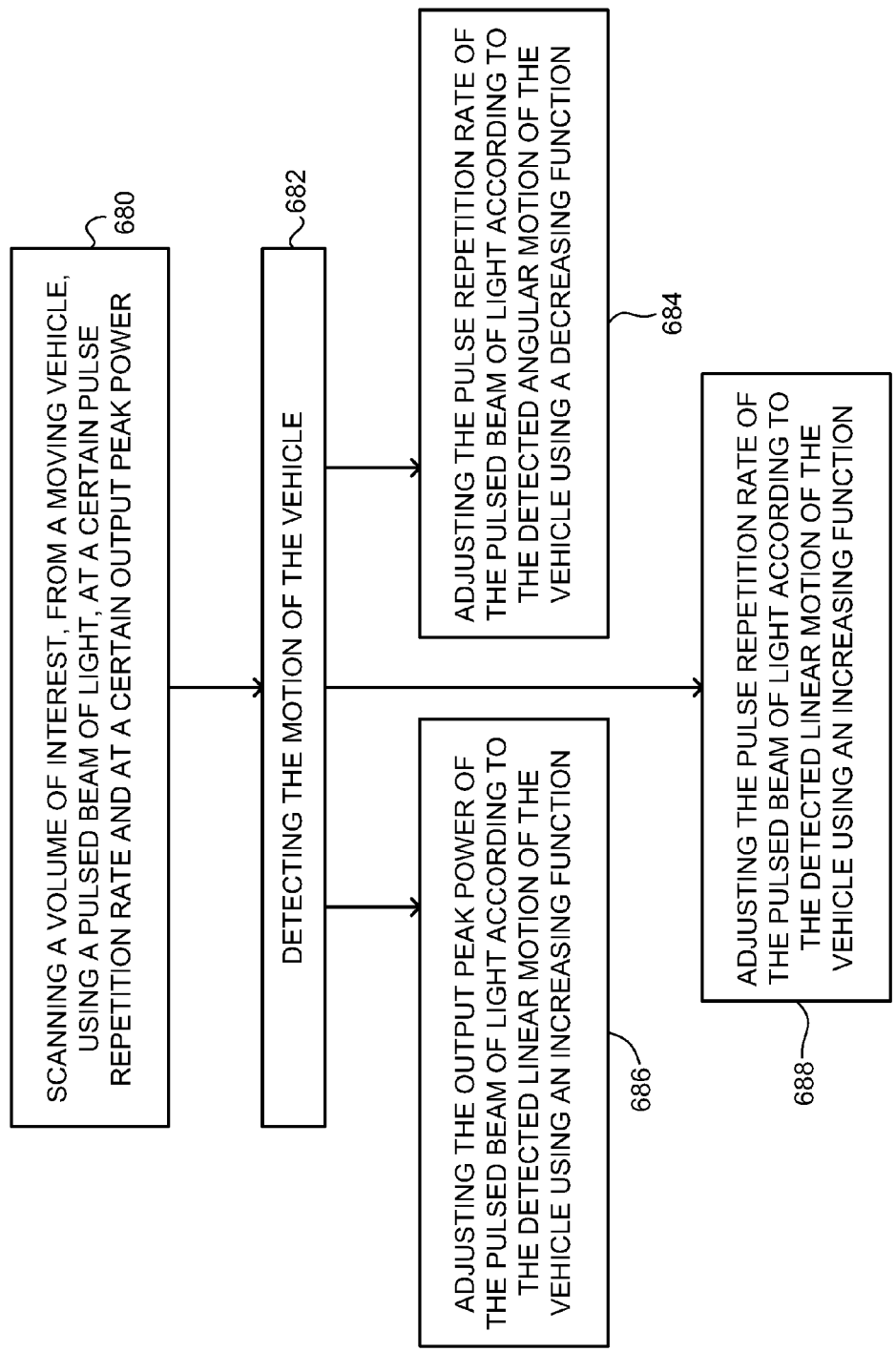
FIG. 13 is a schematic illustration of a method, operative in accordance with another embodiment of the disclosed technique.

Reference is now made to FIG. 13, which is a schematic illustration of a method, operative in accordance with another embodiment of the disclosed technique. In procedure 680, a volume of interest is scanned from a moving vehicle, using a pulsed beam of light, at a certain PRR and at a certain output peak power. The volume of interest is scanned with a LORD system. With reference to FIG. 5A, system 320 is a LORD system, mounted on a vehicle. Fiber laser 324 scans a volume of interest in front of system 320 using pulsed beams of light to detect obstacles, and in particular hard-to-see obstacles, which may be in the volume of interest.

In procedure 682, the motion of the vehicle is detected. It is noted that the motion of the vehicle refers to the angular velocity and the angular acceleration and to the linear velocity (i.e., the speed) and the linear acceleration of the vehicle, as well as whether the vehicle is moving in a straight direction or whether the vehicle is turning, and the rate of change in the direction of motion of the vehicle. With reference to FIG. 5A, motion detector 326 constantly detects the motion of vehicle 322, and provides a signal to controller 325 indicative of the changes in motion of vehicle 322.

In an alternative to procedure 682, if the LORD system is attached to a gimbals, where it is free to move in a plurality of directions, then the motion of the LORD system is detected with respect to the vehicle. With reference to FIG. 5A, in the embodiment where fiber laser 324 is attached to the gimbals, motion detector 326 detects and determines the motion of vehicle 322 as well as the motion of fiber laser 324 with respect to vehicle 322.

In procedure 684, the PRR of the pulsed beams of light is adjusted according to the detected angular motion of the vehicle using a decreasing function. In general, the PRR is a function of the angular velocity alone, although the angular acceleration can also be factored into the function in order to correct for errors in the adjustments of the PRR according to changes in the detected angular velocity, as is known in the art. The PRR of the pulsed beams of light is adjusted according to the detected angular motion in order to maintain the scan density of the pulsed beams of light and to provide an operator with information about obstacles in front of her with enough time for her to avoid them. The angular motion of the vehicle can include either the angular velocity of the vehicle, the angular acceleration of the vehicle, or both). For example, if the vehicle is traveling in a straight direction (i.e., no angular velocity, such that the rate of change of motion of the vehicle is equal to zero), then the PRR of the pulsed beam of light is increased, and is set to be high. The PRR is increased because the flight path of the moving vehicle is less predictable when the vehicle is traveling in a straight direction. As described above in FIG. 8D, since the flight path of the moving vehicle is less predictable when the vehicle is traveling in a straight direction, the FOV of the scan is increased. By increasing the FOV of the scan, the PRR needs to be increased in order to maintain the scan density of the pulsed beams of light. As mentioned above, maintaining the scan density is at the discretion of the operator of the vehicle.

If the vehicle is not moving in a straight path, but rather in a curved path, since the direction of travel of the vehicle is constantly changing (i.e., the angular velocity of the vehicle is high), the PRR of the pulsed beam of light is decreased. Since the LOS of the LORD system is changing in a particular direction, there is more predictability in terms of where the vehicle is heading, and as such the PRR is decreased because an operator of the vehicle only needs to see obstacles in front of her that are directly in her changing LOS. As mentioned above in FIG. 8E, since the flight path of the vehicle is more predictable, the FOV of the scan can be reduced. By reducing the FOV of the scan, the PRR can be reduced to maintain the scan density of the pulsed beams of light. Therefore, as at least one of the angular velocity and angular acceleration of the vehicle increases, the PRR of the pulsed beams of light is decreased using a decreasing function, and as at least one of the angular velocity and angular acceleration of the vehicle decreases, the PRR of the pulsed beams of light is increased.

With reference to FIG. 5A, in order to increase the energy efficiency of system 320, and to provide an operator with information about obstacles in front of her with enough time for her to avoid them, controller 325 adjusts the PRR of the pulsed beams of light transmitted by fiber laser 324 according to the detected angular motion of the vehicle. With reference to FIG. 6B, the PRR of fiber laser 324 (FIG. 5A) is increased as the angular velocity of helicopter 350 decreases, since the flight path of helicopter 350 will be more uncertain in a given time period than when traveling at higher angular velocities. At high angular velocities, the probability of the pilot being in need of information regarding obstacles located outside the flight path is decreased, for example in helicopter 356, since a curved flight path is more predictable of the current general motion of the helicopter than a straight flight path. In this case, the PRR of fiber laser 324 is decreased.

In an alternative to procedure 684, if the LORD system is attached to a gimbals, then the PRR of the pulsed beams of light is adjusted according to the detected angular motion of the LORD system, in order to increase the energy efficiency of the LORD system and to provide an operator with information about obstacles in front of her with enough time for her to avoid them. With respect to FIG. 5A, in the embodiment where fiber laser 324 is attached to a gimbals, the change in PRR of the pulsed beam of light is a function of the degree to which the direction of fiber laser 324 changes with respect to vehicle 322.

In procedure 686, the output peak power of the pulsed beams of light is adjusted according to the detected linear motion of the vehicle using an increasing function. For example, if the vehicle is traveling in a straight direction at high speeds, the output peak power of the pulsed beam of light is increased, since the vehicle will be covering more distance per unit time. At higher speeds, an increase in the output peak power is needed such that objects which are much farther in front of the vehicle can be detected, such as objects located a few hundred meters, or a few kilometers in front of the vehicle. At higher speeds, the reaction time of the operator is reduced, therefore, an increase in the output peak power of the pulsed beam of light is needed to increase the distance from which objects can be seen by the operator. By increasing the distance from which objects can be seen, the reduced reaction time of the operator can be compensated for.

If the vehicle is moving in a straight direction at low speeds since less distance will be covered per unit time, the output peak power of the pulsed beam of light is decreased, since the operator of the vehicle only needs information about obstacles that are relatively nearby. At lower speeds, the reaction time of the operator is increased, and as such, the output peak power of the pulsed beam of light can be reduced. Therefore, as at least one of the linear velocity and linear acceleration of the vehicle increases, the output peak power of the pulsed beams of light is also increased, and as at least one of the linear velocity and linear acceleration of the vehicle decreases, the output peak power of the pulsed beams of light is also decreased. With reference to FIG. 5A, when vehicle 322 is traveling in a straight direction at high speeds, the output peak power of fiber laser 324 is increased by controller 325 so as to provide an increase in the detection range in front of vehicle 322 of system 320. And likewise, when vehicle 322 is traveling in a straight direction at low speeds, the output peak power of fiber laser 324 is decreased by controller 325 so as to provide a decrease in the detection range in front of vehicle 322 of system 320.

With reference to FIG. 6A, since the pilot needs information about obstacles that are much farther in front of her, because helicopter 340 is traveling in a straight direction at high speeds, the output peak power of fiber laser 324 (FIG. 5A) is increased by controller 325 (FIG. 5A), thereby increasing the detection range of system 320. Also, in the case where helicopter 345 is traveling in a straight direction at low speeds, since the pilot needs information about obstacles that are relatively nearby, because helicopter 345 does not cover that much distance per unit time, and the reaction time of the pilot is increased, the output peak power of fiber laser 324 (FIG. 5A) is reduced by controller 325. This reduction in output peak power is executed because increasing the detection range of system 320 does not give the pilot anymore useful information about obstacles in front of her since the vehicle is not covering significant distance per unit time.

In an alternative to procedure 686, if the LORD system is attached to a gimbals, then the output peak power of the pulsed beams of light is adjusted according to the detected linear motion of the LORD system. With respect to FIG. 5A, in the embodiment where fiber laser 324 is attached to a gimbals, the change in output peak power of the pulsed beam of light is a function of the degree to which the linear velocity of fiber laser 324 changes with respect to vehicle 322.

In procedure 688, the PRR of the pulsed beams of light is adjusted according to the detected linear motion of the vehicle, using an increasing function, in order to increase the energy efficiency of the LORD system and to provide an operator with information about obstacles in front of her with enough time for her to avoid them. Furthermore, the PRR of the pulsed beams of light is adjusted to maintain the scan density of the pulsed beams of light. The linear motion of the vehicle can include the linear velocity of the vehicle, the linear acceleration of the vehicle or both. For example, if the vehicle is traveling at low speeds, then the PRR of the pulsed beam of light is reduced, and is set to be low. At low speeds, the probability of the pilot being in need of information regarding obstacles located farther in her LOS (hence a decrease in the PRR of fiber laser 324) is decreased since she will be approaching them at a decreased rate. Also, as described above in FIG. 8B, at lower speeds, the FOV of the scan is reduced. As such, in order to maintain the scan density of the pulsed beams of light, the PRR is reduced as well. Furthermore, since lesser distances are being traversed, a less rapid rate of pulses needs to be transmitted to maintain the quality of the received image. Also, at low speeds, the most significant obstacles to the vehicle will lie directly in the LOS of the operator.

If the vehicle is moving at high speeds, since the vehicle will traverse distances quicker, the PRR of the pulsed beam of light is increased. At high speeds, the probability of the pilot being in need of information regarding obstacles located further in her LOS (hence an increase in the PRR of fiber laser 324) in increased since she will be approaching them at an increased rate. As described above in FIG. 8C, at higher speeds, the FOV of the scan is increased. As such, in order to maintain the scan density of the pulsed beams of light, the PRR is increased as well. Furthermore, since greater distances are being traversed, a more rapid rate of pulses needs to be transmitted (i.e., the scan density of the pulses needs to be increased) to maintain the quality of the received image. Therefore, as the speed of the vehicle increases, the PRR of the pulsed beams of light is increased, according to an increasing function, and as the speed of the vehicle decreases, the PRR of the pulsed beams of light is decreased. It is noted that the change in PRR according to the linear motion of the vehicle is at the discretion of the operator, since situations may arise where the operator may not want to maintain a constant scan density (and therefore a constant image quality).

With reference to FIG. 5A, in order to increase the energy efficiency of system 320, and to provide an operator with information about obstacles in front of her with enough time for her to avoid them, controller 325 adjusts the PRR of the pulsed beams of light transmitted by fiber laser 324 according to the detected linear motion of the vehicle. With reference to FIG. 6A, if helicopter 340 travels in a straight direction at low speeds, which narrows the field of interest to the pilot, since less distance is covered per unit time, then controller 325 (FIG. 5A) decreases the PRR of fiber laser 324 (FIG. 5A). The decrease in the PRR is also a result of a decrease in the FOV of the scan of fiber laser 324 (not shown). If helicopter 346 travels in a straight direction at high speeds, which widens the field of interest to the pilot, since more distance is covered per unit time, then controller 325 increases the PRR of fiber laser 324. The increase in the PRR is also a result of an increase in the FOV of the scan of fiber laser 324 (not shown).

Figure 14:
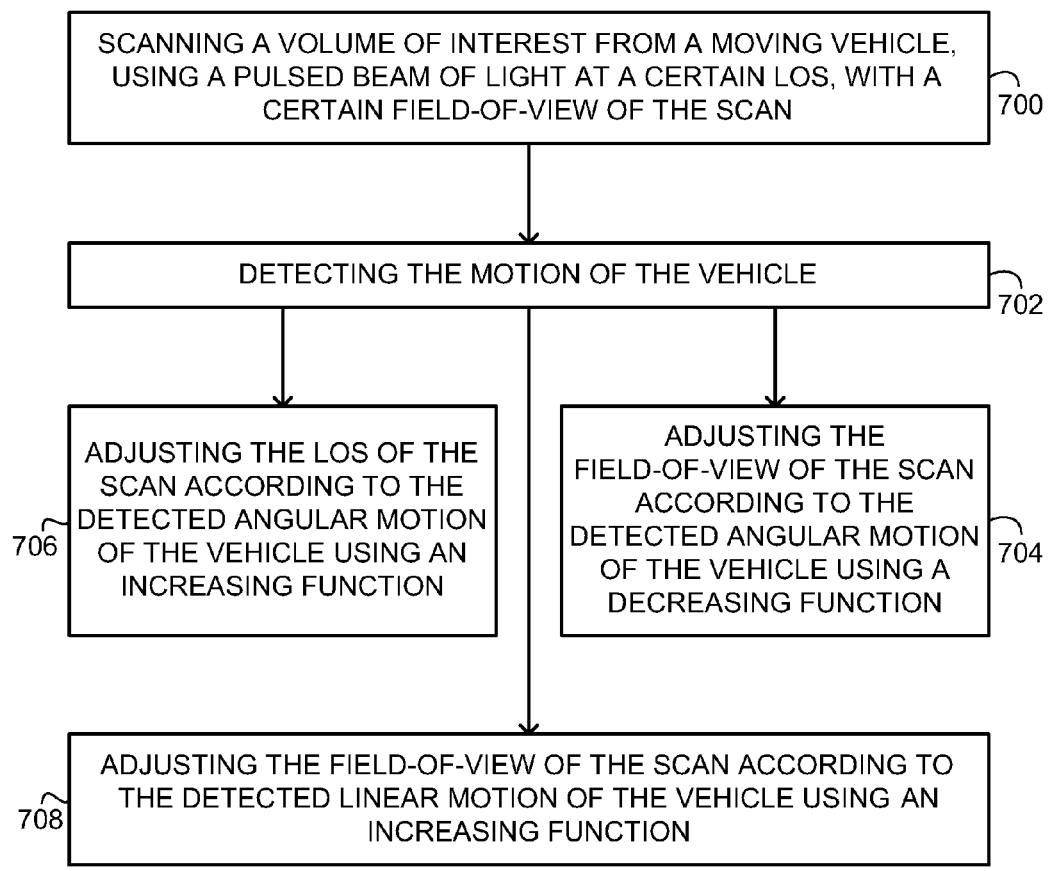
FIG. 14 is a schematic illustration of a method, operative in accordance with a further embodiment of the disclosed technique.

Reference is now made to FIG. 14, which is a schematic illustration of a method, operative in accordance with a further embodiment of the disclosed technique. In procedure 700, a volume of interest is scanned, from a moving vehicle, using a pulsed beam of light. It is noted that the scan has a certain FOV, and that the pulsed beam of light is at a certain LOS. With reference to FIG. 7, system 380 is a LORD system. Fiber laser 384 scans a volume of interest in front of system 380 using pulsed beams of light to detect obstacles, and in particular hard-to-see obstacles, which may be in the volume of interest.

In procedure 702, the motion of the vehicle is detected. It is noted that the vehicle is mounted with a LORD system. With reference to FIG. 7, motion detector 386 constantly detects the motion of vehicle 382, and provides a signal to controller 385 indicative of the changes in the motion of vehicle 382. For example, motion detector 386 can provide an indication to controller 385 that vehicle 382 is moving at a particular linear velocity and linear acceleration and at a particular angular velocity and angular acceleration.

In procedure 704, the FOV of the scan, (i.e., the width of the FOV in the vehicle plane) is adjusted according to the detected angular motion of the vehicle using a decreasing function. The angular motion of the vehicle can include the angular velocity of the vehicle, the angular acceleration of the vehicle, or both. For example, as the vehicle increases in angular velocity, the FOV of the scan of the LORD system is decreased. Since the vehicle is traveling at higher angular speeds, thereby resulting in a more predictable flight path, the FOV of the LORD system is decreased so that only the most significant volume of interest (i.e., the predicted flight path of the vehicle), is scanned. As the vehicle decreases in angular speed, the FOV of the scan of the LORD system is increased, thereby increasing the range of the scan of the LORD system. Since the vehicle is traveling at slower angular speeds, thereby resulting in a less predictable flight path for the vehicle, the FOV of the scan of the LORD system is increased so that a larger volume of interest, where obstacles to the vehicle can be found, is scanned.

With reference to FIG. 8D, as helicopter 430 decreases in angular speed, the spread angle 429 of the FOV of system 380 (FIG. 7) is increased by controller 385 (FIG. 7), thereby increasing a range 431 of the width of the spread angle of the FOV of system 380. With reference to FIG. 8E, as helicopter 435 increases in angular speed, the spread angle 436 of the FOV of system 380 is increased by controller 385, thereby increasing a range 438 of the width of the spread angle of the FOV of system 380.

In procedure 706, the LOS of the scan is adjusted according to the detected angular motion of the vehicle using an increasing function. The angular motion of the vehicle can include the angular velocity of the vehicle, the angular acceleration of the vehicle, or both. For example, as at least one of the angular velocity and the angular acceleration of the vehicle increases (i.e., the vehicle travels in a more curved direction), the angle through which the LOS of the scan is adjusted is increased. By adjusting the LOS of the scan of the FOV of the vehicle according to the angular motion of the vehicle, a pilot can get an image of the location where the vehicle will be in a certain amount of time. As the angular motion increases, the visibility of the pilot is decreased, since the LOS of the vehicle will be changing at an increased rate. In order to increase the visibility of the pilot, an initial LOS (e.g., the LOS of the scan when the vehicle has no angular velocity) of the scan is adjusted in the direction of motion of the vehicle to a final LOS of the scan (e.g., the LOS of the scan when the vehicle has a particular angular velocity). As the angular motion increases, the angle between the initial LOS of the scan and the final LOS of the scan is increased. As the angular motion increases, since the LOS of the LORD system will be constantly changing, the LOS of the scan is adjusted in the direction of motion of the LORD system through an increased angle such that the pilot will be provided with up-to-date information regarding potential obstacles in her flight path. As at least one of the angular velocity and angular acceleration of the vehicle decreases (i.e., as the vehicle travels in a more straight direction), the angle through which the LOS of the scan of the LORD system is moved in the direction of motion is decreased. Since the LOS of the LORD system will be changing at a decreased rate, the angle through which the LOS of the scan is adjusted in the direction of motion of the vehicle is also decreased.

With reference to FIG. 8F, as helicopter 441 decreases in angular velocity (i.e., a light turn), an initial FOV 444, with the LOS of the scan being represented by an arrow 443$_A$, is adjusted in the direction of motion of helicopter 441, to a final FOV 445. With reference to FIG. 8G, as the angular velocity of helicopter 453 begins to increase, the angle through which the LOS of the scan is moved in, following the change in orientation of helicopter 453, also increases. As the angular velocity of helicopter 453 decreases, the angle through which the LOS of the scan is moved in also decreases.

In procedure 708, the FOV of the scan is adjusted according to the detected linear motion of the vehicle using an increasing function. The detected linear motion can include at least one of the linear velocity of the vehicle and the linear acceleration of the vehicle. For example, as the vehicle decreases in linear velocity, the FOV of the scan is decreased since less distance will be covered by the vehicle and since the pilot will have more time to react. As less distance will be covered and the reaction time is increased, only the most significant volume of interest is scanned, thereby conserving energy. At low linear speeds, this significant volume of interest lies directly in the LOS of the vehicle. As the vehicle increases in linear velocity, the FOV of the scan is increased, since more distance will be covered by the vehicle and since the pilot will have less time to react.

With reference to FIG. 8B, as helicopter 410 decreases in speed, a spread angle 417 of the FOV of system 380 is decreased by controller 385 (FIG. 7), thereby decreasing a range 412 of the width of the spread angle of the FOV of system 380 (FIG. 7). Since helicopter 410 is traveling at slower speeds, thereby resulting in less of a need for system 380 to scan a large FOV (since less distance is covered and the time in which the pilot can react, i.e., the look ahead distance, is increased), the FOV of system 380 is decreased so that only the most significant volume of interest, where obstacles to helicopter 410 can be found, is scanned. This significant volume of interest lies directly in the LOS of helicopter 410 at low speeds. With reference to FIG. 8C, as helicopter 420 increases in speed, a spread angle 427 of the FOV of system 380 is increased by controller 385, thereby increasing a range 422 of the width of the spread angle of the FOV of system 380. Since helicopter 420 is traveling at higher speeds (since more distance is covered and the time in which the pilot can react, i.e., the look ahead distance, is decreased), thereby resulting in more of a need for system 380 to scan a larger FOV, the FOV of system 380 is increased so that a larger volume of interest, where obstacles to helicopter 420 can be found, is scanned.

It is noted that in procedure 704, in general, the FOV of the scan is adjusted according to the angular velocity. The angular acceleration can be used to correct for errors in the adjustment of the FOV of the scan according to the angular velocity, as is known in the art. Also, in procedures 706 and 708, the LOS of the scan, and the FOV of the scan, are each respectfully adjusted according to the linear velocity. In each of these procedures, the linear acceleration can be used to correct for errors in the adjustment of, respectfully, the LOS of the scan and the FOV of the scan, according to the linear velocity, as is known in the art.

It will be appreciated by persons skilled in the art that the disclosed technique is not limited to what has been particularly shown and described hereinabove. Rather the scope of the disclosed technique is defined only by the claims, which follow.

The invention claimed is:

1. Fiber laser, for detecting at least one object, comprising:
   at least one signal diode, said at least one signal diode generating at least one beam of light;
   a circulator, optically coupled with said at least one signal diode, for directing said at least one beam of light in at least one of at least two different directions;
   an erbium doped fiber (EDF), optically coupled with said circulator, for amplifying said at least one beam of light thereby producing at least one amplified one beam of light;
   a wavelength division multiplexer (WDM), optically coupled with said EDF;
   a delay line, optically coupled with said WDM;
   a narrow band reflector, optically coupled with said delay line, for reflecting only said at least one amplified beam of light back through said EDF a second time, thereby producing at least one double amplified beam of light;
   a first fiber pump diode, optically coupled with said WDM, for pumping said EDF;
   an input combiner, optically coupled with said circulator;
   an erbium-ytterbium co-doped fiber (EYDF), optically coupled with said input combiner, for amplifying said at least one double amplified beam of light, thereby producing at least one triple amplified beam of light;
   a second fiber pump diode, optically coupled with said input combiner, for pumping said EYDF;
   an output combiner, optically coupled with said EYDF; and
   a third fiber pump diode, optically coupled with said output combiner, for pumping said EYDF,
   wherein said WDM and said at least one signal diode are located on opposite sides of said EDF,
   wherein said output combiner outputs said at least one triple amplified beam of light.

2. The fiber laser according to claim 1, wherein an erbium-ytterbium co-doped fiber can be substituted for said EDF.

3. The fiber laser according to claim 1, further comprising a first band pass filter (BPF), optically coupled with said circulator and said input combiner, for suppressing spontaneous light emissions that result from said EDF.

4. The fiber laser according to claim 1, further comprising:
   at least one thermoelectric cooler, coupled with said fiber laser;
   a heat sink, coupled with said fiber laser; and
   an external forced air unit, coupled with said fiber laser,
   wherein said at least one thermoelectric cooler, said heat sink and said external forced air unit cool said fiber laser.

5. The fiber laser according to claim 1, wherein the operational wavelength of said at least one signal diode ranges from 1.5 to 2.3 micrometers.

6. The fiber laser according to claim 1, wherein the pulse width of said generated at least one beam of light ranges from a 3 nanoseconds to 2000 nanoseconds.

7. The fiber laser according to claim 1, wherein the bandwidth of said at least one signal diode is narrow.

8. The fiber laser according to claim 1, wherein the bandwidth of said at least one signal diode and said narrow band reflector are substantially similar.

9. The fiber laser according to claim 1, wherein the delay of said delay line is equal to or greater than the pulse width of said at least one beam of light.

10. The fiber laser according to claim 1, wherein the frequency at which said at least one beam of light is generated by said at least one signal diode ranges from one kilohertz to one thousand kilohertz.

11. The fiber laser according to claim 1, wherein the energy of said generated at least one beam of light is on the order of tens of microwatts.

12. The fiber laser according to claim 1, wherein said narrow band reflector is a narrow band Bragg reflector.

13. The fiber laser according to claim 1, wherein said narrow band reflector is a fiber Bragg grating.

14. The fiber laser according to claim 1, wherein the operational wavelengths of said first fiber pump diode, said second fiber pump diode and said third fiber pump diode ranges from 910 nanometers to 985 nanometers.

15. The fiber laser according to claim 1, wherein said first fiber pump diodes pumps said EDF with at least one beam of light on the order of hundreds of milliwatts.

16. The fiber laser according to claim 1, wherein said second fiber pump diode comprises at least one fiber coupled laser diode.

17. The fiber laser according to claim 1, wherein said third fiber pump diode comprises at least one fiber coupled laser diode.

18. The fiber laser according to claim 1, wherein said second fiber pump diode pumps said EYDF with at least one beam of light on the order of tens of watts.

19. The fiber laser according to claim 1, wherein said third fiber pump diode pumps said EYDF with at least one beam of light on the order of tens of watts.

20. The fiber laser according to claim 1, wherein said EYDF comprises a double clad erbium-ytterbium fiber.

21. The fiber laser according to claim 1, wherein said second fiber pump diode pumps one end of said EYDF and said third fiber pump diode pumps the other end of said EYDF.

22. The fiber laser according to claim 1, wherein said EDF is a single mode fiber amplifier.

23. The fiber laser according to claim 1, wherein said EYDF is a multimode fiber amplifier.

24. The fiber laser according to claim 1, wherein at least one of said input combiner and said output combiner comprises at least one collimating lens and at least one focusing lens, for focusing and directing said at least one amplified beam of light.

25. The fiber laser according to claim 1, wherein at least one of said input combiner and said output combiner comprises at least one dichroic mirror, for combining said at least one amplified beam of light with the light generated by said second fiber pump diode and said third fiber pump diode.

26. The fiber laser according to claim 1, wherein at least one of said input combiner and said output combiner comprises at least one protective filter, for protecting said second fiber pump diode and said third fiber pump diode from laser light damage.

27. The fiber laser according to claim 26, wherein said at least one protective filter is a band pass filter (BPF).

28. The fiber laser according to claim 1, further comprising an optical assembly, coupled with said output combiner, for directing and focusing said at least one triple amplified beam of light towards a volume of interest.

29. The fiber laser according to claim 1, wherein the components of said fiber laser are optically coupled by fiber optics.

30. The fiber laser according to claim 1, wherein the length of said EDF is in accordance with the characteristic absorption length of erbium doped fibers.

31. The fiber laser according to claim 1, wherein the length of said EYDF is double the length of the characteristic absorption length of erbium-ytterbium co-doped fibers.

32. The fiber laser according to claim 1, further comprising:
at least one receiver, coupled with said fiber laser, for detecting reflections of said at least one beam of light from said at least one object,
said fiber laser further comprising:
a commutator, coupled with each of said at least one signal diode; and
a power supply signal diode driver, coupled with said commutator, for supplying energy to each of said at least one signal diode,
wherein said fiber laser is mounted on a vehicle,
wherein said fiber laser is enabled to prevent receiver burn-out,
wherein each said at least one signal diode generates at least one beam of light distinct from another one of said at least one signal diode,
wherein said commutator enables each of said at least one signal diode, one at a time, to each draw a predetermined amount of energy from said power supply signal diode driver,
wherein one of said at least one signal diode generates at least one low energy beam of light and another one of said at least one signal diode generates at least one high energy beam of light,
wherein said at least one low energy beam of light is transmitted by said output combiner before said at least one high energy beam of light, and
wherein when said at least one low energy beam of light is detected by said receiver, and the energy level of said low energy beam is above a predetermined threshold, said at least one high energy beam of light is not transmitted.

33. The fiber laser according to claim 32, wherein when said at least one low energy beam of light is detected by said receiver in a predetermined time period, said at least one high energy beam of light is not transmitted.

34. The fiber laser according to claim 32, further comprising a scanner, optically coupled with said fiber laser, for directing said at least one beam of light to a volume of interest in which said at least one object may be present.

35. The fiber laser according to claim 32, further comprising an indicator, coupled with said receiver, for providing an indication of said at least one object to a user when said at least one receiver detects reflections of said at least one beam of light from said at least one object.

36. The fiber laser according to claim 35, wherein said indication is selected from the list consisting of:
visual indication;
audible indication; and
tactile indication.

37. The fiber laser according to claim 32, further comprising an image processing unit, coupled with said at least one receiver, for generating an image of said volume of interest, from the various intensities of all the reflections of said at least one beam of light from said at least one object.

38. The fiber laser according to claim 32, wherein the distinction between said generated beams of light is selected from the list consisting of:
different wavelengths;
different pulse widths;
different types of polarization;
different amplitudes;
different pulse frequencies;
different generation times; and
different frequency modes.

39. The fiber laser according to claim 32, wherein the distinction between said generated beams of light comprises different generation times, and
wherein the difference in time between said different generation times is on the range of tens to hundreds of microseconds.

40. The fiber laser according to claim 32, wherein the distinction between said generated beams of light comprises different frequency modes.

41. The fiber laser according to claim 40, wherein said different frequency modes comprises a single frequency mode.

42. The fiber laser according to claim 40, wherein said different frequency modes comprises a multi-frequency mode.

43. The fiber laser according to claim 41, wherein said at least one signal diode operating in said single frequency mode is selected from the list consisting of:
 signal diode;
 single frequency fiber laser; and
 solid state laser.

44. The fiber laser according to claim 42, wherein said at least one signal diode operating in said multi-frequency mode is selected from the list consisting of:
 a signal diode;
 a fiber laser oscillator; and
 a solid state laser oscillator.

45. The fiber laser according to claim 32, wherein said commutator allows each of said at least one signal diode to draw the same amount of energy from said power supply signal diode driver simultaneously.

46. The fiber laser according to claim 45, wherein said output combiner outputs said at least one beam of light generated by each of said at least one signal diode simultaneously.

47. The fiber laser according to claim 32, further comprising:
 an optical assembly, for transmitting said at least one beam of light, wherein said output combiner is coupled with said optical assembly, and
 wherein said output combiner comprises an opto-mechanical interface for transmitting said at least one beam of light to said optical assembly.

48. The fiber laser according to claim 32, further comprising:
 a hardware controller, coupled with said fiber laser, for coordinating and synchronizing the operation of said fiber laser;
 a transceiver optics, coupled with said fiber laser, for aligning said generated at least one beam of light and a received reflected at least one beam of light, reflected from said at least one object, onto a common optical axis;
 an optical receiver, coupled with said transceiver optics and with said hardware controller, for receiving said reflected at least one beam of light and for providing said hardware controller with information indicative of the characteristics of said reflected at least one beam of light;
 a scanner, coupled with said transceiver optics and with said hardware controller, for scanning a volume of interest in front of said vehicle and for directing said reflected at least one beam of light towards said transceiver optics;
 a scanner driver, coupled with said scanner and with said hardware controller, for mechanically setting the mode of operation of said scanner;
 a processor, coupled with said hardware controller, for setting said fiber laser to a certain mode of operation and for instructing said hardware controller to set said scanner driver to an appropriate mode of operation;
 an inertial navigation system (INS), coupled with said processor, for continuously detecting the motion of said vehicle, in real-time, and for providing said detected motion to said processor;
 a user interface, coupled with said processor, for allowing a user to operate said fiber laser, and to set the characteristics of said fiber laser for a given operation scenario;
 a voice management unit, coupled with said processor, for conveying information to a user of said vehicle;
 a helmet mounted display (HMD) symbol generator, coupled with said processor, for conveying information to said user;
 a global positioning system (GPS), coupled with said processor, for continuously detecting the position of said vehicle, and for providing said detected position to said processor; and
 a power supply, coupled with said fiber laser, said hardware controller and with said processor, for providing electrical power to said fiber laser, said hardware controller and to said processor,
 wherein said hardware controller coordinates and synchronizes the operation of said scanner driver and said processor, sets said fiber laser to said certain mode of operation, according to said characteristics of said reflected at least one beam of light, and provides said processor with information regarding a possible hazard to said vehicle when said characteristics of said reflected at least one beam of light indicates that said at least one object, from which said reflected at least one beam of light reflected from, is an obstacle presenting a possible hazard to said vehicle,
 wherein said transceiver optics transmits said at least one beam of light to said scanner,
 wherein said processor uses said detected motion to determine said appropriate mode of operation for said scanner driver and to determine said certain mode of operation for said fiber laser,
 wherein said HMD symbol generator indicates the presence of said possibly hazardous obstacle in the path of said vehicle, to said user through a visual effect,
 wherein said voice management unit indicates the presence of said possibly hazardous obstacle in the path of said vehicle, to said user through an acoustic effect, and
 wherein said HMD symbol generator and said voice management unit provides said user with information regarding the location and the nature of said possibly hazardous obstacle, as received by said processor.

49. The fiber laser according to claim 48, wherein said scanner scans a volume of interest in front of said vehicle, said volume of interest located a predetermined distance in front of said vehicle.

50. The fiber laser according to claim 48, further comprising:
 an altimeter, coupled with said processor, for detecting the altitude of said vehicle and for providing said detected altitude to said processor; and
 a weight sensor, coupled with the wheels of said vehicle and with said processor, for detecting the weight on said wheels and for providing said processor with said detected weight,
 wherein said altimeter and said GPS are used to increase the accuracy of said detected motion of said vehicle detected by said INS,
 wherein said processor uses said detected weight to determine the flight state of said vehicle, and
 wherein said weight sensor increases the operational safety of said fiber laser by preventing the use of said fiber laser if said vehicle is not in flight.

51. The fiber laser according to claim 48, wherein said transceiver optics comprises a plurality of optical elements selected from the list consisting of:

a beam combiner;
a telescope; and
a deflecting mirror.

52. The fiber laser according to claim 48, wherein said acoustic effect comprises a beeping sound.

53. The fiber laser according to claim 48, wherein said acoustic effect comprises a human voice.

54. The fiber laser according to claim 1, further comprising:
at least one receiver, for receiving reflections of said at least one beam of light from said at least one object;
a reflecting-transmitting plate, optically coupled with said at least one receiver, for reflecting one of said at least one beam of light towards one of said at least one receiver, and transmitting said another one of said at least one beam of light towards another one of said at least one receiver; and
an optical assembly, optically coupled with said fiber laser and with said reflecting-transmitting plate, for transmitting and receiving said at least one beam of light,
wherein each of said at least one beam of light is transmitted at a different time.

55. The fiber laser according to claim 54, wherein said at least one beam of light is distinct compared to said another one of said at least one beam of light in wavelength.

56. The fiber laser according to claim 54, wherein said at least one beam of light is directed towards a different section of a volume of interest than said another one of said at least one beam of light.

57. The fiber laser according to claim 1, wherein said at least one beam of light is a transmitted pulsed beam of light, and wherein said fiber laser is enabled to distinguish between a pulsed light reflection from said at least one object and a pulsed light reflection from clutter, said fiber laser further comprising:
at least one receiver, for receiving reflections of said pulsed beam of light from said at least one object and said clutter;
a pulse width detector, coupled with said at least one receiver, for detecting the pulse width of said pulsed light reflection; and
a processor, coupled with said pulse width detector and with said at least one receiver, for distinguishing between said pulsed light reflection from said at least one object and said pulsed light reflection from said clutter,
wherein said processor provides an object of interest indication when the detected width of said pulsed light reflection is substantially similar to the pulse width of said transmitted pulsed beam of light, and
wherein said processor provides a clutter indication when the detected width of said pulsed light reflection is substantially longer than the pulse width of said transmitted pulsed beam of light.

58. The fiber laser according to claim 57, wherein said pulse width detector comprises at least one notch filter, for detecting low, middle and high frequency pulse widths.

59. The fiber laser according to claim 58, wherein said at least one notch filter comprises at least one narrow band pass filter, said at least one narrow band pass filter comprising at least one RCL circuit.

60. The fiber laser according to claim 57, wherein said pulse width detector comprises a signal processor, for detecting said pulse width of said pulsed light reflection.

61. The fiber laser according to claim 57, wherein said processor can perform at least one operation selected from the list consisting of:
detecting background signals impinging upon said fiber laser;
rejecting said background signals;
detecting the time of arrival of said pulsed light reflection;
adjusting a detection threshold of said pulsed light reflections; and
selecting an optimal mode for signal processing said pulsed light reflection.

62. The fiber laser according to claim 57, wherein said processor provides a low visibility indication when the number of said clutter indications received in a time period exceeds a predetermined amount.

63. The fiber laser according to claim 57, wherein said object of interest indication and said clutter indication are graduated according to the detected width of said pulsed light reflection as compared with the pulse width of said transmitted pulsed beam of light.

64. Fiber laser, for detecting at least one object, comprising:
at least one signal diode, said at least one signal diode generating at least one beam of light;
a preamplifier stage, coupled with said at least one signal diode, for amplifying said at least one beam of light;
at least one additional preamplifier stage, coupled with said preamplifier stage, for additionally amplifying said at least one amplified beam of light; and
a booster stage, coupled with said at least one additional preamplifier stage, for amplifying said at least one additionally amplified beam of light,
said preamplifier stage comprising:
a circulator, optically coupled with said at least one signal diode, for directing said at least one beam of light in at least one of at least two different directions;
an erbium doped fiber (EDF), optically coupled with said circulator, for amplifying said at least one beam of light thereby producing at least one amplified one beam of light;
a wavelength division multiplexer (WDM), optically coupled with said EDF;
a delay line, optically coupled with said WDM;
a narrow band reflector, optically coupled with said delay line, for reflecting only said at least one amplified beam of light back through said EDF a second time, thereby producing at least one double amplified beam of light; and
a first fiber pump diode, optically coupled with said WDM, for pumping said EDF,
said booster stage comprising:
an input combiner, optically coupled with said at least one additional preamplifier stage;
an erbium-ytterbium co-doped fiber (EYDF), optically coupled with said input combiner, for amplifying said at least one double amplified beam of light, thereby producing at least one triple amplified beam of light;
a second fiber pump diode, optically coupled with said input combiner, for pumping said EYDF;
an output combiner, optically coupled with said EYDF; and
a third fiber pump diode, optically coupled with said output combiner, for pumping said EYDF,
wherein said WDM and said at least one signal diode are located on opposite sides of said EDF,
wherein said output combiner outputs said at least one triple amplified beam of light.

65. The fiber laser according to claim 64, wherein said at least one additional preamplifier stage comprises:

a circulator, for directing said at least one beam of light in at least one of at least two different directions;

an erbium doped fiber (EDF), optically coupled with said circulator, for amplifying said at least one beam of light thereby producing at least one amplified one beam of light;

a wavelength division multiplexer (WDM), optically coupled with said EDF; and a fiber pump diode, optically coupled with said WDM, for pumping said EDF, wherein said circulator in one of said at least one additional preamplifier stage is coupled with said circulator in another one of said at least one additional preamplifier stage, wherein said circulator in the first of a chain of said at least one additional preamplifier stage is coupled with said circulator in said preamplifier stage, and wherein said circulator in the last of a chain of said at least one additional preamplifier stage is coupled with said input combiner in said booster stage.

66. The fiber laser according to claim 64, wherein said at least one additional preamplifier stage comprises:

a circulator, for directing said at least one beam of light in at least one of at least two different directions;

an erbium doped fiber (EDF), for amplifying said at least one beam of light thereby producing at least one amplified one beam of light;

at least one wavelength division multiplexer (WDM); and at least one fiber pump diode, each said at least one fiber pump diode respectively optically coupled with each said at least one WDM, for pumping said EDF, wherein one of said at least one WDM is optically coupled to one side of said EDF and to said circulator, wherein another one of said at least one WDM is optically coupled to the other side of said EDF, wherein said circulator in one of said at least one additional preamplifier stage is coupled with said circulator in another one of said at least one additional preamplifier stage, wherein said circulator in the first of a chain of said at least one additional preamplifier stage is coupled with said circulator in said preamplifier stage, and wherein said circulator in the last of a chain of said at least one additional preamplifier stage is coupled with said input combiner in said booster stage.

67. Fiber laser, for detecting at least one object, comprising:

at least one signal diode, said at least one signal diode generating at least one beam of light;

a preamplifier stage, coupled with said at least one signal diode, for amplifying said at least one beam of light;

a splitter, coupled with said preamplifier stage, for splitting said at least one amplified beam of light into a plurality of amplified beams of light; and at least one booster stage, each said at least one booster stage being coupled with said splitter, for amplifying respectively each one of said plurality of amplified beams of light, said preamplifier stage comprising:

a circulator, optically coupled with said at least one signal diode and with said splitter, for directing said at least one beam of light in at least one of at least two different directions;

an erbium doped fiber (EDF), optically coupled with said circulator, for amplifying said at least one beam of light thereby producing at least one amplified one beam of light;

a wavelength division multiplexer (WDM), optically coupled with said EDF;

a delay line, optically coupled with said WDM;

a narrow band reflector, optically coupled with said delay line, for reflecting only said at least one amplified beam of light back through said EDF a second time, thereby producing at least one double amplified beam of light; and a first fiber pump diode, optically coupled with said WDM, for pumping said EDF, each one of said at least one booster stage comprising:

an input combiner, optically coupled with said splitter;

an erbium-ytterbium co-doped fiber (EYDF), optically coupled with said input combiner, for amplifying said at least one double amplified beam of light, thereby producing at least one triple amplified beam of light;

a second fiber pump diode, optically coupled with said input combiner, for pumping said EYDF;

an output combiner, optically coupled with said EYDF; and a third fiber pump diode, optically coupled with said output combiner, for pumping said EYDF, wherein said WDM and said at least one signal diode are located on opposite sides of said EDF, wherein each said respective output combiner outputs a respective one of said plurality of amplified beams of light.

68. The fiber laser according to claim 1, wherein a double clad WDM can be substituted for said input combiner.

69. The fiber laser according to claim 64, wherein said at least one additional preamplifier stage comprises:

an erbium doped fiber (EDF), for amplifying said at least one beam of light thereby producing at least one amplified one beam of light;

a wavelength division multiplexer (WDM), optically coupled with said EDF; and a fiber pump diode, optically coupled with said WDM, for pumping said EDF, wherein said EDF in one of said at least one additional preamplifier stage is coupled with said WDM in another one of said at least one additional preamplifier stage, wherein said EDF in the first of a chain of said at least one additional preamplifier stage is coupled with said circulator in said preamplifier stage, and wherein said WDM in the last of a chain of said at least one additional preamplifier stage is coupled with said input combiner in said booster stage.

* * * * *